United States Patent [19]

Gasper et al.

[11] Patent Number: 5,111,409

[45] Date of Patent: * May 5, 1992

[54] AUTHORING AND USE SYSTEMS FOR SOUND SYNCHRONIZED ANIMATION

[76] Inventors: Elon Gasper, 12849 - 67th St., Bellevue, Wash. 98006; Joseph H. Matthews, III., 16522 NE. 135th Pl., Redmond, Wash. 98052

[*] Notice: The portion of the term of this patent subsequent to Dec. 5, 2006 has been disclaimed.

[21] Appl. No.: 384,243

[22] Filed: Jul. 21, 1989

[51] Int. Cl.⁵ ............................................. G09B 19/04
[52] U.S. Cl. ....................... 395/152; 434/185; 395/154
[58] Field of Search ............ 364/518, 521; 340/729; 434/169, 185, 167, 172

[56] References Cited

U.S. PATENT DOCUMENTS

| | | | |
|---|---|---|---|
| 4,305,131 | 12/1981 | Best | 364/521 |
| 4,333,152 | 6/1982 | Best | 364/521 |
| 4,445,187 | 4/1984 | Best | 364/521 |
| 4,569,026 | 2/1986 | Best | 364/521 |
| 4,884,972 | 12/1989 | Gasper | 434/185 |

OTHER PUBLICATIONS

Method For Computer Animation Of Lip Movements by J. D. Bagley and F. Gracer—IBM Research—IBM Technical Disclosure Bulletin—vol. 14, No. 10, Mar. 1972.

Karma: A System For Storyboard Animation by F. Gracer and M. W. Blasgen—IBM Research—Sep. 21, 1970, RC 3052.

Primary Examiner—Heather R. Herndon
Attorney, Agent, or Firm—Davis & Schroeder

[57] ABSTRACT

A general purpose computer, such as a personal computer, is programmed for sound-synchronized random access and display of synthesized actors ("synactors") on a frame-by-frame basis. The interface between a user and the animation system is defined as a stage or acting metaphor. The user interface provides the capability to create files defining individually accessible synactors representing real or imaginary persons, animated characters and objects or scenes which can be programmed to perform speech synchronized action. Synactor speech is provided by well-known speech synthesis techniques or, alternatively, by inputting speech samples and communication characteristics to define a digital model of the speech and related animation for a particular synactor. A synactor is defined as combination of sixteen predefined images; eight images to be synchronized with speech and eight images to provide additional animated expression. Once created, a synactor may be manipulated similarly to a file or document in any application. Once created, a synactor is controlled with scripts defined and edited by a user via the user interface.

13 Claims, 19 Drawing Sheets

KEY TO FIG. 4

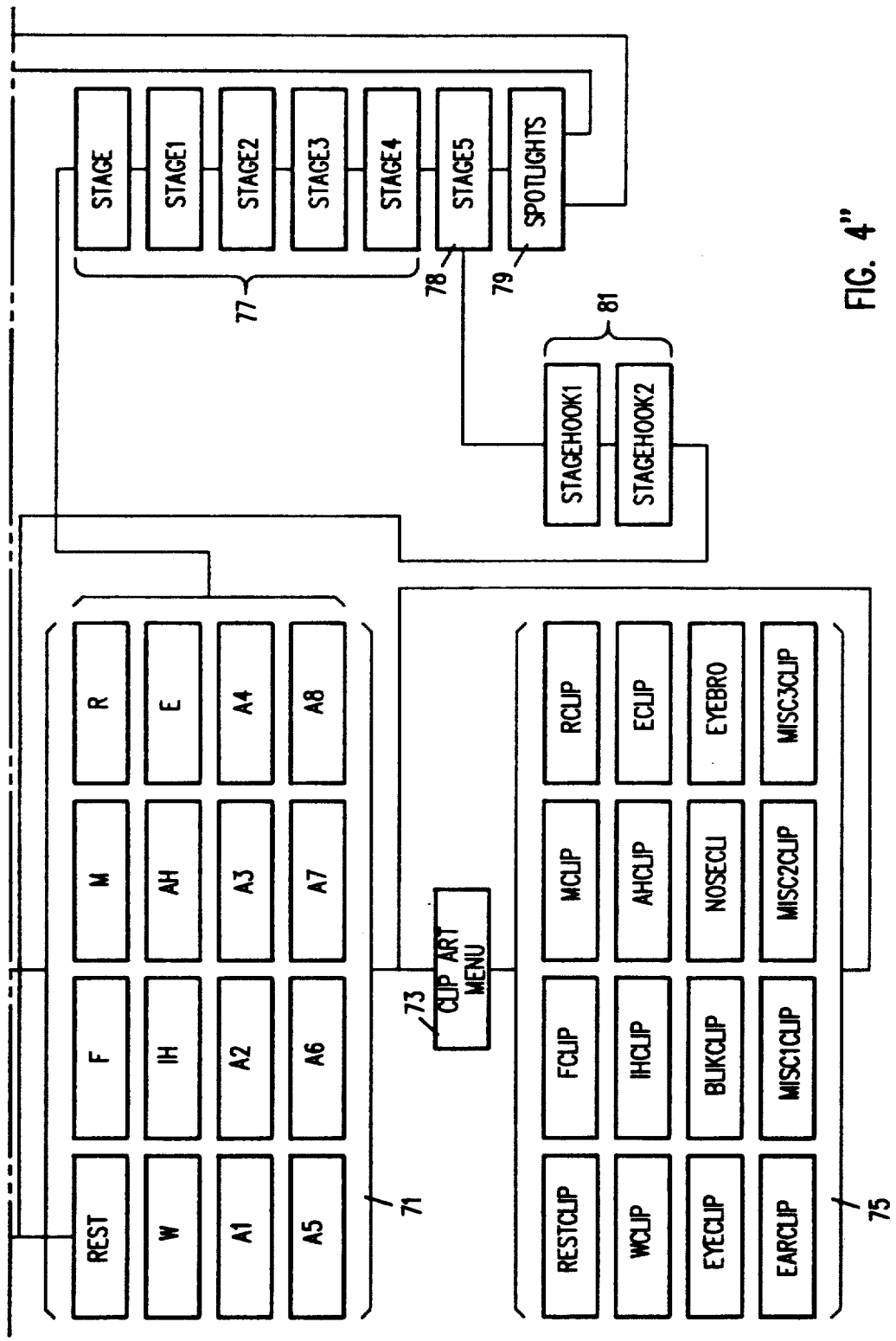
FIG. 4"

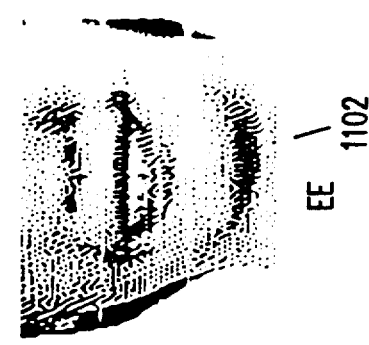 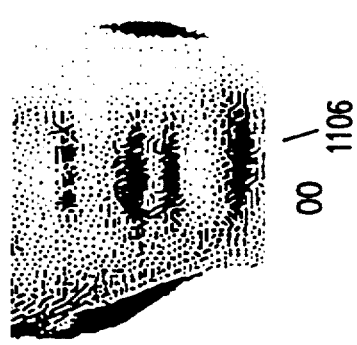
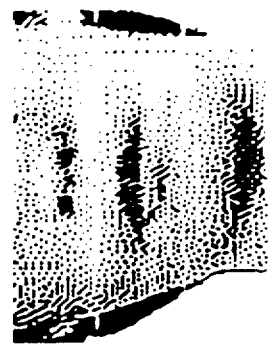 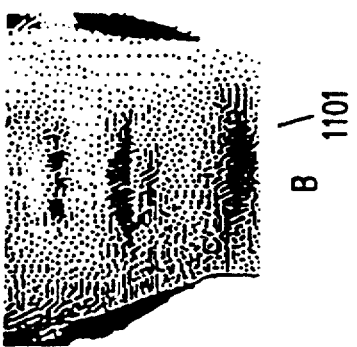
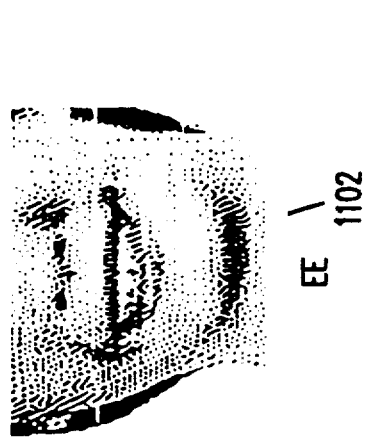 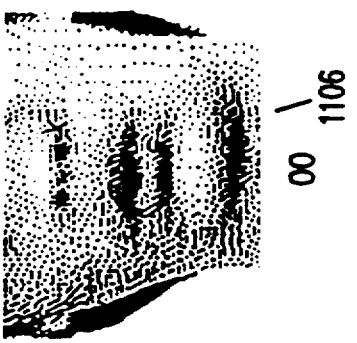
FIG. 11a
FIG. 11b

AUTHORING AND USE SYSTEMS FOR SOUND SYNCHRONIZED ANIMATION

BACKGROUND OF THE INVENTION

The present invention relates generally to computerized animation methods and, more specifically to a method and apparatus for creation and control of random access sound-synchronized talking synthetic actors and animated characters.

It is well-known in the prior art to provide video entertainment or teaching tools employing time synchronized sequences of pre-recorded video and audio. The prior art is best exemplified by tracing the history of the motion picture and entertainment industry from the development of the "talkies" to the recent development of viewer interactive movies.

In the late nineteenth century the first practical motion pictures comprising pre-recorded sequential frames projected onto a screen at 20 to 30 frames per second to give the effect of motion were developed. In the 1920's techniques to synchronize a pre-recorded audio sequence or sound track with the motion picture were developed. In the 1930's animation techniques were developed to produce hand drawn cartoon animations including animated figures having lip movements synchronized with an accompanying pre-recorded soundtrack. With the advent of computers, more and more effort has been channeled towards the development of computer generated video and speech including electronic devices to synthesize human speech and speech recognition systems.

In a paper entitled "KARMA: A system for Storyboard Animation" authored by F. Gracer and M. W. Blasgen, IBM Research Report RC 3052, dated Sep. 21, 1970, an interactive computer graphics program which automatically produces the intermediate frames between a beginning and ending frame is disclosed. The intermediate frames are calculated using linear interpolation techniques and then produced on a plotter. In a paper entitled "Method for Computer Animation of Lip Movements", IBM Technical Disclosure Bulletin, Vol. 14 No. 10 Mar., 1972, pages 5039, 3040, J. D. Bagley and F. Gracer disclosed a technique for computer generated lip animation for use in a computer animation system. A speech-processing system converts a lexical presentation of a script into a string of phonemes and matches it with an input stream of corresponding live speech to produce timing data. A computer animation system, such as that described hereinabove, given the visual data for each speech sound, generates intermediate frames to provide a smooth transition from one visual image to the next to produce smooth animation. Finally the timing data is utilized to correlate the phonetic string with the visual images to produce accurately timed sequences of visually correlated speech events.

Recent developments in the motion picture and entertainment industry relate to active viewer participation as exemplified by video arcade games and branching movies. U.S. Pat. Nos. 4,305,131; 4,333,152; 4,445,187 and 4,569,026 relate to remote-controlled video disc devices providing branching movies in which the viewer may actively influence the course of a movie or video game story. U.S. Pat. No. 4,569,026 entitled "TV Movies That Talk Back" issued on Feb. 4, 1986 to Robert M. Best discloses a video game entertainment system by which one or more human viewers may vocally or manually influence the course of a video game story or movie and conduct a simulated two-way voice conversation with characters in the game or movie. The system comprises a special-purpose microcomputer coupled to a conventional television receiver and a random-access videodisc reader which includes automatic track seeking and tracking means. One or more hand-held input devices each including a microphone and visual display are also coupled to the microcomputer. The microcomputer controls retrieval of information from the videodisc and processes viewers' commands input either vocally or manually through the input devices and provides audio and video data to the television receiver for display. At frequent branch points in the game, a host of predetermined choices and responses are presented to the viewer. The viewer may respond using representative code words either vocally or manually or a combination of both. In response to the viewer's choice, the microprocessor manipulates pre-recorded video and audio sequences to present a selected scene or course of action and dialogue.

In a paper entitled "Soft Machine: A Personable Interface", "Graphics Interface '84", John Lewis and Patrick Purcell disclose a system which simulates spoken conversation between a user and an electronic conversational partner. An animated person-likeness "speaks" with a speech synthesizer and "listens" with a speech recognition device. The audio output of the speech synthesizer is simultaneously coupled to a speaker and to a separate real-time format-tracking speech processor computer to be analyzed to provide timing data for lip synchronization and limited expression and head movements. A set of pre-recorded visual images depicting lip, eye and head positions are properly sequenced so that the animated person-likeness "speaks" or "listens". The output of the speech recognition device is matched against pre-recorded patterns until a match is found. Once a match is found, one of several pre-recorded responses is either spoken or executed by the animated person-likeness.

Both J. D. Bagley et al and John Lewis et al require a separate format-tracking speech processor computer to analyze the audio signal to provide real-time data to determine which visual image or images should be presented to the user. The requirement for this additional computer adds cost and complexity to the system and introduces an additional source of error.

SUMMARY OF THE INVENTION

The present invention provides a method and apparatus for a random access user interface referred to as hyperanimator, which enables a user to create and control animated lip-synchronized images or objects utilizing a personal computer. The present invention may be utilized as a general purpose learning tool, interface device between a user and a computer, in video games, in motion pictures and in commercial applications such as advertising, information kiosks and telecommunications. Utilizing a real-time random-access interface driver (RAVE) together with a descriptive authoring language called RAVEL (real-time random-access animation and vivification engine language), synthesized actors, hereinafter referred to as "synactors", representing real or imaginary persons and animated characters, objects or scenes can be created and programmed to perform actions including speech which are not sequentially pre-stored records of previously enacted events.

Animation and sound synchronization are produced automatically and in real-time.

The communications patterns—the sounds and visual images of a real or imaginary person or of an animated character associated with those sounds—are input to the system and decomposed into constituent parts to produce fragmentary images and sounds. Alternatively, or in conjunction with this, well known speech synthesis methods may also be employed to provide the audio. That set of communications characteristics is then utilized to define a digital model of the motions and sounds of a particular synactor or animated character. A synactor that represents the particular person or animated character is defined by a RAVEL program containing the coded instructions for dynamically accessing and combining the video and audio characteristics to produce real-time sound and video coordinated presentations of the language patterns and other behavior characteristics associated with that person or animated character. The synactor can then perform actions and read or say words or sentences which were not prerecorded actions of the person or character that the synactor models. Utilizing these techniques, a synactor may be defined to portray a famous person or other character, a member of one's family or a friend or even oneself.

In the preferred embodiment, hyperanimator, a general purpose system for random access and display of synactor images on a frame-by-frame basis that is organized and synchronized with sound is provided. Utilizing the hyperanimator system, animation and sound synchronization of a synactor is produced automatically and in real time. Each synactor is made up of sixteen images, eight devoted to speaking and eight to animated expressions.

The eight speaking images correspond to distinct speech articulations and are sufficient to create realistic synthetic speaking synactors. The remaining eight images allow the synactor to display life-like expressions. Smiles, frowns and head turns can all be incorporated into the synactor's appearance.

The hyperanimator system provides the capability to use both synthetic speech and/or digitized recording to provide the speech for the synactors. Speech synthesizers can provide unlimited vocabulary while utilizing very little memory. To make a synactor speak, the text to be spoken is typed or otherwise input to the system. Then the text is first broken down into its phonetic components. Then the sound corresponding to each component is generated through a speaker as an image of the synactor corresponding to that component is simultaneously presented on the display device. Digitized recording provides digital data representing actual recorded sounds which can be utilized in a computer system. Utilizing a "synchronization lab" defined by the hyperanimator system, a synactor can speak with any digitized sound or voice that is desired.

The interface between the user and the hyperanimator system is defined as a stage or acting metaphor. The hyperanimator system allows the user to shift or navigate between a number of display screens or cards to create and edit synactor files. While other paradigms are possible, this one works well and allows relatively inexperienced users to understand and operate the hyperanimator system to create, edit and work with the synactors.

The dressing room is where synactors are created and edited and is where users and synactors spend most of their time. The dressing room comprises 16 cards, 1 for each of the synactor images describing a synactor. Buttons are provided on each card to allow the user to navigate between the cards by pressing or clicking on a button with a mouse or other input device. Within the dressing room, the image of the synactor is placed in a common area named the Synactor Easel. Utilizing separate utilities such as "paint tools" or "face clip art", the user can create and edit the synactor. With a paint tool, a synactor may be drawn from scratch or, with clip art, a synactor may be created by copying and "pasting" eyes, ears, noses and even mouths selected from pre-stored sets of the different features.

Once the synactor has been created or built in the dressing room, the user can transfer the synactor to a stage screen where the lip synchronization and animation of the actor may be observed. The stage screen includes a text field wherein a user can enter text and watch the synactor speak. If the synactor thus created needs additional work, the user can return the synactor to the dressing room for touchup. If the user is satisfied with the synactor, the synactor can be then saved to memory for future use.

In the hyperanimator system, the synactor file is manipulated like a document in any application. Copying, editing (transferring a synactor file to the dressing room) and deleting actors from memory is accomplished in the casting call screen. The casting call screen displays a stagehand clipboard and provides buttons for manipulating the synactor files.

Copying and deleting sound resources comprising digitized sounds is accomplished in the sound booth screen. The digitized sound resources are synchronized with the image of the synactor in the screen representing the hyperanimator speech synchronization lab. The speech sync lab examines the sound and automatically creates a phonetic string which is used to create the animation and sound synchronization of the synactor. The speech sync lab generates a command called a RECITE command which tells the RAVE driver which sound resource to use and the phonetic string with associated timing values which produces the desired animation. The speech sync lab also provides for testing and refinement of the animation. If the synchronization process is not correct, the user can modify the RECITE command manually.

The above described functions and screens are tied together and accessed essentially from a menu screen. The menu screen contains six buttons allowing a user easy navigation through the screens to the hyperanimator system features. At the center of the menu screen is displayed a synactor called the Hyperanimator Navigator who serves a guide for a user through the hyperanimator system. The RAVE system is responsible for the animation and sound synchronization of the synactors. RAVEL defines and describes the synactor while the RAVE scripting language is an active language which controls the synactor after it is created by a user. RAVE scripting language commands enable a programmer to control the RAVE for an application program created by the programmer utilizing a desired programming system. Utilizing facilities provided in the programming system to call external functions, the programmer invokes the RAVE and passes RAVE scripting language commands as parameters to it. The RAVE script command controller 43 interprets these commands to control the synactor.

Once a synactor is created, it is controlled in a program by scripts through the RAVE scripting language level. All of the onscreen animation is controlled by scripts in the host system through the RAVE scripting language. Various subroutines called external commands ("XCMD") and external functions ("XFCN") are utilized to perform functions not available in the host language, for example creating synactors from the dressing room. The RAVE XCMD processes information between the scripts and the RAVE driver. Fifteen separate commands are utilized to enable users to open, close, move, hide, show and cause the synactor to speak. A program may have these commands built in, selected among or generated by the RAVE driver itself at runtime.

The hyperanimator system of the present invention is user friendly and easily understood by inexperienced users. It provides a user with the capability to create animated talking agents which can provide an interface between people and computers.

BRIEF DESCRIPTION OF THE DRAWINGS

FIGS. 6b and 6c are detailed presentations illustrating the screen layout, for example display screens subordinate to the menu screen of FIG. 6a;

FIGS. 11a-11d are presentations of animation sequences illustrating the effects of coarticulation.

DETAILED DESCRIPTION OF THE PREFERRED EMBODIMENT

Figure 1:
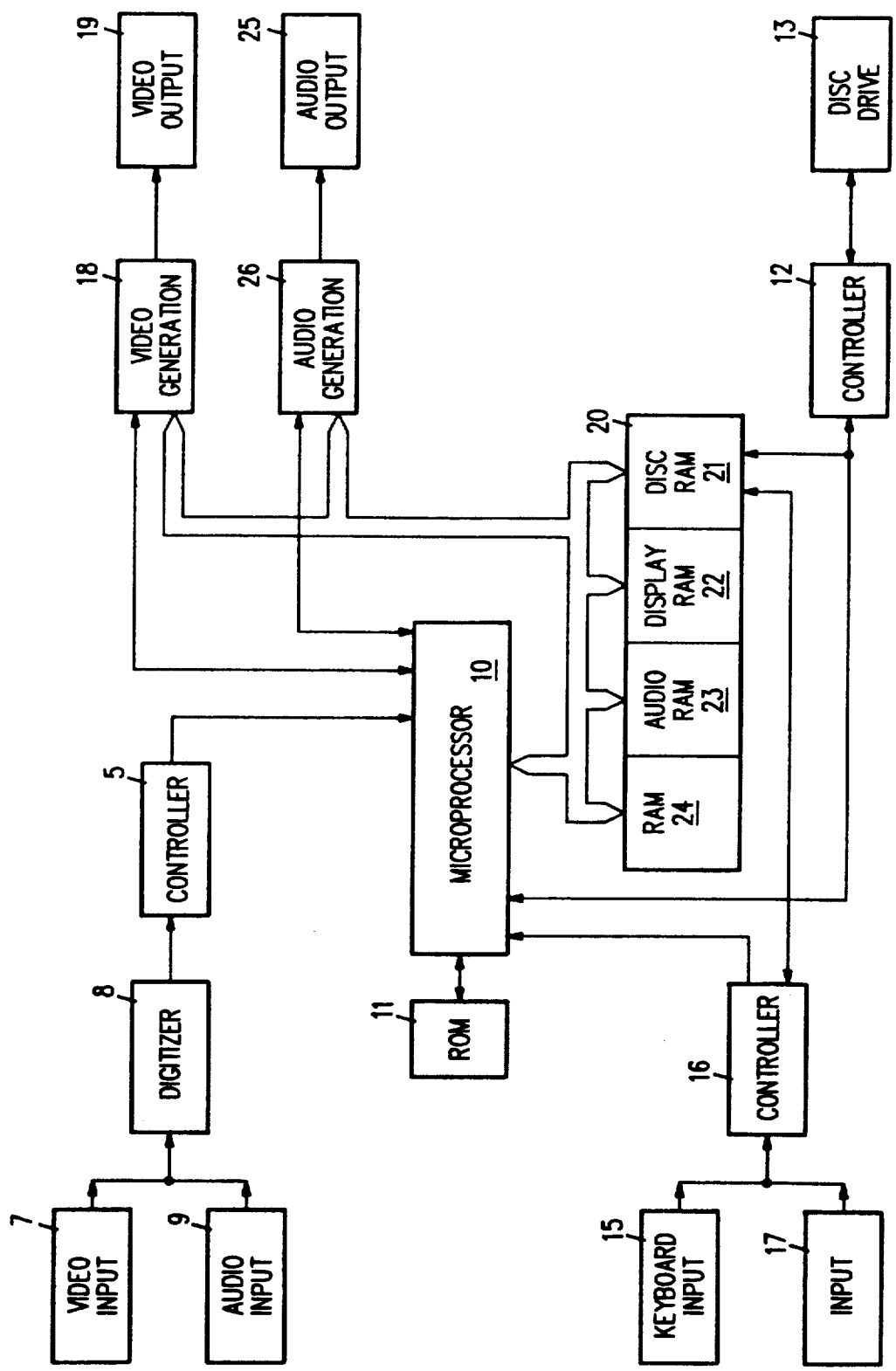
FIG. 1 is a block diagram of a system which displays computer generated visual images with real time synchronized computer generated speech according to the principles of the present invention.

Referring now to FIG. 1, in one preferred embodiment of the present invention, a special purpose microcomputer comprises a program controlled microprocessor 10 (a Motorola MC68000 is suitable for this purpose), random-access memory (RAM) 20, readonly only memory (ROM) 11, disc drive 13, video and audio input devices 7 and 9,1 user input devices such as keyboard 15 or other input devices 17 and output devices such as video display 19 and audio output device 25. RAM 20 is divided into four blocks which are shared by the microprocessor 10 and the various input and output devices.

The video output device 19 may be any visual output device such as a conventional television set or the CRT for a personal computer. The video output 19 and video generation 18 circuitry are controlled by the microprocessor 10 and share display RAM buffer space 22 to store and access memory mapped video. The video generation circuits also provide a 60 Hz timing signal interrupt to the microprocessor 10.

Also sharing the audio RAM buffer space 23 with the microprocessor 10 is the audio generation circuitry 26 which drives the audio output device 25. Audio output device 25 may be a speaker or some other type of audio transducer such as a vibrator to transmit to the hearing impaired.

Disc controller 12 shares the disc RAM 21 with the microprocessor 10 and provides control reading from and writing to a suitable non-volatile mass storage medium, such as floppy disc drive 13, for long-term storing of synactors that have been created using the hyperanimator system and to allow transfer of synactor resources between machines.

Input controller 16 for the keyboard 15 and other input devices 17 is coupled to microprocessor 10 and also shares disc RAM 21 with the disc controller 12. This purpose may be served by a Synertek SY6522 Versatile Interface Adaptor. Input controller 16 also coordinates certain tasks among the various controllers and other microprocessor support circuitry (not shown). A pointing input device 17 such as a mouse or light pen is the preferred input device because it allows maximum interaction by the user. Keyboard 15 is an optional input device in the preferred embodiment, but in other embodiments may function as the pointing device, or be utilized by an instructor or programmer to create or modify instructional programs or set other adjustable parameters of the system. Other pointing and control input devices such as a joy stick, a finger tip (in the case of a touch screen) or an eyemotion sensor are also suitable.

RAM 24 is the working memory of microprocessor 10. The RAM 24 contains the system and applications programs other information used by the microprocessor 10. Microprocessor 10 also accesses ROM 11 which is the system's permanent read-only memory. ROM 11 contains the operational routines and subroutines required by the microprocessor 10 operating system, such as the routines to facilitate disc and other device I/0, graphics primitives and real time task management, etc. These routines may be additionally supported by extensions and patches in RAM 24 and on disc.

Controller 5 is a serial communications controller such as a Zilog Z8530 SCC chip. Digitized samples of video and audio may be input into the system in this manner to provide characteristics for the talking heads and synthesized speech. Digitizer 8 comprises an audio digitizer and a video digitizer coupled to the video and audio inputs 7 and 9, respectively. Standard microphones, videocameras and VCRs will serve as input devices. These input devices are optional since digitized video and audio samples may be input into the system by keyboard 15 or disc drive 13 or may be resident in ROM 11.

Figure 2:
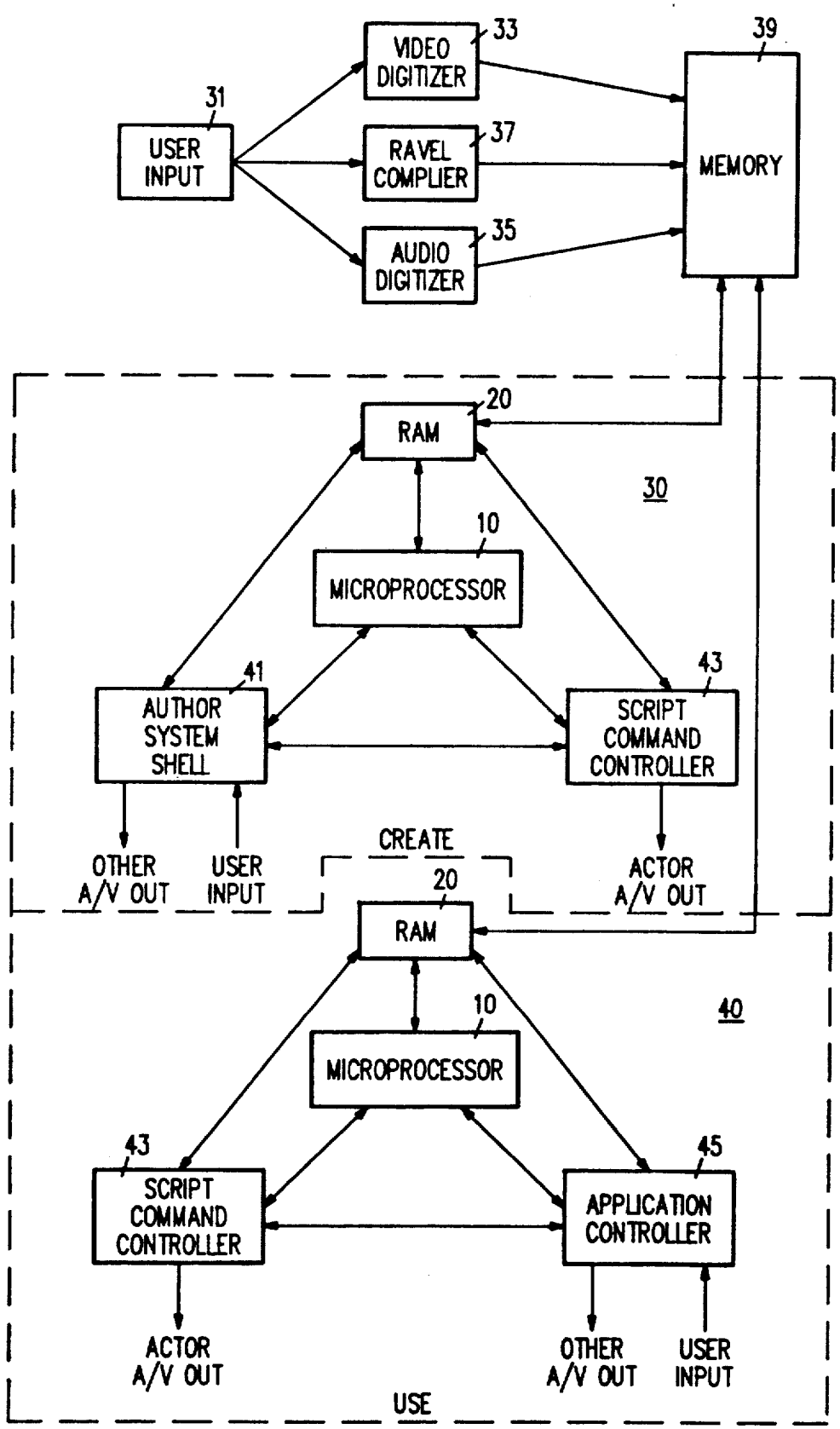
FIG. 2 is a conceptual block diagram illustrating the hyperanimator synactor authoring and use as implemented in the system shown in FIG. 1.

Referring now also to FIG. 2, a conceptual block diagram of the animated synthesized actor, hereinafter referred to as synactor, editing or authoring and application system according to the principles of the present invention is shown. The animation system of the present invention, hereinafter referred to as "hyperanimator", is a general purpose system which provides a user with the capability to create and/or edit synactors and corresponding speech scripts and to display on a frame-by-frame basis the synactors thus created. The hyperanimation system provides animation and sound synchronization automatically and in real time. To accomplish this, the hyperanimator system interfaces with a real time random access driver (hereinafter referred to as "RAVE") together with a descriptive authoring language called "RAVEL" which is implemented by the system shown in FIG. 1.

Prototype models, up to eight different models, for synactors are input via various input devices 31. The prototype models may comprise raw video and/or audio data which is converted to digital data in video and audio digitizers 33 and 35 or any other program data which is compiled by a RAVEL compiler 37. The prototype synactors are saved in individual synactor files identified by the name of the corresponding synactor. The synactor files are stored in memory 39 for access by the hyperanimator system as required. Memory 39 may be a disk storage or other suitable peripheral storage device.

To create a new synactor or to edit an existing prototype synactor, the hyperanimator system is configured as shown by the blocks included in the CREATE BOX 30. The author system shell 41 allows the user to access a prototype synactor file via RAM 20 and display the synactor on a number of screens which will be described in detail hereinbelow. Utilizing the various tools provided by the screens and the script command controller 43, the user is able to create a specific synactor and/or create and test speech and behavior scripts to use in an application. The new synactor thus created may be saved in the original prototype file or in a new file identified by a name for the new synactor. The synactor is saved as a part of a file called a resource. Scripting created, for example, digitized sound "recite" commands can be saved to application source files by means of "clipboard" type copy and paste utilities. The microprocessor 10 provides coordination of the processes and control of the I/O functions for the system.

When using a synactor, as an interactive agent between a user and an applications program, for example, the hyperanimator system is configured as shown by the USE BOX 40. User input to the applications controller 45 will call the desired synactor resource from a file in memory 39 via RAM 20. The script command controller 43 interprets script from the application controller 45 and provides the appropriate instructions to the display and the microprocessor 10 to use. Similarly, as during the create (and test) process, the microprocessor 10 provides control and coordination of the processes and I/O functions for the hyperanimator system.

Figure 3:
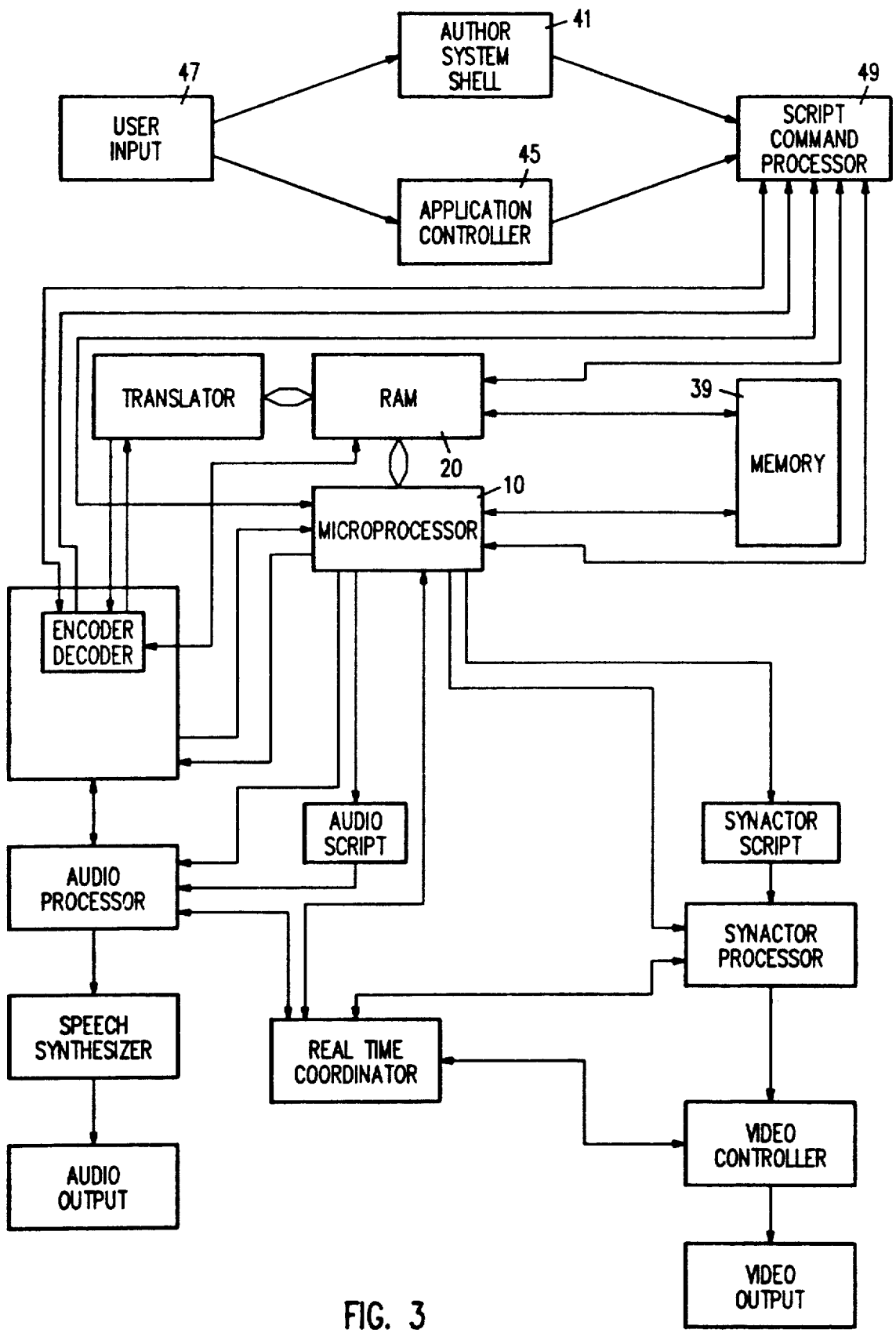
FIG. 3 is a functional block diagram illustrating the major data flows and processes for the system shown in FIG. 1.

Referring now to FIG. 3, a functional block diagram illustrating the major data flows, processes and events required to provide speech and the associated synchronized visual animation is shown. A detailed description of the processes and events that take place in the RAVE system is given in co-pending U.S. patent application Ser. No. 06/935,298 which is incorporated by reference as if fully set forth herein and will not be repeated. The hyperanimator system comprises the author system shell 41, the application controller 45, the script command processor 49 and associated user input devices 47 and is interfaced with the RAVE system at the script command processor 49. In response to a user input, the application controller 45 or the author system shell 41 calls on the microprocessor 10 to fetch from a file in memory 39 a synactor resource containing the audio and visual characteristics of a particular synactor. As required by user input, the microprocessor will initiate the RAVE sound and animation processes. Although both the author system shell 41 and the application controller 45 both access the script command processor 49, the normal mode of operation would be for a user to utilize the author system shell 41 to create/edit a synactor and at a subsequent time utilize the application controller 45 to call up a synactor for use (i.e., speech and visual display) either alone or coordinated with a particular application.

The hyperanimator system is a "front end" program that interfaces the system shown in FIG. 1 to the RAVE system to enable a user to create and edit synactors. The system comprises a number of screen images (sometimes referred to as "cards") which have activatable areas referred to as buttons that respond to user actions to initiate preprogrammed actions or call up other subroutines. The buttons may be actuated by clicking a mouse on them or other suitable methods, using a touch-screen for example. The screen images also may have editable text areas, referred to as "fields". The hyperanimator system comprises a number of screens or cards which the user moves between by activating or "pressing" buttons to create, edit and work with synactors.

Referring now to FIGS. 4, 5a-5i and 6a-6f, FIG. 4 is a functional block diagram illustrating a hierarchical overview of the hyperanimator screens. The startup screen 51 comprises one card and informs a user that he or she is running the hyperanimator system. The startup screen also provides the user with bibliographic information and instructions to begin use of the hyperanimator system. Once the initiate button (not shown) has been pressed, the RAVE driver is called to perform system checks. The RAVE driver is a portion of the hyperanimator system that handles much of the programmatic functions and processes of the synactor handling. It introduces itself with a box message (not shown) which includes a "puppet" icon. After the initial checks have been passed, a star screen 53 is shown which provides a transition between the startup screen 51 and the menu screen 55. The menu screen 55 is then shown after the star screen 53. The startup screen 51 also includes a button (not shown) for taking the user to the hyperanimator credit screen 57. The credit screen 57 comprises one card and provides additional bibliographic information to the user. The credit screen 57 can be accessed three ways: from the startup screen 51, from the menu screen 55 and from the first card in the dressing room 59. Pressing or clicking anywhere on the credit screen 57 will take the user back to the card he or she was at before going to the credit screen 57.

The menu screen 55 (also shown in FIG. 5a) comprises one card and is provided to allow the user to navigate among the hyperanimator system features. Upon first entering the menu screen 55, the Hyperanimator Navigator 510 greets the user. The menu screen 55 contains seven buttons for accessing the hyperanimator system.

The seven buttons allow the user to: go to the dressing room 59, go to the casting call screen 67, go to the sound booth screen 63, go to the speech sync screen 65, go to the credit screen 57, and quit 513 the hyperanimator system. With the exception of the quit button, the buttons take the user to different cards within the hyperanimator system. The quit button closes hyperanimator and returns the user to the host operating system shell level in the host program. Anytime the user returns to the menu screen 55 from within the hyperanimator system, the HyperAnimator Navigator 510 will greet him or her.

The casting call screen 61 (also shown in FIG. 5b) comprises functions which allow the synactor files to be copied or deleted from memory 39 or placed in the dressing room 59. An appropriate designed button 521, 523 and 535 represents and initiates each of these tasks. Copying a synactor file takes the file resource of a selected synactor from an application program or synactor file and places an exact copy in a destination application program or synactor file. (A synactor file is defined as a file containing synactor resources only.) Placing a synactor into the dressing room 59 (also shown in FIG. 5c) allows the user to edit an existing synactor. The user selects a synactor from an application program or synactor file stored in memory 39. Deleting a synactor removes a selected synactor resource from an application program or synactor file in memory 39. The RAVE driver includes special commands to accomplish the tasks initiated at the casting call screen 61.

The sound booth screen 63 (also shown in FIG. 5f) comprises functions which allow sound resources to be copied or deleted from a file. Sound resources are portions of files which are sequential prerecorded digital representations of actual sound. They are input to the system via digital recording devices and stored as resource files in memory 39. An appropriately identified button 527, 529 initiates these functions. The sound booth screen also provides buttons 531, 533 to allow the user to return to the menu screen 55 and the speech sync screen 65.

The dressing room screen or dressing room 59 begins with an animated sequence (not shown) showing a door opening into a room. The dressing room 59 is used to create new synactors or to edit existing synactors. A user can access the dressing room 59 from the menu screen 55, from any Face Clip Art card 75, from the stage screen 77, from the spotlight screen 79 or from the casting call screen 61. The dressing room proper comprises sixteen cards 71. Placing a synactor into the dressing room 59 places each image 83 of the selected synactor in the synactor easel 85 on the respective cards 71 in the dressing room 59. For example, the REST image 83 is placed on the REST card 87 and the REST button 89 is highlighted. Each synactor will have sixteen images corresponding to respective ones of the sixteen cards 71 of the dressing room 59. Each of the sixteen cards 71 contains two buttons allowing the user to return to the menu screen 55 and go to the stage screen 77. Each of the sixteen cards 71 also includes a button 95 for taking the user to the Face Clip Art menu screen 73. Each of the sixteen cards 71 contain a field 97 at the top informing the user that he or she is currently in the dressing room 59. Each of the sixteen cards 71 includes a representation of a painter's easel called the synactor easel 85. Each of the sixteen cards 71 includes sixteen buttons 72 which represent each of the sixteen cards 71.

With these buttons 72, the user can immediately go to any of the sixteen cards 71 from any of the sixteen cards 71 within the dressing rom 59. For each of the sixteen cards 71, the button that represents itself is highlighted showing the user where they are within the dressing room 59. Each of the sixteen cards 71 has a field 99 which labels which of the sixteen cards it is. The sixteen cards 71 which make up the dressing room 59 are labeled as follows: REST, F, M, R, W, IH, AH, E, AI, A2, A3, A4, A5, A6, A7, AND A8.

The first eight cards deal with specific lip positions which correspond to the sounds of the letters that the cards represent. The last eight cards deal with any type of expression. The first eight cards each contains a picture in the field 99 of representative lips which indicate the lip position corresponding to the letter that card represents. The last eight cards contain the saying "Expressions" because expressions are not predefined (the user can design the expressions as desired; smiles or frowns, for example). The REST card 87 also has a special button 101 which enables the user to copy the image 83 that resides on the synactor easel 85 within the REST card 87 to the synactor easel 85 on every card within the dressing room 59. This button 101 is only present on the REST card 87. Each of the sixteen cards 71 in the dressing room 59 also include a menu 103 which allows access to additional tools such as paint tool or scrapbook applications which the user can manipulate to create or edit synactors. Pressing the stage button 93 on any of the dressing room's sixteen cards will initiate the building and copying of the synactor in the dressing room 59 into a temporary memory (not shown) and take the user to the stage screen 77 to display that synactor. No matter where the user is located within the dressing room 59, pressing the stage button 93 always selects the REST card 87 to begin building and copying the synactor into memory. When building the synactor, the art that is within the frame of the synactor easel 85 on the REST card 87 is selected and copied first. The hyperanimator system then calls on an external command (XCMD) which provides the memory location where that image is stored. The next dressing room card is then selected and the above procedure is repeated. Each of the sixteen dressing room cards is selected in sequence and the art within the frame of the synactor easel is copied. When all of images have been copied, a list of the memory locations for the images is sent to the RAVE driver where a synactor resource is built of those images in memory. At the completion of the synactor resource file building process, the user is transferred to the stage screen 77 to view the synactor thus created.

The stage screen 77, 78, 81 is a display for examining the lip-synchronization of newly constructed synactors. It is entered by pressing the appropriate button 93 found on any of the sixteen cards 71 of the dressing room 59. The stage screen consists of eight cards 77, 78, 81 of which seven are used for animation purposes (not shown). The first five cards 77 show stage curtains opening up. The sixth card 78 (also shown in FIG. 5d) is an open stage 105 where a newly created synactor 107 is displayed.

The stage screen 78 provides a button 109 and a field 111 which allow the user to enter in any text string and see and hear the synactor 107 speak. The "Read Script" button 109 takes the text string entered in the field 11 and calls the RAVE driver to create the animation and speak the text string through the RAVE system. The stage screen 78 contains three buttons 113, 115, 117 allowing the user to return to the menu screen, return to the dressing room, or go on to the spotlight screen 79, respectively, to save the newly constructed synactor 107.

If the user chooses to return to the menu screen, the newly constructed synactor is retired and the HyperAnimator Navigator 510 is returned. If the user chooses to return to the dressing room 59, the two remaining cards 81 in the stage screen are called showing the synactor being pulled from the stage 105 with a stage hook. If the user would like to save the synactor to a destination program or synactor file, the user should click or press on the spotlight screen button 117.

The spotlight screen 79 consists of one card (also shown in FIG. 5e) and allows the user to save a newly constructed synactor as a resource file. A newly constructed synactor exists as temporary data in RAM memory and must be saved permanently to a file or be lost. The spotlight screen 79 provides a field 119 where the user can type in a text string that will be the new synactor's file name. The text string must be one continuous word. The spotlight screen 79 has a "Save Actor" button 121 that allows the user to select a destination program or synactor file to save the newly constructed synactor resource in. If the destination program or synactor file already contains a synactor with the same name as the text file in the spotlight screen field 121, a different name must be selected or the existing synactor file will be lost. After the newly constructed synactor is saved, the user is taken back to the menu screen 55. The spotlight screen 79 also includes two buttons 123, 125 which allow the user to return to the menu screen 55 or to return to the dressing room 59.

Figure 6A:
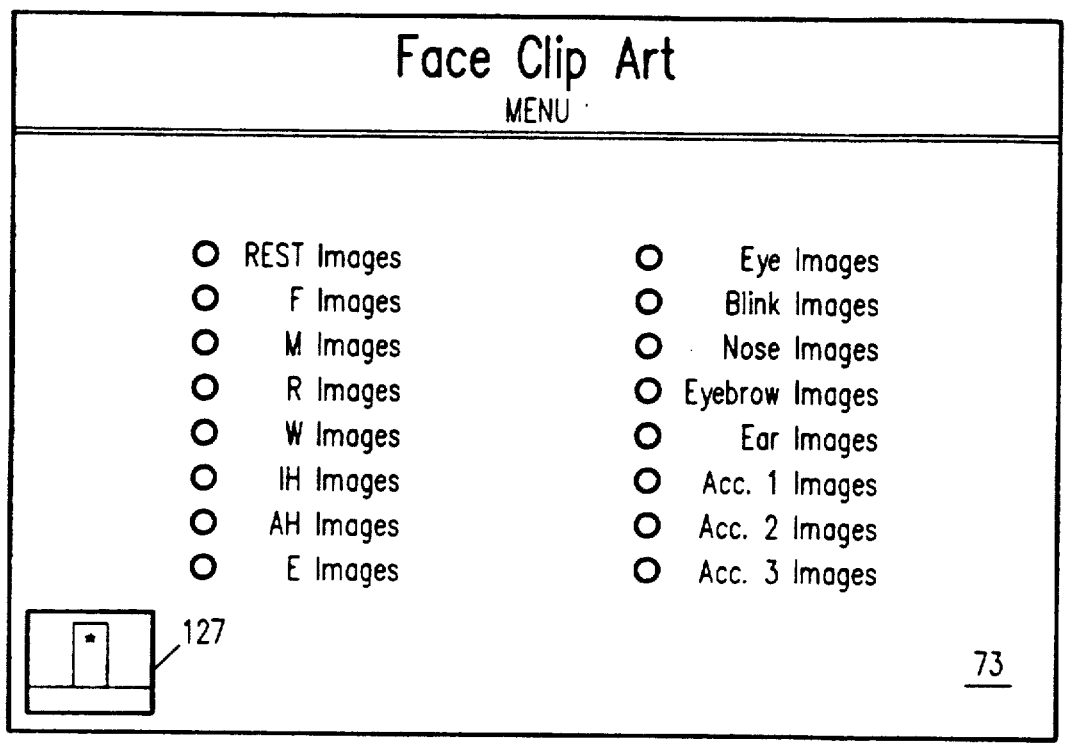
FIG. 6a is a presentation of the Face Clip Art menu screen.
Figure 6B:
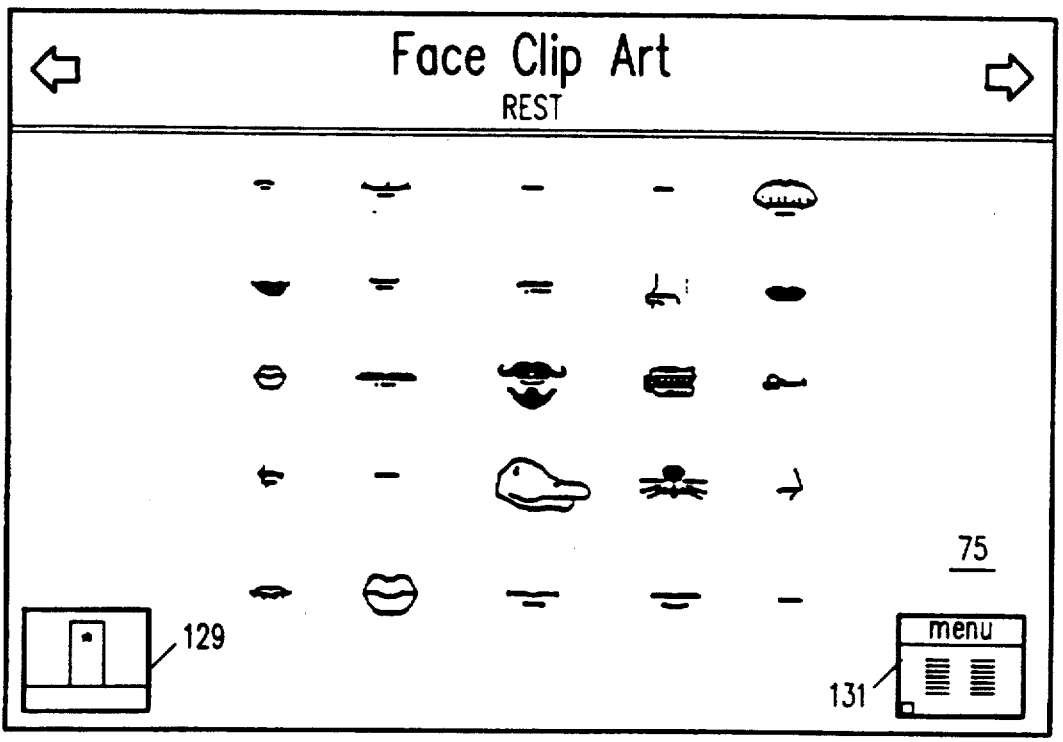
Figure 6C:
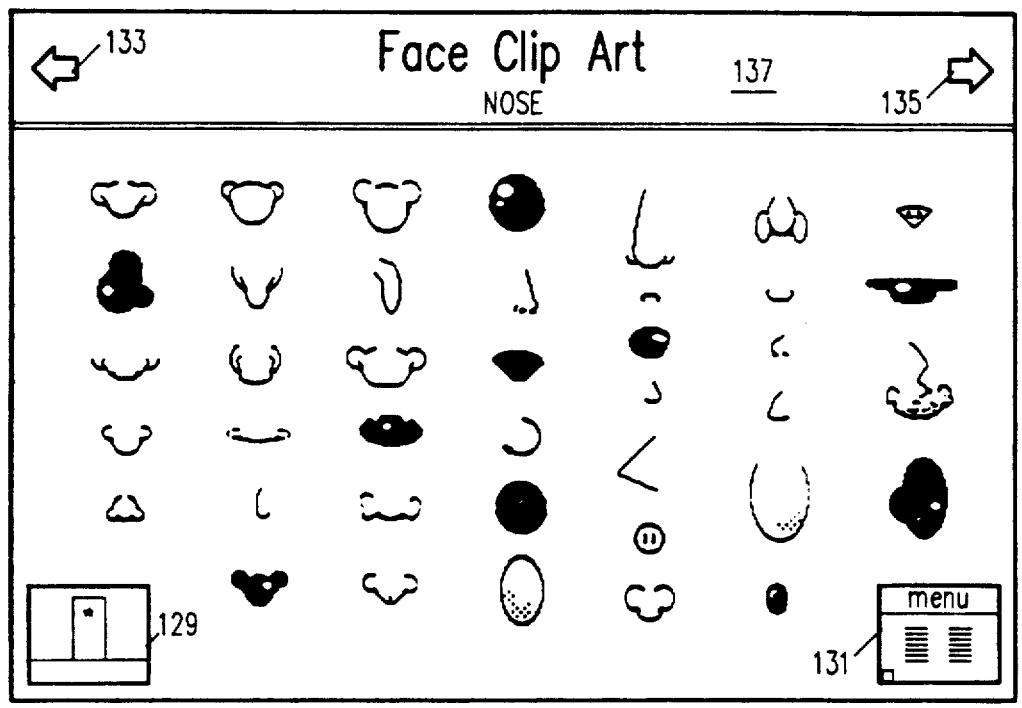

Art which can be used to create synactors is provided within the hyperanimator system in a Face Clip Art screen 73, 75. The Face Clip Art screen comprises seventeen cards; one, shown in FIG. 6a, serves as a menu for navigating among the Face Clip Art cards 75 and the other sixteen cards 75 contain the actual art, examples of which are shown in FIGS. 6b and 6c. The Face Clip Art screen can be entered from any of the dressing room cards 71 through a Face Clip Art button 95. Upon entering the Face Clip Art screen, the user is first taken to the Face Clip Art Menu 73. From the Face Clip Art Menu 73, the user can directly access any of the sixteen cards 75 containing Face Clip Art. The user can also return to the dressing room 59 from the Face Clip Art Menu 73. Each of the sixteen Face Clip Art Cards 75 behaves in a similar manner. Each Face Clip Art Card 75 has a button to return to the dressing room 59. Each Face Clip Art Card has a button to search linearly left through the Face Clip Art Cards and a button to search linearly right through the Face Clip Art Cards. Each Face Clip Art Card also has a button to return to the Face Clip Art Menu card. Each Face Clip Art Card has a title field 137 identifying which of the sixteen types of Face Clip Art it contains.

Each Face Clip Art Card also provides a utility for automatically copying any piece of art into the card of the dressing room where the user was last at before entering the Face Clip Art Screen. The user selects a piece of art by clicking on it with a mouse. The hyperanimator system then takes the user to the dressing room and asks the user to indicate where the art should be placed. The user can then drag the art around within the dressing room card to fine tune its placement. The user then clicks where the art should be placed and the selected Face Clip Art appears.

The sixteen types of Face Clip Art found within the Face Clip Art Section are as follows: the eight lip positions: REST, F, M, R, W, IH, AH, E, Eye Clip Art, Blink Clip Art, Nose Clip Art, Eyebrow Clip Art, Ear Clip Art, Miscellaneous 1 Clip Art, Miscellaneous 2 Clip Art, and Miscellaneous 3 Clip Art. Clicking on an art image while on the REST Clip Art Card allows the user to copy just that REST image, or copy all of the lip positions associated with that mouth.

The tutorial screen 67 consists of one card (shown in FIG. 5h) and is used to introduce the basic RAVE language commands to the user. The tutorial screen 67 is accessed by a button on the menu screen 55. The tutorial screen 67 includes four arrows which are clicked on by the user to introduce four RAVE commands. The HyperAnimator Navigator 510 briefly describes each of these four commands. Additional information about each of the four RAVE commands is provided in a field on the tutorial screen. The tutorial screen contains a button for returning back to the menu screen.

Synthesized speech, as used in the stage cards, is automatically synchronized by RAVE. For digitized sounds, the process of ensuring that the face has the correct lip position at the time the sound is being made is called speech synchronization and is performed in the "speech sync laboratory" represented by the speech sync screen 65. The speech sync screen 65 (shown in FIG. 5g) comprises one card and enables the user to create RAVE RECITE commands. The speech sync screen 65 can be accessed from the menu screen 59 and from the sound booth screen 63. The speech sync screen contains three fields and three buttons. The speech sync screen also contains two buttons allowing the user to return to the menu screen 55 or go to the sound booth screen 63.

The user enters a text string that represents the sound he or she is synchronizing in a first field 535, Text String. A button 537, CONVERT 1, is provided to translate this text string 536 into a phonetic text string 538. The phonetic text string 538 is placed into a Phonetic String field 539. The phonetic text 538 can be modified or edited by the user within the second field 539. A second button 541, CONVERT 2, is provided which allows the user to select which sound resource and file he or she is using. The hyperanimator system then sends the phonetic string along with the location of the sound resource and file to the RAVE driver. The RAVE driver uses this information to automatically create an approximate RAVE RECITE command 542 which is displayed in the Talk Command field 543. The RAVE RECITE command 542 contains all the information that is needed to place the command within the script and have it run properly. The RAVE RECITE command contains the key words, "RAVE" and "RECITE". It also includes the name 544 of the sound resource that is played when the command is issued. The final element of the RAVE RECITE command 542 is the phonetic/timing value string 546.

The phonetic/timing value string 546 contains various phonetic/timing value pairs. The first element of a phonetic/timing value pair is a phonetic code (one or two letters). The second element of a phonetic/timing value pair is an integer number. The phonetic code tells the RAVE driver which face or faces to display according to the sequences and other tables in its precompiled synactor model. The integer number tells the driver how long to display that face on the screen with units comprising time ticks. A tick has a value of approximately 1/60th of a second. Therefore, a timing value of 30 lasts half a second. The RAVE RECITE command 542 is sent from the RAVE driver to the hyperanimator system. The hyperanimator system then puts the RAVE RECITE command 542 into the final field 543 on the speech sync screen, the Talk Command field. The speech sync screen's last button 545, TEST 3, allows the HyperAnimator Navigator 547 to use the RAVE RECITE command found in the Talk Command Field.

The speech sync screen provides the user with three ways to modify the RAVE RECITE command. The user can select any phonetic letter or timing number and delete or replace it with characters/numbers entered from a keyboard 15 (as shown in FIG. 1). If the user changes any timing value, depressing the return key directs the RAVE driver to recalculate the timing values for the entire phonetic/timing value string after the change. Entering a stop character (.) anywhere in the Recite String instructs the RAVE driver to recalculate the timing values for the phonetic/timing value string only up to the stop character. The speech sync screen also allows the user to select any portion of the phonetic/timing value string and hear and see the corresponding portion of the digitized sound and synchronized animation. The user selects at least one entire phonetic/timing value pair and presses the final speech sync screen button 545. This directs the RAVE driver to play the sound and animation for the duration of the selection only. If text is selected from the Text String field 535 and the return key is depressed, the hyperanimator system will select and highlight the corresponding text below in the Phonetic String field 539. Also if text is selected from either Text String field 535 or the Phonetic String field 539 and the return key is depressed, the hyperanimator system will select and highlight the corresponding phonetic/timing value pairs below in the Recite String field 543. Upon leaving the speech sync screen, the hyperanimator system prompts the user to prevent accidental loss of data. The speech sync screen 65 may be enhanced by including additional capabilities to digitizing sounds such as a sound waveform display window and subroutines for editing or tailoring the waveform analogous to the tuning of the phonetic/timing value string described above.

The steps involved in creating a synactor with hyperanimator are summarized as follows. Synactors are created in the hyperanimator system dressing room. Assuming that a user is at the menu screen 55, clicking on the dressing room button will take the user to the REST image card, the first card in the dressing room. The dressing room contains all the tools necessary to create a synactor.

First, the REST image of the synactor is created. After the REST image is created, it can be copied and used as a template for the other fifteen images. A paint tool utility may be used to draw the outline of the synactor within the synactor easel. The paint tool utility is automatically presented when the user first enters the dressing room. Any of the paint tools can be used to create the synactor. The hyperanimator system also provides Face Clip Art which can be used in creating the synactors. Clicking on the Face Clip Art button on any of the dressing room cards transfers the user to the Face Clip Art menu screen. The Face Clip Art menu screen contains sixteen buttons which represent the sixteen cards of Face Clip Art which make up the Face Clip Art screen. Clicking on the Eye Images button transfers the user to the Eye Images card. Clicking on any one of the images provided on this card selects that image and transfers the user back to the dressing room. The hyperanimator system then prompts the user for placement of a copy of the selected image. Clicking anywhere on the dressing room card and the selected image will appear. In a similar manner, art images can also be copied into the dressing room utilizing a standard scrapbook facility.

When the REST image of the synactor is complete, click on the Copy REST to All button. This button will place a copy of the REST image on each of the fifteen remaining dressing room cards. The Copy REST to All button is only found on the first dressing room card. By using the REST image as a template for the other cards, the amount of work required to create a synactor is reduced.

Next, return to the Clip Art Menu screen. Click on the REST Images button. The REST Images card provides a collection of mouths which can be added to the synactor. Select one of the mouths. The hyperanimator system will the user to copy all of the mouth positions. Select All. The hyperanimator system then transfers the user back to the dressing room and copies mouth images on each of the sixteen cards within the dressing room. The correct lip position is matched with and copied on the correct card automatically.

The sixteen buttons located on each card in the dressing room allow the user to go to any dressing room card. Clicking on the A1 button highlights the A1 button and the user is transferred to the A1 expression card. Each expression card is individually created for a desired expression. For example, the user can utilize the paint tool to change the image on the Synactor Easel to make the synactor look as if it is sleeping.

The synactor will be finished when the user completes all of the expression images. The synactor then can be built and placed into a temporary memory file by clicking on the stage button. The stage button is located in the lower right corner of any dressing room card and resembles the stage card.

In a second preferred embodiment of the present invention, the capability and versatility of the dressing room 59 and the speech sync screen 65 have been greatly expanded. Utilizing a relatively small amount of memory, synactor models composed of 16 images (cards), 8 devoted to speaking and 8 devoted to animated expressions can be created. Relaxing the memory restrictions, greatly enhanced synactors, including color synactors, having the following selectable image configurations (speaking/expression image mix) may be created.

TABLE 1

Figure 7A:
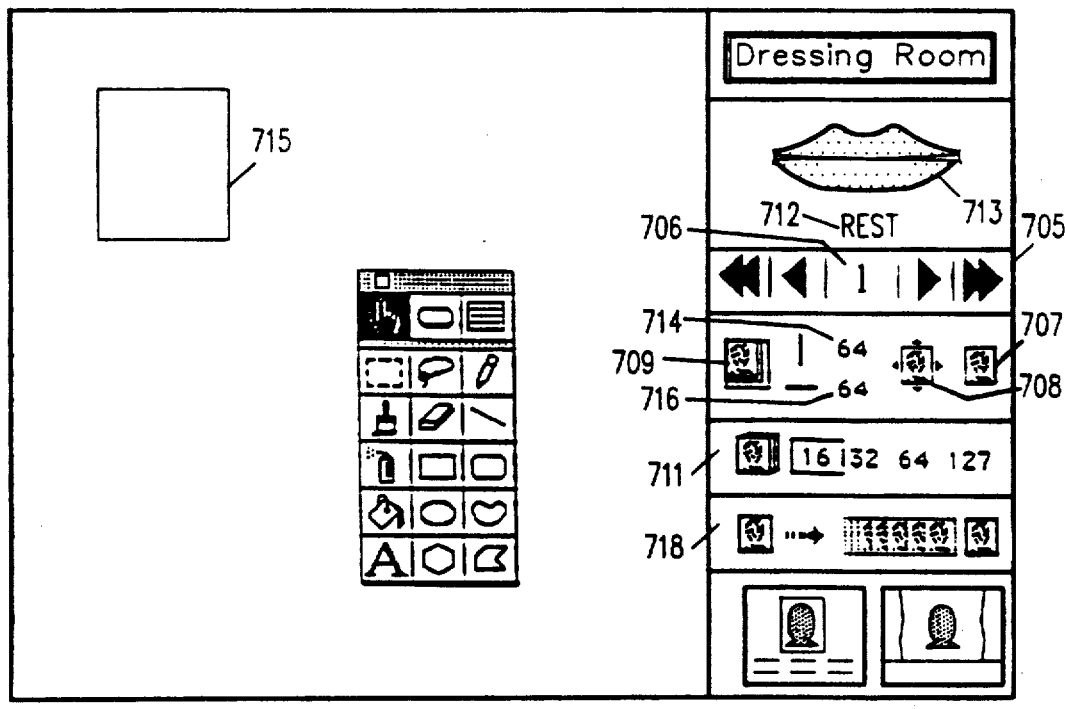
FIGS. 7a and 7b are detailed presentations illustrating the screen layout for a second preferred embodiment of display screens subordinate to the dressing room screen.
Figure 7B:
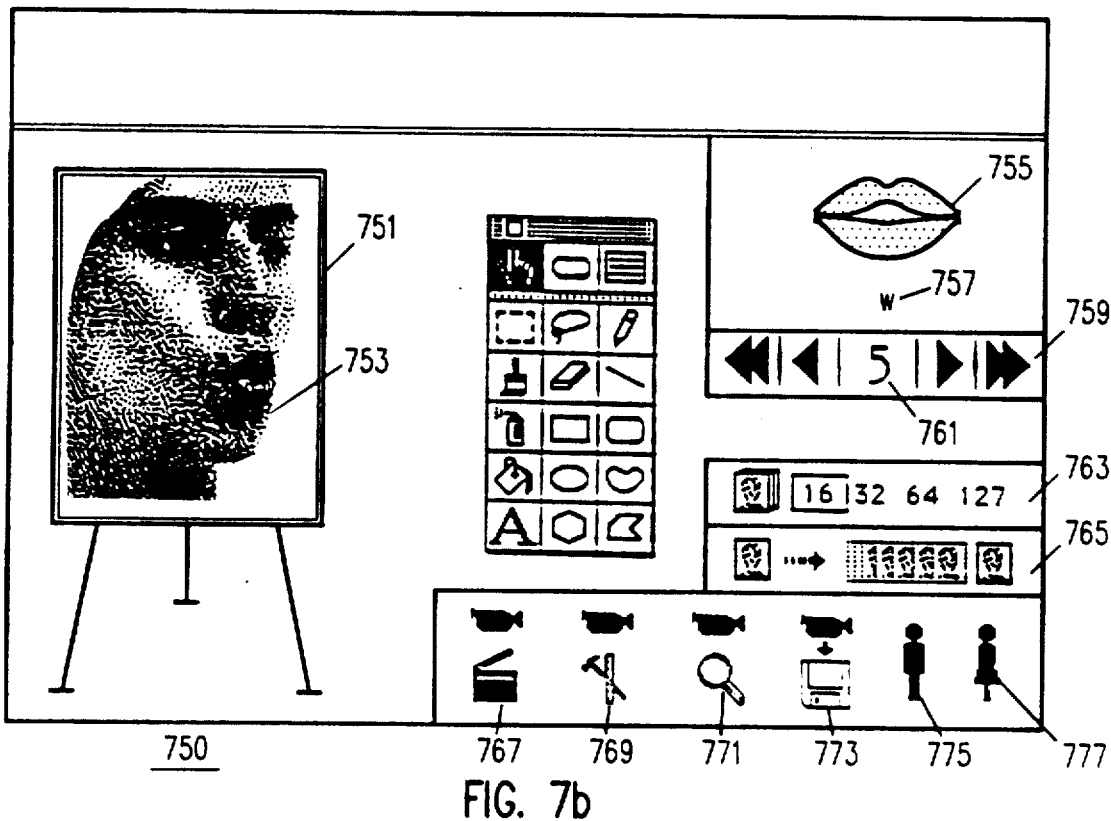
Figure 9:
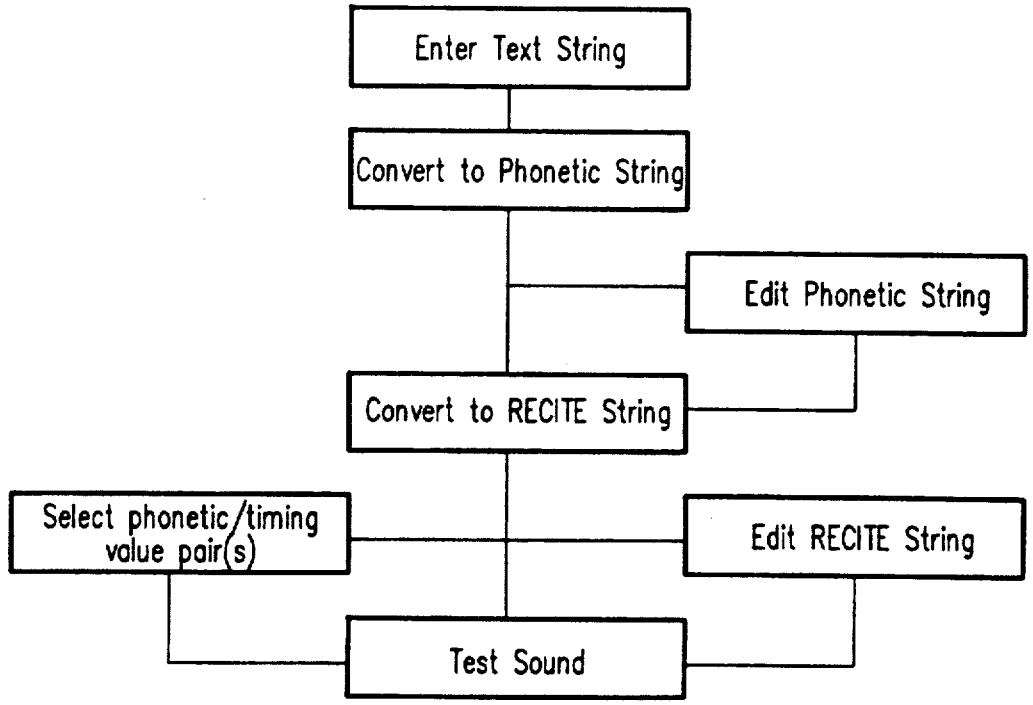
FIG. 9 is a conceptual block diagram illustrating the flow of speech editing and testing during the process of speech synchronization.

1) 8 lip positions/16 total images
2) 16 lip positions/16 total images
3) 8 lip positions/32 total images
4) 16 lip positions/32 total images
5) 8 lip positions/64 total images
6) 16 lip positions/64 total images
7) 8 lip positions/127 total images
8) 16 lip positions/127 total images Referring now to FIGS. 7a and 7b, FIG. 7a is a presentation of the REST card 710 in the dressing room 59 having enhanced capabilities. Since there may be as many as 127 total images of a synactor, there will be a separate card corresponding to each of those images totalling as many as 127 cards. The configuration of a particular synactor, i.e., the number of images and the mix of the images between lipsynch positions and other facial expressions is determined by the setting of the four buttons 711 located on the REST card 710. Pressing any of the four buttons 711 will cause the number of cards in the dressing room to increase, decrease or remain the same depending on its present state. After a particular button 711 is pressed, the number of lipsynch positions, 8 or 16, has to be selected. The key label 712 and image label 713 that describes each card in the dressing room will change as a function of the number of lipsynch positions and total images selected. Each of the combinations shown in Table 1 above represent the selection of a different precompiled prototype synactor model which has been stored in memory 39. Four buttons 705 are provided to allow the user to shift or navigate between the cards. Image number field 706 indicates which card the user is presently located on. Moving between the image cards is accomplished in four ways. Clicking on a single right/left arrow takes the user to the nest/previous card. Clicking and holding on a single right/left arrow flips through the next/previous cards one-by-one. Clicking and holding on double right-/left arrows quickly jumps through the next/previous cards. To jump to a card directly, click on the image field 706, enter a valid image card number and hit return. When a synactor is placed in the dressing room 59 from the casting call screen 61, the dressing room 59 will automatically change its configuration to match the configuration of the selected synactor. The RAVEL code for two of these possibilities is shown in Appendix I and Appendix II. Appendix I is the code for a synactor model having 8 lipsynch positions and 8 other expressions for a total of 16 images. Appendix II is the code for a synactor model having 16 lipsynch positions and 111 other positions for a total of 127 images.

The physical size of a synactor appearing in the dressing room can be changed. The height of a synactor can be any value while the width is limited to 32-pixel boundaries. The synactor palette 715 can be altered in three ways: click on either of the height/width values, 714, 716, respectively, changing the number to the desired value and hit return; click and drag within the synactor palette 715 to move it; click and drag within the lower right hand corner of the synactor palette to change the size of the synactor palette 715. While moving the synactor palette 715, the synactor palette move button 708 will be highlighted to indicate that the mode is active. Clicking in the lower right hand corner of the synactor palette 715 will allow the user to change the size of the synactor palette. While changing the synactor palette 715, the synactor palette zoom box button 709 will be highlighted to indicate that the mode is active.

The elements, Synactor Palette Height Value 714, Synactor Palette Width Value 716, Synactor Palette Zoom Box 709, Synactor Palette Move 708, Synactor Palette Undo 707, Total Image Number 711, and Copy REST to All 718 are all unique to the REST card 710 of the dressing room. Certain actions have a global effect on the dressing room. For example, changing the height of the synactor palette 715 changes the height of the synactor palette for all cards within the dressing room. Because of their global nature, it is important that the above seven elements above be located in a specific and easily accessible location.

Dressing rooms having more extended or exotic features to cover special cases may be utilized. For example, a dressing room could provide enhanced facilities to allow a user to conveniently work with very large or coarticulated synactors. Referring now also to FIG. 7b, for example, a special case dressing room screen 750, referred to as a portrait studio 750, may be utilized for easily handling of synactors comprising digitized video images. The portrait studio screen 750 includes a synactor easel 751 having a current image 753 displayed thereon. A key image 755 which represents the lip position to be scanned along with a phonetic label 757 of that lip position are provided to identify each card (image) in the portrait studio 750 corresponding to the selected synactor 753. Navigation buttons 759 operated in the manner described hereinabove are provided to allow a user to maneuver through the images which make up the synactor; a numeral 761 indicates which card (image) the user is presently in. The number of images involved with a synactor 753 can be varied in accordance with Table 1 above from 16 to 127 utilizing buttons 763. The REST image (not shown) can be copied to all of the other images, i.e., cards, with the COPY REST to ALL button 765. The SCAN IMAGE button 767 scans (digitizes) a desired image and places the image 753 on the current card 750. The BUILD SYNACTOR button 769 creates a synactor from the scanned images. The VIEW SCAN button 771 allows the user to examine and adjust the current scan. The SAVE ACTOR button 773 allows the current synactor to be saved to memory without going through the stage screens 77, 78. The MALE VOICE button 775 allows the current synactor to speak with a previously digitized male voice. The FEMALE VOICE button 777 allows the current synactor to speak with a previously digitized female voice.

Figure 8:
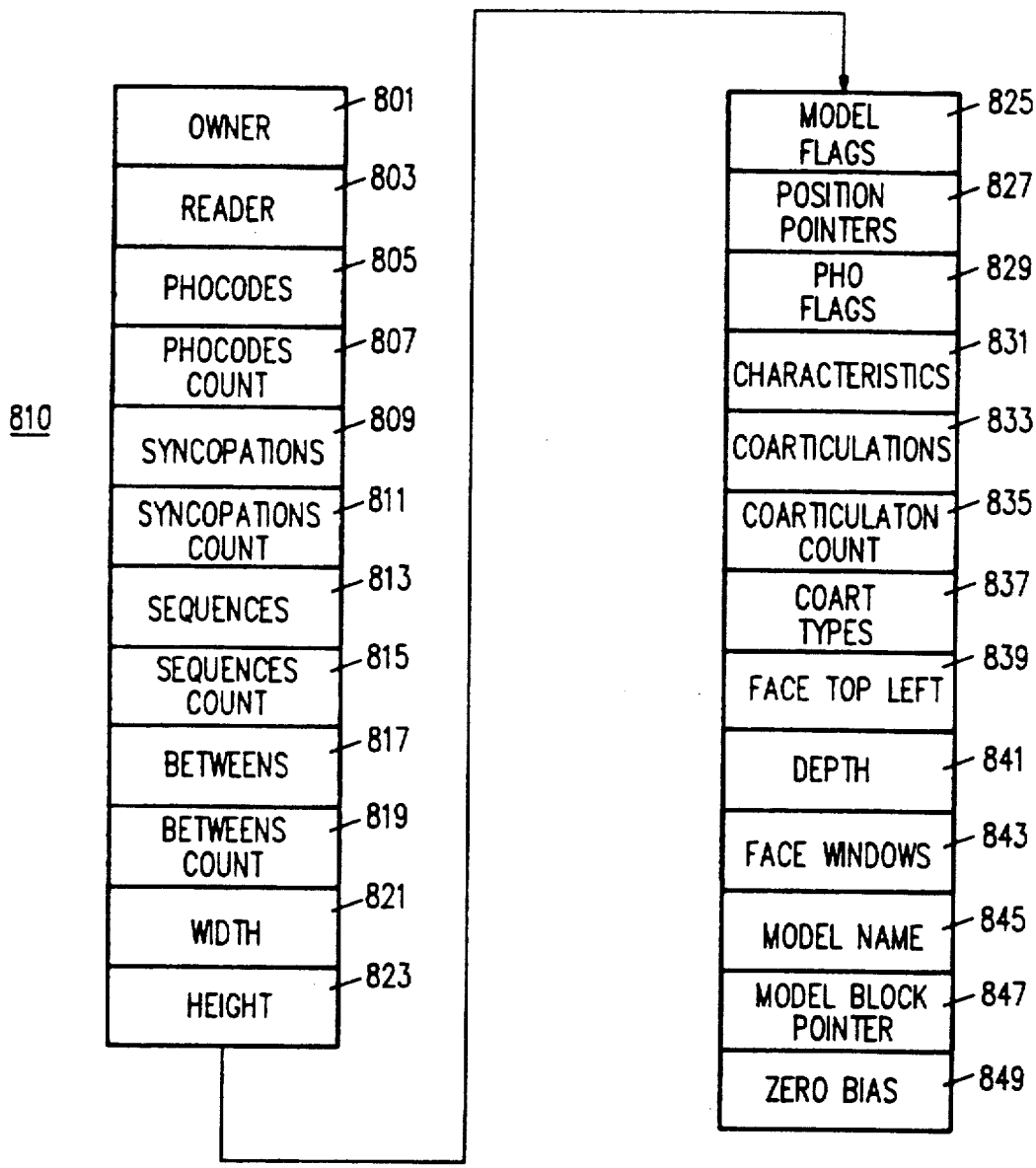
FIG. 8 is a diagram illustrating the fields of a synactor model table record.

Referring now to FIG. 8, a synactor model table 810 is illustrated. A number of internal data structures are compiled from the RAVEL source program and stored in RAM 20 to provide the RAVE with sufficient data to implement its functions. A dynamically allocated synactor model table is the basis for these data structures and contains one ore more synactor model table records 810, one for each synactor model which has been defined. The synactor model table 810 defined for each synactor is included in that synactor's file stored in memory 39.

The first field in each synactor model table record 810 is the Owner field 801. This field contains the synactor model number (as defined in the RAVEL source), or a special code to indicate that this entry is empty (for table management). The next field, Reader 803, points (i.e., specifies the address where the reader table is located) to the reader table for that model. Reader tables consist of a header in which special codes are defined, followed by the rules, stored in compressed concatenated fashion. The next field, phocodes 805, specifies a pointer to the photable for this model. This photable is a lookup table which defines the narrator device characteristics of the synactor model in terms of its speech segment and other codes. Each code has its own record in the photable plus a filler record for phocode zero which is not assigned. The first field in that record specifies the number of bits in that particular narrator device code. The next field lists the bits that are used to define that code to the narrator device, and finally there is a zero terminator. The next entry in the synactor model table, Phocodes Count 807, is the number of records in the photable.

The next field in the synactor model table, Syncopations 809, points to the syncopations table, which describes the sounds necessary to sound out a word. This is a count off table containing one syncopation for each phocode plus a filler record for phocode zero. This count off table is delimited with a dedicated delimiter code after each syncopation string. The next field in the synactor model table, Syncopations Count 811, specifies how many bytes the syncopation table takes up. The Syncopations Count 811 is required for the synactor model table management routines in order to reallocate the table when a model is discarded. The next field in the synactor model table, Sequences 813, points to the sequences table. This is a count off table, counted off by phocode, having a filler entry for phocode zero, separated by a dedicated code, each entry of which specifies the positions and timing values as given for that phocode in the RAVEL source file. Each of the entries in the Sequences table consists of zero or more pairs of values. A zero-length "empty" entry in a count off table is denoted by concatenated separator codes. The first value in each pair is a position number that will index the positions table to find a pointer to a screen image or other synactor animation block (SABLOCK) data for that position; the second value is the time for which it is to be displayed on the screen (it may be displayed for a longer period if necessary to wait for an event). The next field in the synactor model table, Sequences Count 815 specifies the number of bits in the sequences table.

The next field in the synactor model table, Betweens 817, is a pointer to the inbetweens table. This is a linear list of records called inbetween records. Inbetweens are intermediate images which are displayed to smooth the transition between two images. Each has four associated values: The first position number, the second position number; the position number that is to be inserted between those two positions; the Time field for that inbetween, or zero to indicate a default to half the previous time in a synactor animation script (or to zero if the previous time is one cycle or less). This table is not indexed, it is sequentially scanned only. The next field in the synactor model table, Betweens Count 819, specifies the number of records in the inbetweens table. The next two fields, Width 821 and Height 823, specify how large the synactor image is to be on the screen. The next field, Model Flags 825, is used to indicate specialized modes of synactor animation.

The next field, Position Pointers 827, points to the positions table for this synactor model, which is indexed by the position numbers form the other tables to yield pointers to SABLOCKs. The first entry in the positions table is not used. Position number zero is illegal. The next entry, position number one, is dedicated for the initial "at rest" position. Additional position numbers are assigned arbitrarily by the programmer.

SABLOCK data is animation means dependent data. In the preferred embodiment, the SABLOCK contains the data required to generate the screen image of a particular position of the synactor, for example, bitmaps, encoded display values or other parameters for image synthesis. For other embodiments, such as robotic means, the SABLOCK may contain commands to actuators or the like that would move various parts of the robot.

The next value in the synactor model table, PhoFlags 829, points to a table of phocode attribute records indexed by phocode.

The next field in the synactor model table, Characteristics 831, is a pointer to a block specifying the narrator device number for this synactor model, as given in the RAVEL source code, and narrator device dependent data. This would normally contain values for speed, pitch, volume and various other attributes peculiar to a particular narrator device in a format convenient to the audio processor.

The next field Coarticulations 833 is a pointer to a look up table used for determining the different face (position) to be used if a consonant is followed by two different vowels. The lookup value is found using a combination of the phocode index and the vowel that is affecting the phocode. A detailed description of the coarticulation process is given hereinbelow. Coarticulations Count 835 is the number of faces in the above list. Coart Types 837 is a pointer to a lookup table used for determining what effect the given phocode will have on its neighbor.

Face Top Left 839, designates a Point representing the top left coordinates of where the synactor was created in the dressing room. This field is changed dynamically while the synactor is being shown, and will represent the top left coordinate of the synactor after being moved around the screen. These dynamic changes do not affect the permanently stored value of the synactor's dressing room position. The Depth 841 refers to the number of bits per pixel of information that this synactor was created with. Computer monitors have a number of colors dependent on how many bits are used to represent each individual pixel of information. The more bits, the more varieties of color. Face Window 843 is a pointer to the host operating system window structure that is used to mark where the synactor should be drawn. Model Name Handle 845 is a pointer to a pointer to a string holding the name of this synactor and is used with RAVE commands that specify the name of the synactor that a particular command or particular set of commands is to be performed on.

The last two fields refer to the dynamic movement of the synactor from a resource block in memory 39 (such as on a disk) to being active in RAM 20.

The Model Block Pointer 847, is a pointer to this block of information which can be referenced to determine if this synactor has just been read into memory or not. Zero Bias 849: When a synactor is saved as a resource, or a block of information to memory 39, the pointer fields are all set up as offsets to the actual information in the block. When the block is read back into RAM 20, these offsets are all resolved into pointers again, adding the offset values to the model block pointer 851 value in the field described above. This field indicates whether or not this relocation has taken place yet.

Figure 4:
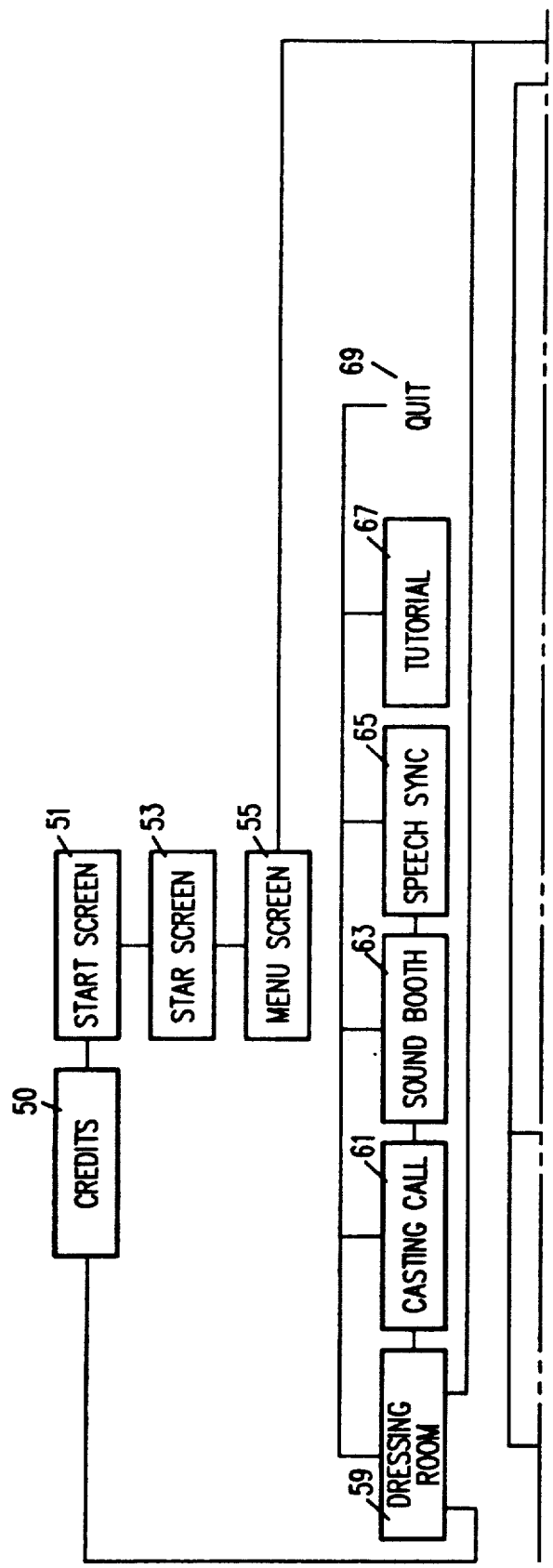
FIG. 4 is a functional block diagram illustrating a hierarchical overview of the Hyperanimator screens.
Figure 4:
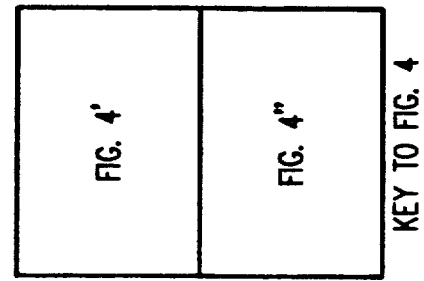
Figure 5A:
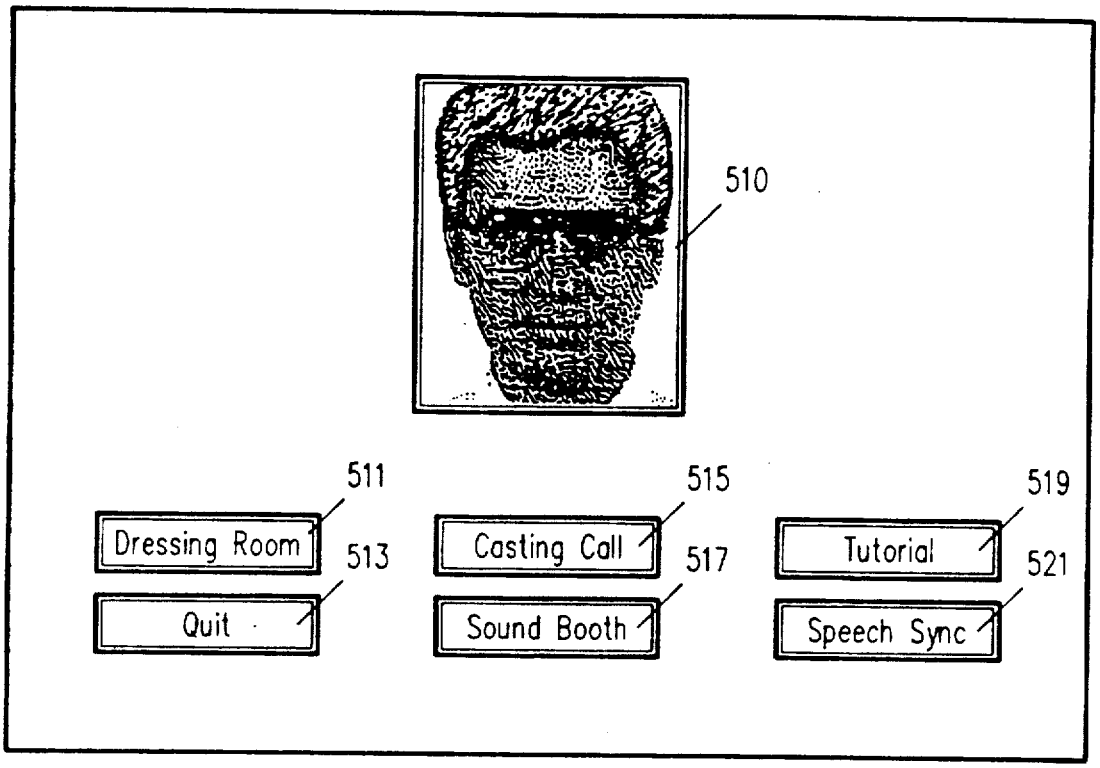
FIGS. 5a-5h are presentations illustrating the screen layout of the display screens corresponding to the major Hyperanimator screens shown in FIG. 4.
Figure 5B:
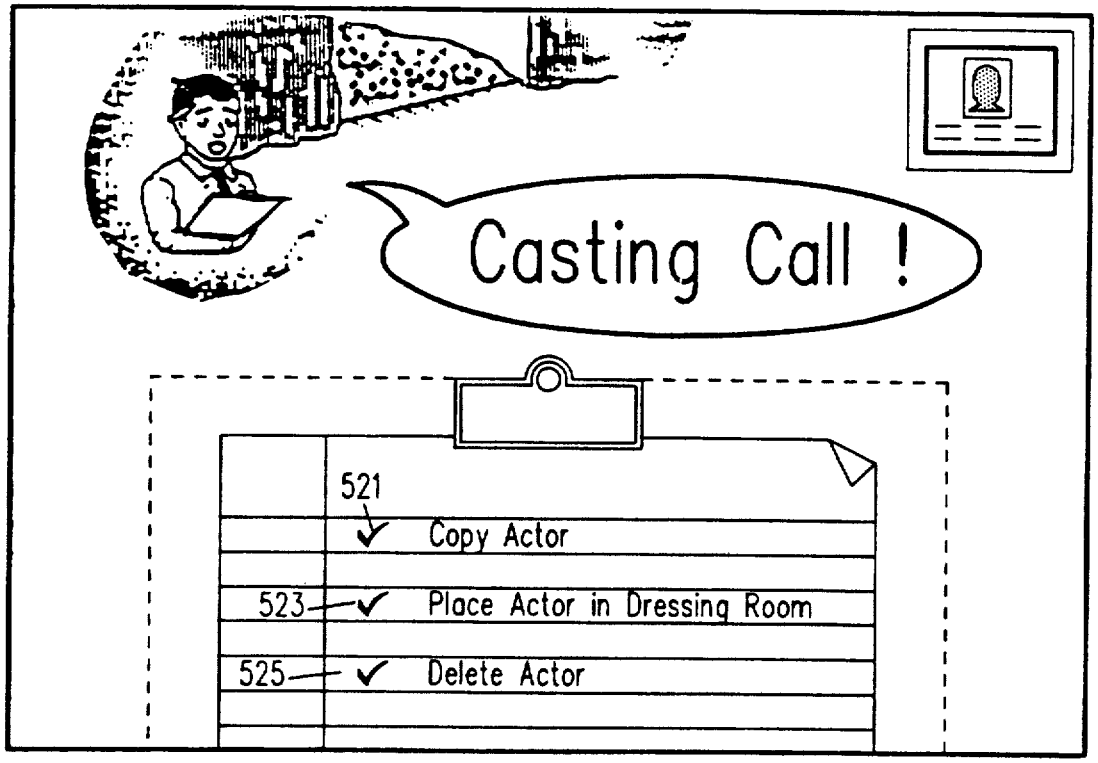
Figure 5C:
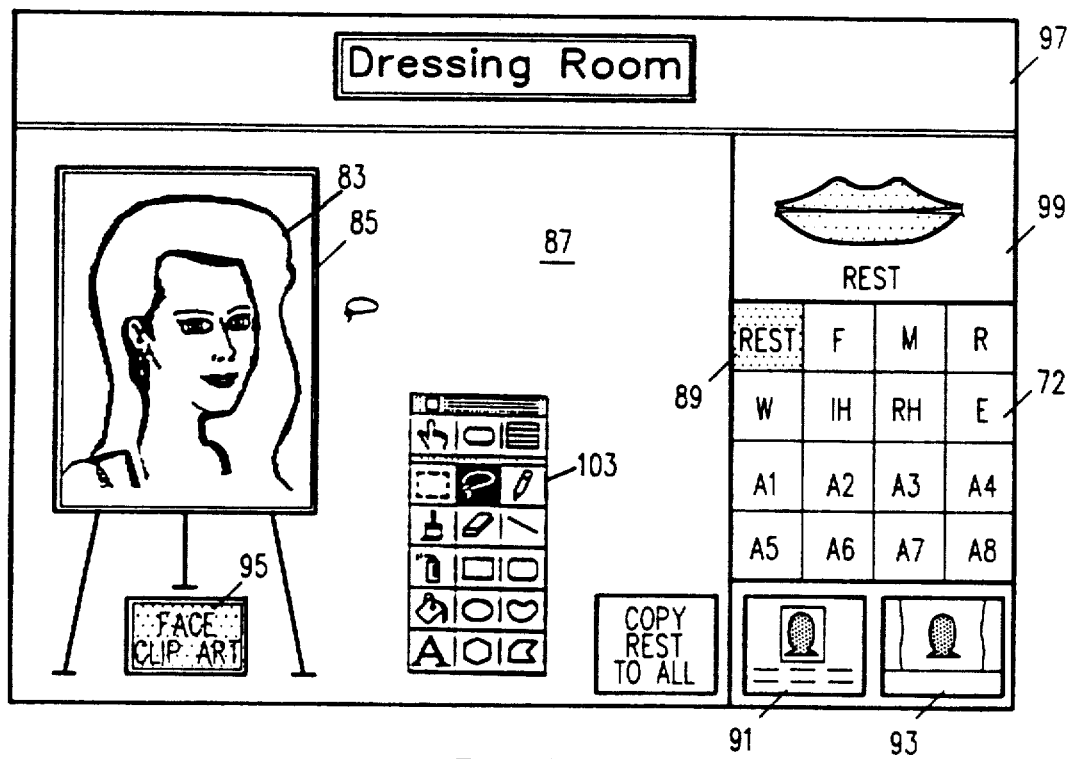
Figure 5D:
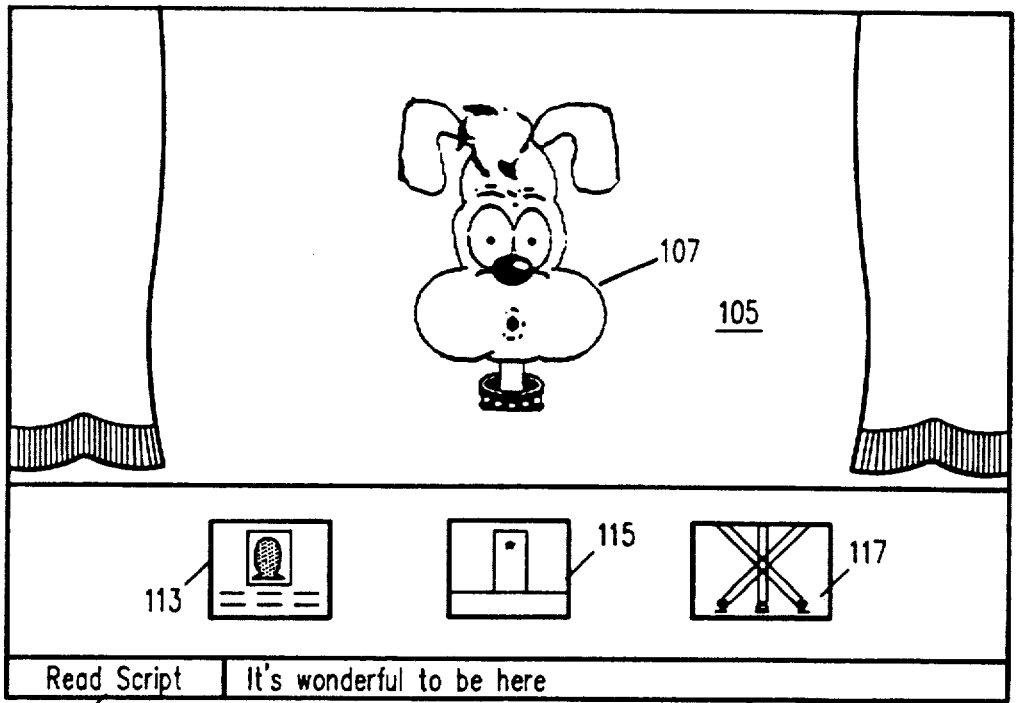
Figure 5E:
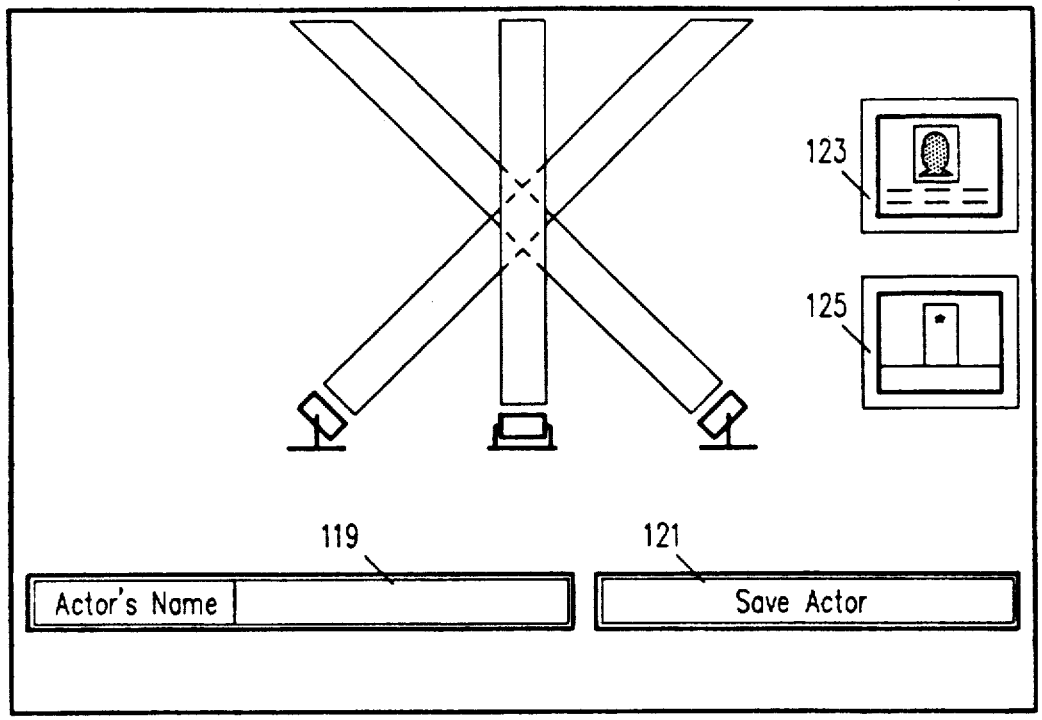
Figure 5F:
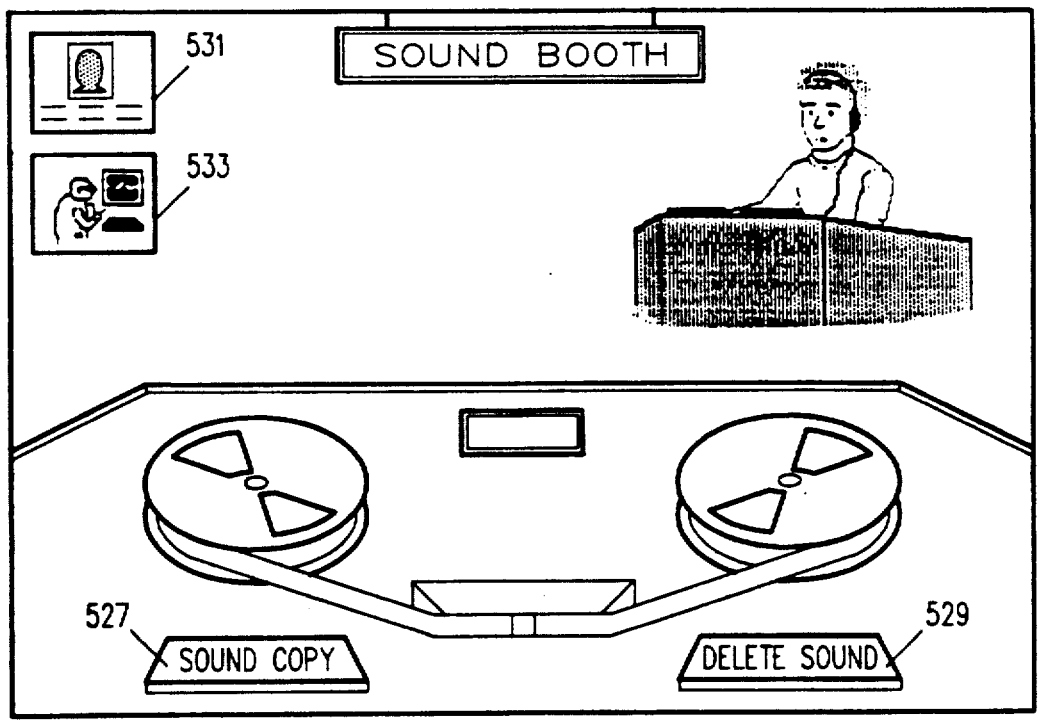
Figure 5G:
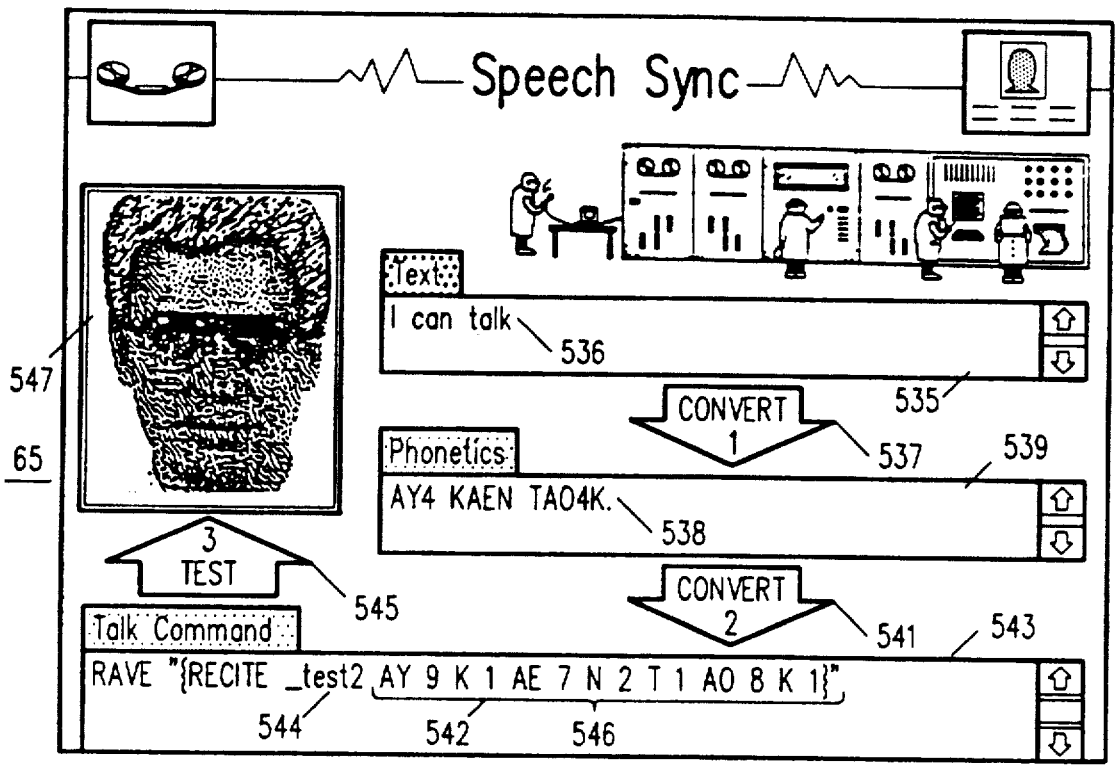
Figure 5H:
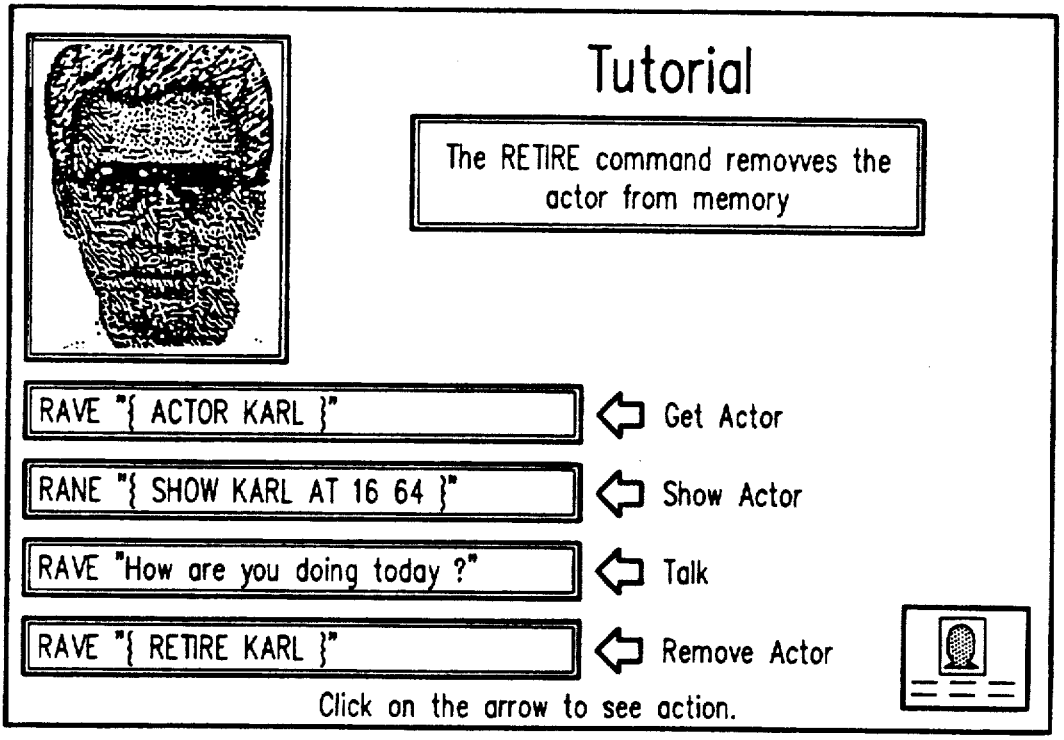

Referring now to FIGS. 9 and 10a-10d, FIG. 9 is a functional block diagram of the processes in the speech sync screen or lab 65 (as shown in FIG. 4). FIGS. 10a-10d are 4 presentations of different speech sync screens illustrating the processes of selecting the text for a synactor to speak, converting to phonetics, selecting the digitized sound to synchronize, adjusting or tuning the timing values and testing the synchronization between the synactor animation and its speech.

The user can choose a synactor to be used for testing when in the speech sync lab. Clicking on the HyperAnimator Navigator provides a dialogue box which prompts the user to type in the name of the new synactor. The named synactor will replace the regular speech sync synactor 1023 (the HyperAnimator Navigator) on the screen. This allows the user to synchronize sounds with any specific synactor or with synactors having different attributes. For example, the HyperAnimator Navigator is an 8/16 synactor. The user may have created a 16/x synactor and want to synchronize speech with its more complicated faces.

Figure 10A:
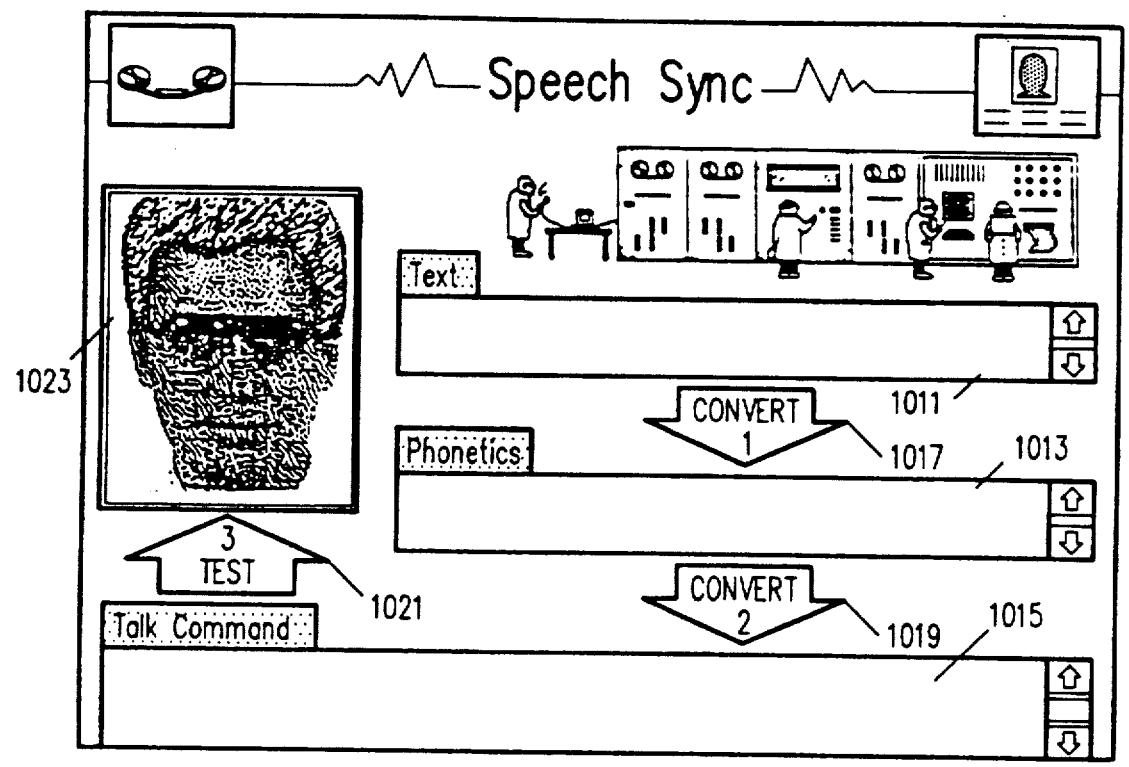
FIGS. 10a-10g are detailed presentations illustrating the screen layout for the speech synchronization process shown in FIG. 9.
Figure 10B:
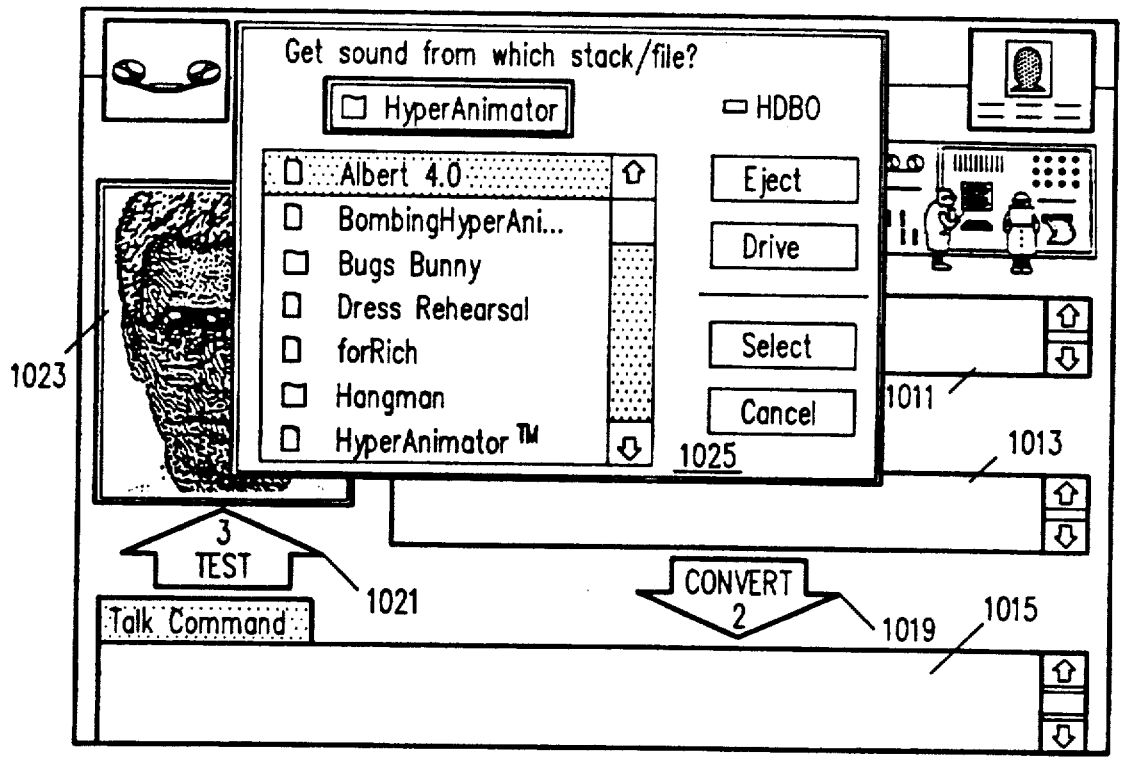
Figure 10C:
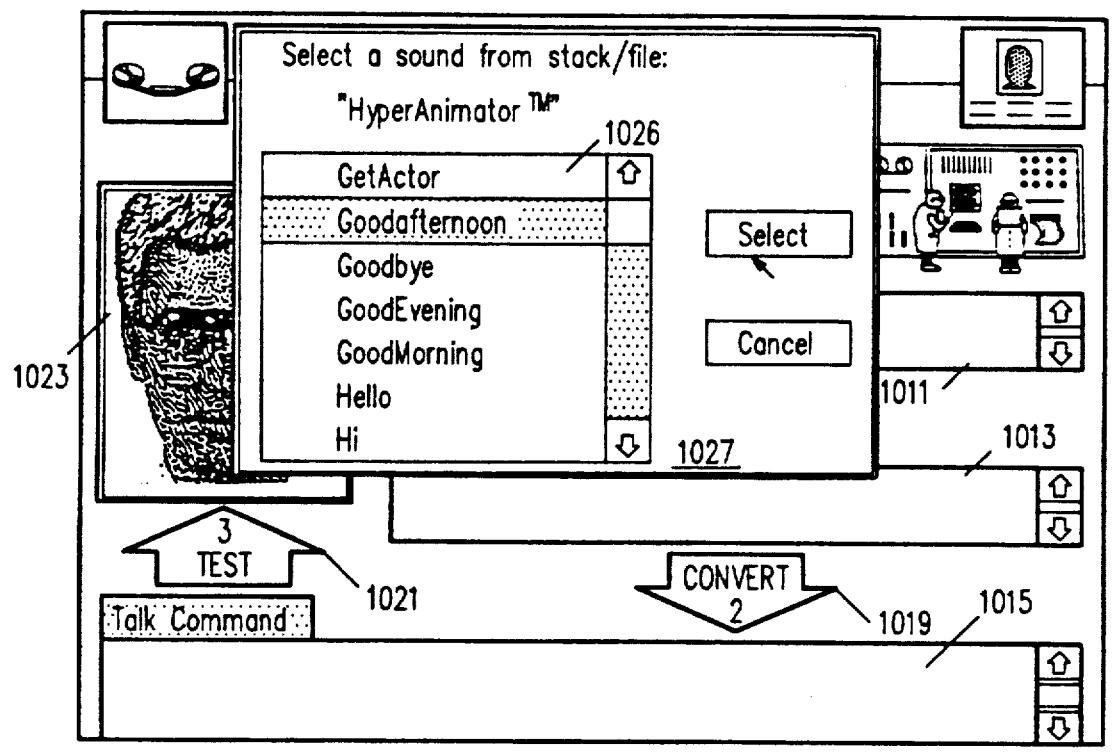
Figure 10D:
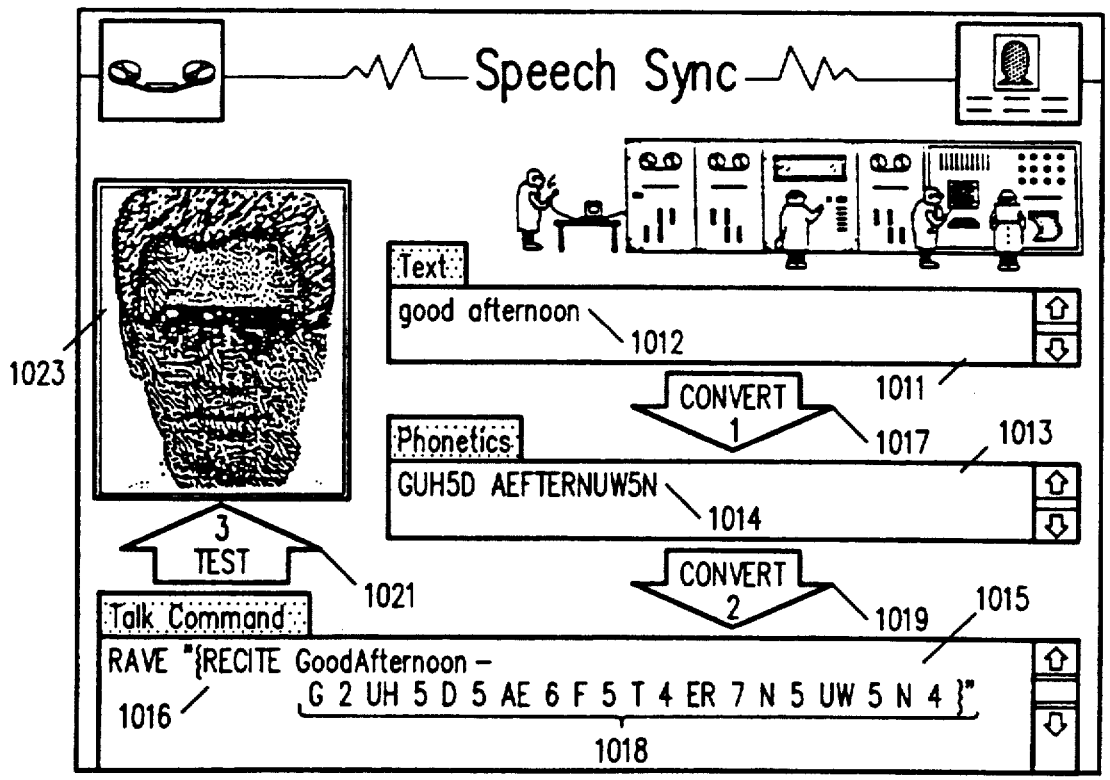
Figure 10E:
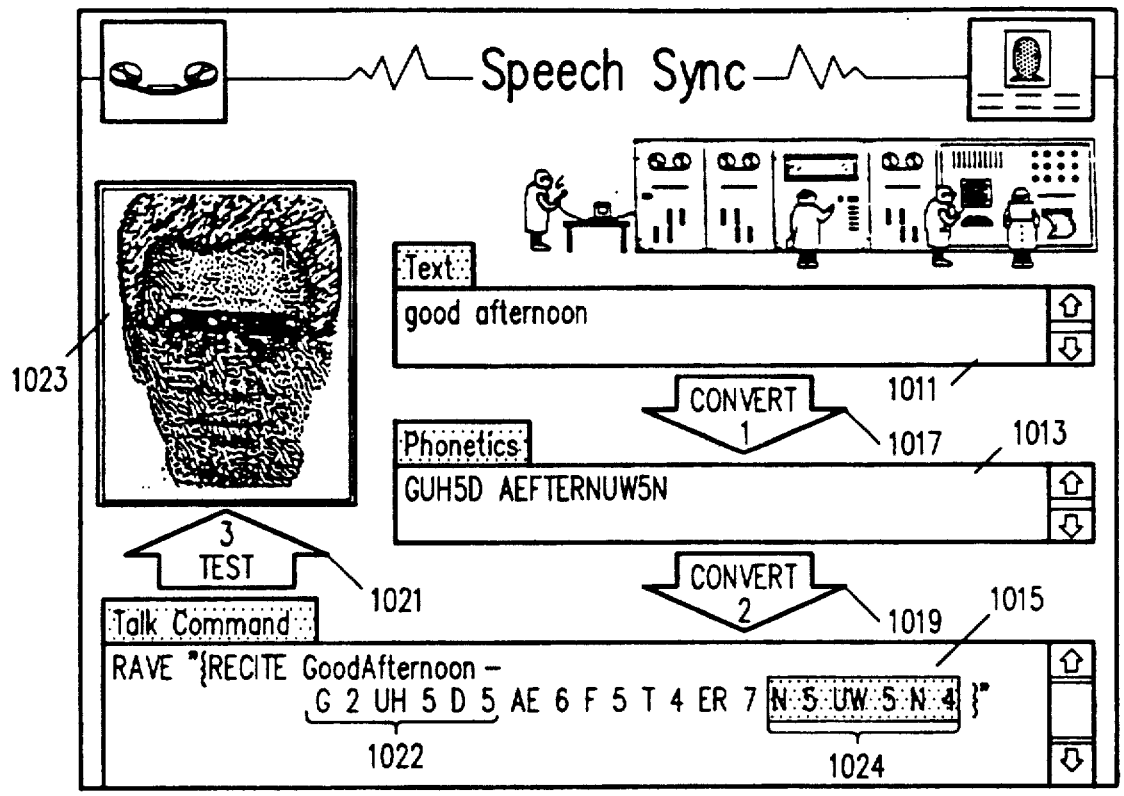
Figure 10F:
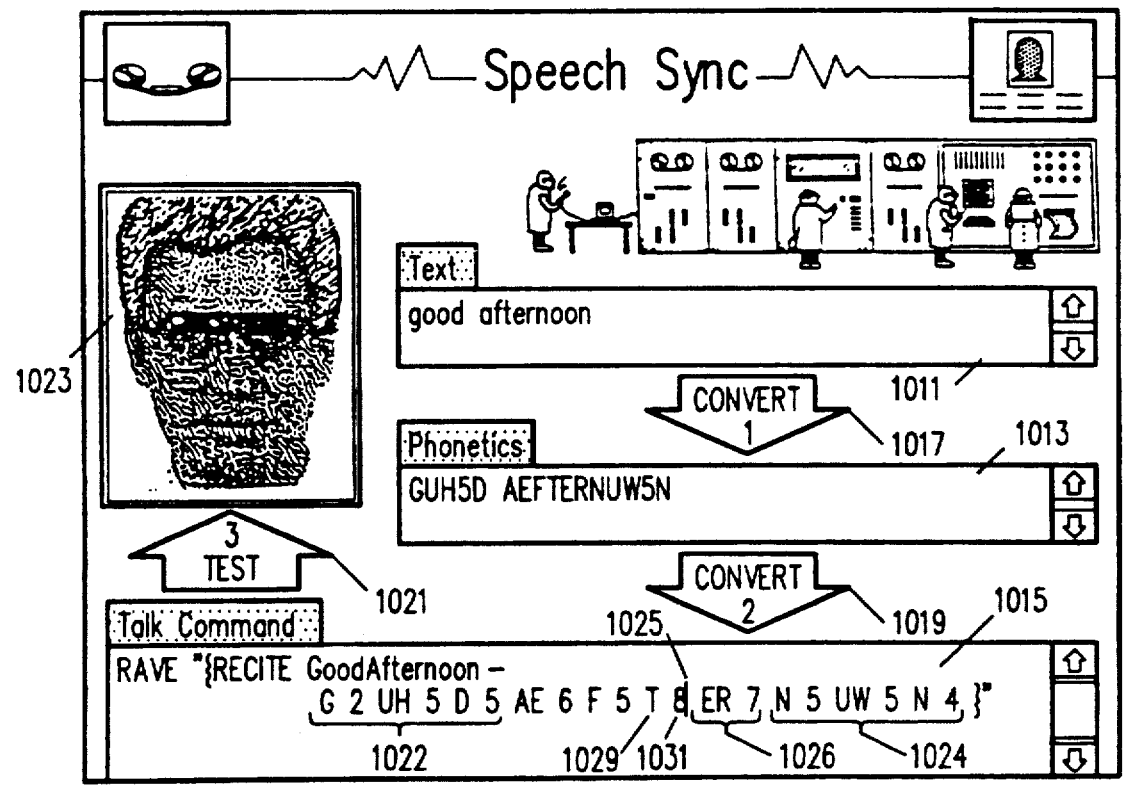
Figure 10G:
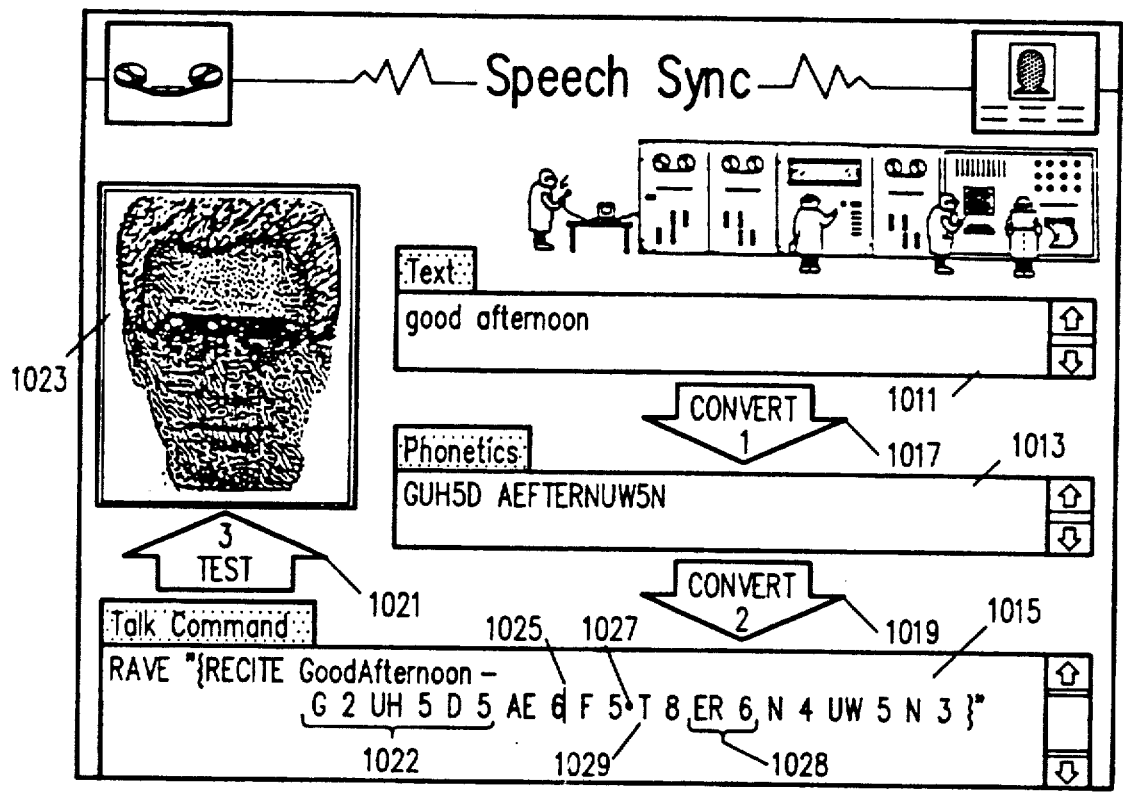

The first step in synchronizing a digitized sound resource from a file is to enter a text string 1012 which represents the sound recorded in the sound file. The text string 1012 is entered in the first field 1011 titled "Text String". Type "Good Afternoon" into the Text String field 1011. Clicking on the CONVERT 1 button 1017 will allow the hyperanimator system to convert a text string into its phonetic translation. The text string 1012 in the Text String field 1011 is converted into a phonetic string 1014 and placed into the Phonetic String field 1013. The phonetic string 1014 looks like this: "GUH5D AEFTERNUW5N". Clicking on the CONVERT 2 button 1019 will allow the hyperanimator system to convert the phonetic string 1014 into a RAVE RECITE string 1016. The hyperanimator system first prompts the user with a directory listing 1025 (as shown in FIG. 10b) to identify the location of the sound resource and file that will be synchronized. The sound file "GoodAfternoon" is located in the hyperanimator program. Select hyperanimator and click on to open. The hyperanimator system then prompts the user with a directory listing 1027 (as shown in FIG. 10c) to identify which sound file is to be used. Select the "GoodAfternoon" sound file 1026 and click on "Select". The phonetic string 1014 in the Phonetic String field 1013 is converted into a RAVE RECITE string 1016 and placed into the Talk Command field 1015. The RECITE string looks like this: RAVE "{RECITE GoodAfternoon G 2 UH 5 D 5 AE 6 F 5 T 4 ER 7 N 5 UW 5 N 4}". Clicking on the Test 3 button 1021 directs the hyperanimator system to execute the RECITE string 1016. The RECITE string 1016 makes the HyperAnimator Navigator 1023 pronounce "Good Afternoon" using the GoodAfternoon sound file 1026 that was selected.

The Recite command string 1018, which appears in the Command Field 1015, consists of a series of phonetic/timing pairs. The timing values attached to each phonetic element are what determine the quality of the animation and synchronization. To allow correction of these values, the hyperanimator system provides three features: one for testing and two for the actually tuning, or adjustment of the timing values. By selecting any portion of the Recite command string 1018, in phonetic/timing pairs, and clicking on the TEST 3 button 1021, that portion of the sound will be pronounced. Using the Speech Sync process, the GoodAfternoon sound can be converted to the following Recite Command 1016: G 2 UH 5 D 5 AE 6 F 5 T 4 ER 7 N 5 UW 5 N 4. If "G 2 UH 5 D 5" 1022 is selected, the animation for "good" will be performed and the corresponding portion of the sound pronounced (i.e., the first 12 ticks of the entire Recite command). If "N 5 UW 5 N 4" 1024 is selected, "noon" will be pronounced. Similarly, if "ER 7" 1026 is selected, "er" will be pronounced. Two features which exist in the speech sync lab for convenient tuning beyond simple editing aid in maintaining the total time value of the strings. When a timing value has been changed and the return key depressed, the amount that the timing value changed will be adjusted throughout the phonetic/timing pairs from the cursor to the end of the Recite command. Additionally, by placing a bullet, "." 1027 between two phonetic/timing pairs, the timing adjustment will be spread between the cursor 1025 and the bullet 1027. Using the same Speech Sync example as above, G 2 UH 5 D 5 AE 6 F 5 T 4 ER 7 N 5 UW 5 N 4, the timing value for the "T" 1029 will be adjusted. First the cursor 1025 is positioned after and adjacent the timing value 1031 for the "T" 1029 and, via the keyboard 15, the initial timing value for the "T" 1029 is changed from "5" to "8" 1031 and the return key depressed, leaving the cursor in position at the "T". The result will be: G 2 UH 5 D 5 AE 6 F 5 T 8 ER 6 N 4 UW 5 N 3. The timing values after the T have been adjusted to make up for the additional time given to the T while maintaining the total time for the string at its original value. While the best results are typically obtained by working from the beginning of the sound string to the end when tuning it, the bullet 1027 feature may be used to hold all changes made to the end and go back to adjust the beginning. In the example given above, when the portion of the command string from the "T" to the end is adjusted, any further changes to the string are blocked by inserting the bullet 1027 before the "T" 1029: G 2 UH 5 D 5 AE 6 F 5 . T 8 ER 6 N 4 UW 5 N 3. Increasing the timing value for the "AE" from 6 to 8 and depressing the return key results in G 2 UH 5 D 5 AE 8 F 3 . T 8 ER 6 N 4 UW 5 N 3. The timing values of the string from the cursor 1025 (at the "AE") to the bullet 1027 have been adjusted to accommodate the increase of the "AE" timing value while maintaining the total string time the same. Clicking on the TEST 3 button 1021 at any point during this process, as long as there is no selection, will test the whole string.

The Speech Sync Lab also provides an easy method for viewing text or phonemes as they have been converted in the following string fields. If text in the Text String field 1011 is selected and return is depressed, the corresponding text will be selected in the Phonetic String field 1013. Similarly, if a phonetic string is selected in the Phonetic String field 1013 and return depressed, the corresponding phonetic/timing value pairs will be selected in the Talk Command field 1015. This feature allows the user to quickly select and highlight word strings and phonetic/timing value pairs to isolate portions of the sound and animation for testing.

Scripts involved in the hyperanimator system Speech Sync Lab are given in Appendix III. These scripts handle screen, mouse and keyboard interactions and simple logic flow and computation with script code routines called handlers. These scripts are activated by specific user actions. Each line of script occupies one line. If more than one line is required, the option-Return character is included indicating that the script continues on the following line. Functions which return data place the data in the variable "it". RAVER is a special example of such a function, called an XFCN. The RAVER and RAVE subroutines access code in the RAVE runtime driver and editing package. The operation of the various RAVE and RAVER commands are described in more detail in Appendix IV.

The CONVERT 1 button sends the text string entered in the Text String field to the RAVER XFCN. The RAVER XFCN command "CONVERT" is responsible for converting text strings to phonetic strings. RAVER returns the resulting phonetic string into a temporary variable. The contents of the variable are then placed into the Phonetic String Field. The script in the CONVERT 1 button first examines the Text String field to make sure it contains text. If there is no text, the user is warned and the cursor is placed in the Text String Field (1 of Appendix III). The script then builds a RAVER CONVERT command by including the text entered in the Text String field. The phonetic conversion is placed in a temporary variable and then placed in the Phonetic String field (2 of Appendix III).

The script in the CONVERT 2 button first examines the Phonetic String field to make sure it contains text. If there is not text, the user is warned and the cursor is placed in the Phonetic String Field. If there is text, the script then checks to see if a sound has been selected. If a sound has not been selected and processed, then the variable SoundName contains the word "empty". If SoundName contains "empty", the script issues a RAVE LOCK command which locks down resources in memory. RAVER is called with an "OPEN-SOUNDFILE" command which produces a dialogue box which is used to select the digitized sound file used for synchronization. The RAVER "OPENSOUND-FILE" command places either the name of a selected sound or "false" into soundName. If a sound was properly selected, the name of a selected sound is placed in soundName. If a sound was not properly selected, "false" is placed in soundName. If a sound was not properly selected, the script must stop executing and exit the mouseUp handler. A RAVER "SYNC-SOUND" command is created with the name of the selected sound which is found in the variable soundName. The RAVER "SYNCSOUND" command loads the sound into memory. If there is a problem with loading the sound into memory, the RAVER "SYNC-SOUND" command places "FALSE" into the variable testFlag. If a sound could not be loaded into memory, the user is warned and the script must stop executing (6 of Appendix III). A RAVER "DIGIMAKE" command is then constructed which contains the phonetic string located in the Phonetic String field. The RAVER "DIGIMAKE" command returns the phonetic/timing value pairs which are a component of a RECITE command. These pairs correspond to the phonetic string that was sent to the RAVER "DIGIMAKE" command. The hyperanimator system then builds a RAVE RECITE command with the returned phonetic/timing values and places it in the Talk Script Field. Because the RAVER "DIGIMAKE" returns only phonetic/timing value pairs, the string "RAVE "{"is added before the pairs and "}"" is added after the pairs.

The script in the TEST 3 button first examines if a selection of text exists in the Talk Command field. If a selection exists, the user wants to see a selection of sound. If a selection does not exist, the user wants to see the entire sound. If a selection exists, the script puts the RECITE string into a temporary variable. The "RAVE "{"and "}"" are stripped from the temporary variable so that only phonetic/timing values remain. The script then finds out how time exists before the selection. The script then finds out how much time is in the selection and checks to make sure the selection is valid. If the selection is not valid, the user is warned and the script stops executing. The script then builds a RAVER "FIRST" command by including the time before the selection, the time in the selection, and the selection itself. The RAVER "FIRST" command makes the Navigator speak the selection.

If there is no selection, the script in the Test 3 button examines the Talk Command field to make sure it contains text. If there is no text, the user is warned and the cursor is placed in the Talk Command Field.

The script of the Test 3 button then tests the RECITE command in the Talk Script field to make sure it follows correct syntax. If the RECITE command in the Talk Script Field is not correct, the script warns the user and stops executing. The RAVE RECITE command is then sent to the RAVE driver where which presents the sound and animation.

If text is selected within the Text String field and the return key is pressed, the hyperanimator system will highlight the corresponding word in the Phonetic String Field. The script of the Text String Field first checks to make sure the Field is not empty. If the Text String Field is empty, the user is warned and the script stops executing (15 of Appendix III). The script of the Text String Field determines the position of the selected word and selects the identical word position in the Phonetic String Field (16 of Appendix III)

If text is selected within the Phonetic String field and the return key is pressed, the hyperanimator system will highlight the corresponding phonetic/timing value pairs in the Talk Script field. The script of the Phonetic String Field first checks to make sure the Field is not empty. If the Phonetic String Field is empty, the user is warned and the script stops executing.

The selected text is placed in a variable and unneeded stress numbers associated with the text are removed from the phonetic string. The script then places the RAVE RECITE string into a temporary variable called tempString. The "RAVE "{RECITE", SoundName, and "}"" are removed from the string and stored in another temporary variable so that tempString contains only the phonetic/timing value pairs. A string containing only the phonemes in the RAVE RECITE string is then constructed.

The selected text is then matched up with the corresponding phonemes in tempString and the starting and ending point of the selected text are marked. If no match was found, the flag FirstStart will contain 0, the user is warned and the script stops executing. Because the starting and ending points indicate phonemes, the number of characters therebetween must be doubled because the final selection will comprises phoneme/timing value pairs. The final selection produced by the script is made by character position within the field. To determine which character to start at and which character to end at the total number of characters in a variable called introString is determined. Five is automatically added to this number to provide for missing spaces and quotes. The total length of the phonetic/timing value portion which was stored in tempString is then found. The total length of the selection of phonetic/timing value pairs is then found. The length of the introString plus the length before the selection marks the position of the first character in the string to select. The beginning character position plus the duration of the selection defines the position of the last character to select.

If the return key is pressed while the cursor is within the Talk Script Field, the hyperanimator system will send the RAVER "SECOND" command which instructs the RAVE driver to recalculate the RECITE String from the cursor's insertion point to the end of the string. If a stop (bullet) character is present within the RECITE String, then only the phonetic/timing value pairs between the cursor position and the stop will be recalculated. The position of the cursor is first determined and then a validity check is made. If a stop character is in the RECITE string, it must not be too close to the cursor insertion point to prevent a proper recalculation of the selection.

The phonetic/timing value pairs between the cursor and the stop character are then determined and the timing values before the cursor summed. The timing values after the stop character are added. A RAVER "SECOND" command is constructed with the totalTime of sound and the string between the cursor and the stop character. The RAVER "SECOND" command returns the modified RECITE command and it is displayed in the Talk Command field.

If there is no stop character, the entire string after the cursor will be recalculated. First, the selected string to be recalculated is created and displayed after the cursor and the timing values for the selected string are summed. A RAVER "SECOND" command is then constructed with the totalTime of sound in the string. The RAVER "SECOND" command returns the modified RECITE command and it is displayed in the Talk Command field.

When the Speech Sync Lab is closed (i.e., the synchronization process has been completed and the user has transferred to another screen), the RAVE commands "CLOSESOUNDFILE" and "UNLOCK" are issued to close the sound resource file that has been opened and place it into memory. These RAVE commands are issued only if a sound has been processed. The variable soundFlag will contain "true" if a sound has been processed.

The RAVE driver comprises two parts each having different functionality. The first driver/functionality is editing of synactors, and editing of the sound synchronization. The second driver/functionality is to bring life to a synactor. Commands for the speech synchronization process are listed in Table 2, below.

TABLE 21

RAVE Scripting Language Commands

| Name | Parameters | Return Value | Other Action |
|---|---|---|---|
| ACTOR | name of actor, coordinate location | none (RAVE) | |
| ACTORINFO | none | actor information | |
| CLOSEACTORFILE | none | none (RAVE) | |
| CLOSESOUNDFILE | none | none (RAVE) | |
| CONVERT | text string | phonetic string | |
| COPY | new/next image number | none (RAVE) | display image |
| DIGIMAKE | sound name, string of phonetic/timing value pairs. | recite string | |
| EDITINFO | none | actor information | |
| EXPRESS | image(s) | none (RAVE) | |
| FIRST | starting point, length of sub-sound, phonetic/timing value pairs | none (RAVE) | talks |
| FREEZE | none | none (RAVE) | |
| HIDE | name of actor | none (RAVE) | |
| INTERMISSION | none | none (RAVE) | |
| LOCK | none | none (RAVE) | |
| MOVE | coordinate location | none (RAVE) | |
| OPENACTORFILE | none | name of actor | dialog |
| OPENSOUNDFILE | none | name of sound | dialog |
| PASTE | current image, number of total images | none (RAVE) | |
| PHONETIC | text string | none (RAVE) | |
| PITCH | integer value | none (RAVE) | |
| RECITE | sound name, phonetic/timing value string | none (RAVE) | talks |
| RETIRE | name of actor | none (RAVE) | |
| SECOND | total before adjust point, phonetic/timing pairs | pho./timing pairs | |
| SHOW | name of actor | none (RAVE) | |
| SPEED | integer value | none (RAVE) | |
| STATUS | none | test string | |
| SYNCSOUND | name of sound | none (RAVE) | |
| UNFREEZE | none | none (RAVE) | |
| UNLOCK | none | none (RAVE) | |
| USE | name of actor | none (RAVE) | |

TABLE 21-continued

RAVE Scripting Language Commands

| Name | Parameters | Return Value | Other Action |
|---|---|---|---|
| ~SPEED 90~ | none | none (RAVE) | |

COPYSOUND: same as copyactor but for sounds
DELETEACTOR: removes the actor after asking user which file to remove it from.
DELETESOUND: same as deleteactor but for sounds.
CURRENT: lets the editor know what the name of the current actor is that has been brought in by the runtime driver
SAVE: saves the current actor to disk.
REVERT: reverts the current actor to the last one that was saved to disk
GO TO IMAGE: causes the image given to become the displayed image
NUMFACES: returns the number of faces and phonemes in the current actor.
SIZE: returns the height, width, and top left position of the current actor.
PASTE: takes the current picture and makes it part of the current actor.
COPY: takes a picture from the current actor and puts it in the clipboard.
COMPILE: creates an actor from a pho file and an image file.
ACTOR: brings the specified actor into memory.
RETIRE: removes the specified actor from memory
EXPRESS: animates the actor by showing the given expression
MOVE: moves the actor to the location specified
HIDE: hides the actor.
SHOW: shows the actor.
RECITE: the actor will speak the given information while the sound is played. The recite command is in phonetics not image indices so it will work with any model
"text": the actor will speak the text using a speech synthesizer.
PITCH: adjusts the pitch of the speech synthesizer.
SPEED: adjusts the speed of the speech synthesizer.
PHONETIC: the actor will speak the phonetic string using the speech synthesizer.
FREEZE: lock the actor to its current position so that may not move when clicked on.
UNFREEZE: allow the actor to be moved by clicking and dragging
LOCK: Sets a flay that requires the actor to remain in memory.
CONVERT: Takes a line of text as its parameter and returns the corresponding phonetic string
OPENSOUNDFILE: Allows the user to select the digitized sound that this text corresponds to. Returns the name of the sound.
SYNCSOUND: takes the name of the sound from opensoundfile as its parameter and anlyzes that sound for length and other characteristics. Establishes that sound as the sound to be used with the Digimake command
DIGIMAKE: takes the sound name and the phonetic string that was the result of the Convert command as parameters. Returns the Recite command string that the user could then use to call rave and have their sound spoken
RECITE: In the context of speech sync, the recite command is used to test the Recite string that resulted from the Digimake command
FIRST: The First command will "recite" only the selected portion of the Recite command string
SECOND: The Second command will assist the user in maintaining the correct total of timing values by recalculating a portion of the recite command
UNLOCK: Unlocks the RAVE actor and allows it to be removed from memory
CLOSESOUNDFILE: Closes the currently open sound file and removes it from the known sound position
OPENACTORFILE: opens a file with an actor.
CLOSESOUNDFILE: closes the currently open actor file
COPYACTOR: asks the user for the file from which to copy the actor, and the file to which to copy the actor, then does it.
INTERMISSION: remove the actor, and the entire driver from memory.
STATUS: returns information about the driver and its living conditions.

The RAVER Command DIGIMAKE takes the sound name and the phonetic string that was the result of the CONVERT command as parameters. It returns the Recite command string that a user can then use to call RAVE and have the sound spoken with synthesized animation.

A preferred embodiment comprising a relatively simple design is described below. Other designs utilizing known methods of speech recognition could be utilized either alone or in combination with the below described phonetic proportionality method. A desired prerecorded, digitized sound resource is called up and its length in time ticks calculated and stored. Then, utilizing a phonetic string that corresponds to that recorded sound, selected text from that sound resource is converted to a list of phocodes.

The phocodes are then looked up in a table of relative timing values which provides a value for how long the associated face or position image for each phonetic code is to be used. The table can be coded in the program or generated from the RAVEL file using extensions to the RAVEL language to be unique to a synactor model. It can thus be used with synactors with varying accents, drawls and other speech mannerisms or languages. An example of such a table is shown in Appendix IV. During the speech synchronization process, this table is utilized to look up timing values for each phocode. Each line in the table represents a phocode and its associated relative timing value. The first line is all null characters and is used as a place holder so that the indexing of phocodes will be useful numbers. The first character is the first letter corresponding to the phocode, the second character is the second letter corresponding to the phocode, if there is one, or an end of string character. The third character in each line is an end of string character for the two letter phocodes or a space filler. The fourth character is the relative timing value associated with that phocode. The last line is again all null to mark the end of the table.

Once the two parallel lists, phocodes and relative timings, and the length of the associated sound have been established, the actual process of synchronizing the speech to the sound is initiated by refining the timing list. This process is illustrated in FIG. 27. The first step is to figure the sum of all the values in the timings list. This sum is then compared to the sound length. The timing value given to each phocode is then adjusted proportionately with the compared sums and rounded to whole numbers. Also, if the total of the timings is less than the sound length, then the timings are decremented until the total of the timings matches the total sound length. If the total of the timings is greater than the total sound length, then the timings are likewise incremented until they match. This is done to deal with cumulative rounding errors because the timings must be integer values so the RAVE real time phase can operate.

If the timing value of the first phocode is within a certain small range, then we split it in half and distribute the resulting amount throughout the other timings. If the timing value is larger than this, we would still decrement it by some, and distribute that to maintain the total of the timings being equal to the sound length. Any phonetics that may have a zero timing value are removed from the list.

The result is a list of phocodes and timing values which represents the synchronization of the faces to the corresponding sound. To create a Recite command, the phocodes are used again to look up the corresponding phonetics. The Recite command will coordinate the actual sound/motion combination. The user can edit the command on the screen to fine tune it, test it, and edit it more until it looks satisfactory. (Editing is particularly useful for unusually-timed speech segments, for example, with one word pronounced more slowly or differently, or with silences or throat clearings not reflected in the text and/or not amenable to speech recognition.) To help a user fine tune the Recite command, the hyperanimator system provides methods to isolate, test, and/or programmatically resynchronize individual portions of the sound and animation to fine tune each by itself. The "FIRST" command uses its parameters, starting point, length of part to be played, and the associated phonetic/timing pairs, to determine which part of sound to play, and then uses the Recite technique to play that subsound with the associated phonetics and their timings. The "SECOND" command strips the previous timing values from the parameter string of phonetic/timing pairs and employs the same system as the Digimake, except that the sound length is decremented by another parameter and the amount of time not included.

For example, the text "the quick brown fox" (1 in Table 3) converts to the phonetic list of "DH, AX, K, 2, IH, K, B, R, OW, N, F, AA, K, S: (2 in Table 3). After looking these up in the timing table, a timing list of "10, 6, 6, 7, 6, 6, 7, 7, 10, 7, 7, 10, 6, 7" (3 in Table 3) is specified for a total of 102 (6 in Appendix VI). If, for example, the speaker has a drawl and the sound length is 105 (5 in Table 3). The result of running through the timing adjustment routine would be "DH 4 AX 7 K 7 W 8 IH 7 K 7 B 8 R 8 OW 9 N 8 F 8 AA 9 K 7 S 8" (4 in Table 3).

APPENDIX VI

1

TEXT: "THE QUICK BROWN FOX"

3

2

| PHOCODE | LOOK UP TIMING | ADJUSTED TIMING |
|---|---|---|
| DH | 10 | 4 |
| AX | 6 | 7 |
| K | 6 | 7 |
| W | 7 | 8 |
| IH | 6 | 7 |
| K | 6 | 7 |
| B | 7 | 8 |
| R | 7 | 8 |
| OW | 10 | 9 |
| N | 7 | 8 |
| F | 7 | 8 |
| AA | 10 | 9 |
| K | 6 | 7 |
| S | 7 | 8 |
| Total | 102 | 105 |

6   5

To create more natural animation, the RAVE driver includes facilities to handle variations in facial positioning that occur as a result of coarticulation. Coarticulatory patterns of speech exist when two or more speech sounds overlap such that their articulatory gestures occur simultaneously. To some extent, this affects practically all natural speech sounds. A major effect is of the lip, jaw, and tongue position of various vowels on the articulator's position for consonant production. A dramatic example of this is to compare the lip configuration in forming the consonant "b" when it is in the following vowel environments: "eebee" vs. "ooboo". There are two major types of coarticulation, both of which are operating at the same time. Inertial Coarticulation is the result of the articulatory apparatus (i.e., lips and face) being a mechanical system, i.e. "mechanical slop". The articulator positions for a previous sound are retained and affect the articulator positions of the next sound. Anticipatory coarticulation is the result of neural control and preplanning for increased efficiency and speeds of articulator movement, i.e., natural articulators are controlled in parallel. The articulator positions for the target sound are affected by the anticipated positions for the next sound.

The RAVEL language is able to handle coarticulation in several ways. The basic method is to provide for the definition of a number of coart types. In most languages, for lifelike animation of synactors three coart types are sufficient: SILENCE, VOWELS, and CONSONANTS. Certain coart variant groups may also be defined. Utilizing these three types in a RAVEL program, the number immediately following the VOWELS command tells the RAVEL compiler the number of coarticulatory groups for the specific synactor and language which is being described. This sets the valid range for all COART commands. For example, in English, for simple models, three coarticulatory groups are typically defined: neutral, retracted, and protruded. The valid coarticulation values then are 1, 2, and 3. 1 will always be the default coarticulation variant for any language. The user can choose which group the 1 will represent.

When the CONSONANTS command is issued in RAVEL, all following phonemes will be assigned the coart type "c", for consonant. The valid COART values are determined by the VOWELS command as described above.

To build the coarticulations table a third operation code has been added to the variable language called COART. For every image and timing synchronization pair there must also be a COART group assigned. This assignment is built into the coarticulations table at the same time that the synchronization pair is built so that there is an explicit one to one relationship between them and that their phocode will reflect this.

All coarticulator variants for any particular phoneme are grouped together in the ravel program in the group sequence order. The first variant is considered the default coarticulatory synchronization. The second through n-th variants are the second through n-th coarticulatory synchronizations for the specific phoneme being defined.

An example of a coarticulated model is given in Appendix V. It is an example of a portion of a RAVEL file that describes the coarticulatory relationship to the image and timing value of phonemes.

Referring now to Appendix V, the coart types are defined. The illustrated model has three coart types:

SILENCE, VOWELS AND CONSONANT. The word "SILENCE" (1), indicates that the following RAVEL lines of phoneme definitions are silent coart types that have no action or sound. The defined silent phonemes (2) follow "SILENCE". The word "VOWELS" (3), indicates that the following RAVEL lines of phoneme definitions are vowel coart types that are used to determine the coarticulatory variant of preceding and following consonants to be used in any syllable. The number "3" (4), indicates the number of coarticulatory variant groups to be used by the language being defined. In the case of English there are three groups: retracted, neutral, and protruded. The phoneme definitions (5) follow "VOWELS". The columns (6) indicate the pronounciation timing and image codes for the VOWEL phonemes. Column 7 indicates the new coarticulation variant group indicator. The coarticulation variant group indicator can have a valid value from 1 to n, n being determined by the number (4) of coarticulation variant groups for the language being defined. The word "CONSONANT" (8), indicates that the following RAVEL lines of phoneme definitions are consonant coart types. For every consonant coart type phoneme there are n phoneme definitions (9), n being determined by the number (4) of coarticulation variant groups for the language being defined. Each of these phoneme definitions for a particular phoneme represent a unique variant of the consonant for one of the coarticulation variant groups. "SILENCE" (10) indicates that the following RAVEL lines (11) of phoneme definitions are silent phonemes. Because these expressions have image and timing values (12) defined they also belong to a coarticulation variant group. Coarticulation variant group 1 (13), is the neutral variant group and should be used for most expression images.

Referring again to FIG. 8, in the synactor model table 810,, Coart types points to the coarticulation type table. This is a count off table, counted off by phocode, having a filler entry for phocode zero each entry of which specifies which coart type. The number of types depends on the model and is input in RAVEL source code. In English three is an appropriate number of types. Each corresponds to whether a phocode is a V(OWELS), C(ONSONANTS), or S(ILENCE). [In the previous patent application V(OWELS) are equivalent to VOWEL EVENT, C(ONSONANTS) are equivalent to EVENT not preceded by VOWEL, and S(ILENCE) is equivalent to non events.] The coarticulation type is used to determine what effect the particular phocode will have on its neighboring phocode in a give string. It is generated by compiling RAVEL source code describing that synactor model.

At runtime, in the enhanced synactor model table, Coarticulations points to the coarticulation table. This is a count off table, counted off by phocode, having a filler entry for phocode zero, separated by a dedicated code, each entry of which specifies the coarticulation group corresponding to each position and timing pair component as given for that phocode in the RAVEL source file.

The coarticulation values range from 1 to n, n being defined by the RAVEL VOWELS command as the number of coarticulation groups for the particular synactor. This value is added to the phocode when looking up position and timing sequences in the sequence table to get the correct sequence for the particular coarticulation in progress.

The process whereby a coarticulated model is determined and applied by RAVE is as follows. First, using the existing text to phonetics converter a text string is converted into a phocode string. This phocode string is decomposed into its string of syllables. To break words into syllables the following rules are sufficient: A syllable contains one vowel surrounded by zero to n consonants on either side. Several simplifications are sufficient to create good coarticulated animation in a three-type, three-group scheme. It is sufficient to assign the coarticulator variant of a consonant that is between two other consonants as that consonant's neutral coarticulatory variant. The coarticulatory variant of a consonant that is between a consonant and a vowel uses the coarticulatory variant as determined by the vowel it is next to. The coarticulatory variant of a consonant that is between two vowels is determined by the vowel following the consonant. More elaborate methods could be constructed to provide much more accurate realism, but are not necessary for this simplified case.

Each syllable is then decomposed into its phocodes. Each phocode is then used to look up its coart Type, (whether it is a vowel, consonant, or silent). Silent phocodes have no coarticulatory sequence and are ignored.

All consonant phocodes preceding the last consonant phocode component immediately preceding the vowel are assigned their neutral coarticulatory synchronization pair. The final consonant phocode component immediately preceding the vowel is determined by the first phocode component of the vowel (anticipatory coarticulation). The coarticulation value of the first phocode component of the vowel is looked up in the coarticulation table. This value minus one is then added to the phocode of the preceding consonant. This new phocode value is then used to lookup the preceding consonant phocode's final component's adjusted coarticulatory synchronization pair. The synchronization pairs for all components of the vowel are then looked up and added to the list. The first phocode component of the consonant immediately following the vowel is determined by the last phocode component of the vowel (inertial coarticulation). The coarticulation value of the last phocode component of the vowel is looked up in the coarticulation table. This value minus one is then added to the phocode of the following consonant. This new phocode value is then used to lookup the following consonant's first component's adjusted coarticulatory synchronization pair. All consonant phocodes following the first consonant phocode component after the vowel are assigned their neutral coarticulatory synchronization pair.

Referring now to FIGS. 11a-11d, animation sequences with (11c and 11d) and without (11a and 11b) coarticulation are illustrated. It demonstrates how coarticulation helps make talking synactors always look their best. Note that the middle positions 1101 for "B" are both the same in 11a and 11b, but are different in the "OOBBOO" of 11c and 11d (positions 1103 and 1105, respectively). This contrast between the coarticulatory effects of the retracted vowel "EE" and the protruded vowel "OO" on the consonant "B" occurs as follows.

The text string "EEBBEE" is decomposed using the existing text to phonetics converter into its phocode string. Each phocode is used as an index to the coart type table to lookup whether it is a vowel, consonant or silent. The first phocode in the phocode string representing the vowel "EE" has a coart type of 'V'. Because there are no consonants before it, no anticipatory coarticulation occurs. The image and timing pair for "EE" is selected and placed at the beginning of the synchronization list.

The second phocode in the phocode string representing the neutral variant of the consonant "B" has a coart type of "C". Because it immediately follows the vowel "EE", inertial coarticulation occurs. The coarticulation for the last component of the vowel "EE" is 2, representing the retracted coarticulation group for the English language. This coarticulation group minus 1 is added to the neutral variant of the consonant "B"'s phocode results in the coarticulatory adjusted phocode for the consonant "B". The coarticulatory adjusted phocode for the consonant "B" is then used to look up the image and timing pair which is added to the end of the synchronization list.

The third phocode in the phocode string representing the neutral coarticulatory variant of the second "B" also has a coart type of "C". Looking ahead, the program determines that the fourth phocode in the phocode string representing the second occurrence of the vowel "EE" has a coart type of "V". This will have an anticipatory coarticulatory effect on the second consonant "B" that precedes it. The coarticulation group for "EE" is 2, representing the retracted coarticulation group for the english language. This coarticulation group minus 1 is added to the neutral variant of the consonant "B"'s phocode resulting in the coarticulatory adjusted phocode for the consonant "B".

Figure 11C:
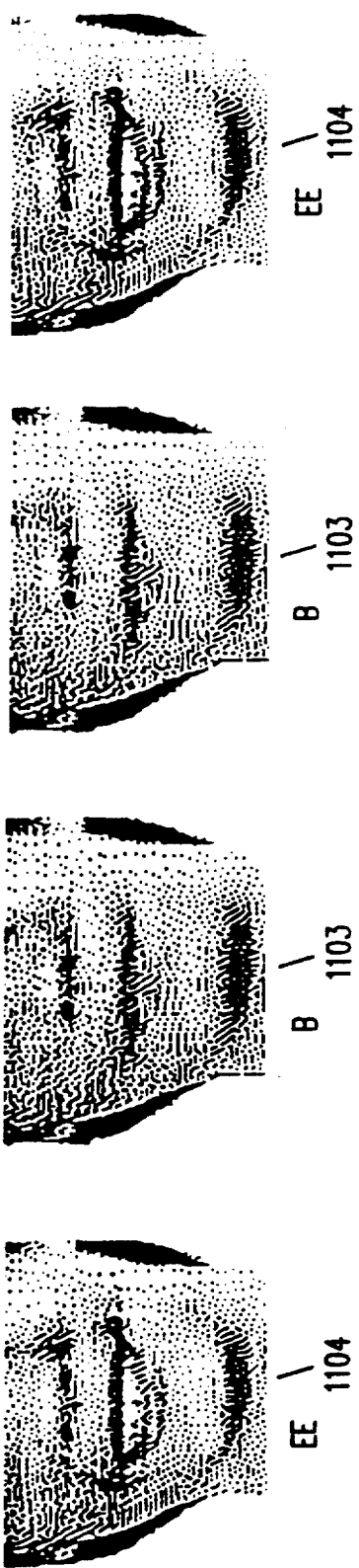

The coarticulatory adjusted phocode for the consonant "B" is then used to look up the image and timing pair representing the consonant "B" when it is immediately affected by a retracted vowel which is added to the end of the synchronization list. Finally, the image and timing pair for the fourth phocode in the phocode string representing "EE" is added to the synchronization list. The images 1103, 1104 in FIG. 11c show the results of processing "EEBBEE".

Figure 11D:
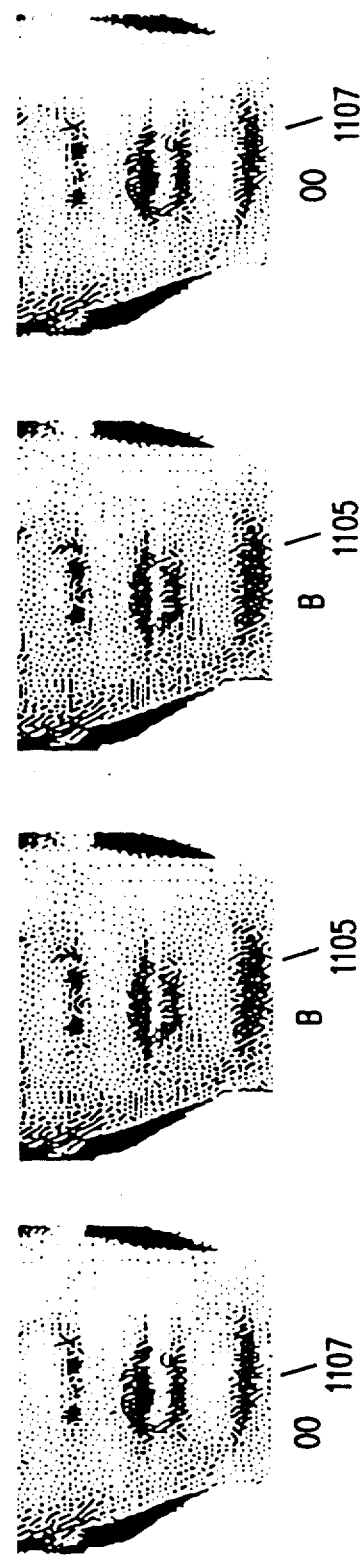

In contrast, the same process for "OOBBOO" would result in the set of images 1105, 1107 of FIG. 11d because the vowel "OO" belongs to the coarticulation group 3, representing the protruded vowels of the English language. The coarticulation group 3 minus 1 is added to the neutral variant of the consonant "B"'s phocode resulting in the coarticulatory adjusted phocode for the consonant "B" which represents the consonant "B" when it is immediately affected by a protruded vowel. Without the coarticulation process being applied to the synchronization selection process the neutral variants of "B" are used which means that both "EE" and "OO" will be displayed using the same image form for the consonant "B" resulting in the images 1101, 1102 and 1101, 1106 shown in FIGS. 11a and 11b, respectively.

APPENDIX I

```
VOICE 6
"1"  "  #"
"2"  "  #"
"3"  "  #"
"4"  "  #"
"5"  "  #"
"6"  "  #"
"7"  "  #"
"8"  "  #"
"9"  "  #"
"#"  "  #"
"."  "  #"
"?"  "  #"
"-"  "  #"  3 1
","  "  #"  3 1
"("  "  #"
")"  "  #"
" "  "  #"
" "  "  #"
"/C" "/CAX #" 1  4
"/H" "/HAX #" 1  4
"A0" "SS  #" 1  1   /* AT REST */
"A1" "SS  #" 1  9
"A2" "SS  #" 1  10
"A3" "SS  #" 1  11
"A4" "SS  #" 1  12
"A5" "SS  #" 1  13
"A6" "SS  #" 1  14
"A7" "SS  #" 1  15
"A8" "SS  #" 1  16
"AA" "AA  #" 1  6
"AE" "AE  #" 1  6
"AH" "AH  #" 1  6

"DX" "DX #" 1  4
"EH" "EH #" 1  8
"ER" "ER #" 1  7
"EY" "EY #" 1  8
"F"  "FAX #" 1  2
"G"  "GAX #" 1  4
"IH" "IH #" 1  8
"IL" "IL #" 5  8  1  4
"IM" "IM #" 5  8  1  3
"IN" "IN #" 5  8  1  4
"IX" "IX #" 1  8
"IY" "IY #" 1  8
"J"  "JAX #" 1  4
"K"  "KAX #" 1  4
"L"  "LXLX #" 1  4
"M"  "MMM #" 1  3
"N"  "NN  #" 1  4
"NX" "NNQXGAX #" 1  4
"OH" "OH #" 1  7
"OW" "OW #" 1  7
"OY" "OY #" 5  7  1  8
"P"  "PAX #" 1  3
"Q"  "Q  #"     1  4
"QX" "QX #"     1  4    /* kluge */
"R"  "RR #" 1  4
"RX" "R  #" 1  4
"S"  "SS #" 1  4
"SH" "SH #" 1  4
"T"  "TAX #" 1  4
"TH" "THAX #" 1  4
"UH" "UH #" 1  7
"UL" "UL #" 5  7  1  4
"UM" "UM #" 5  7  1  3
```

```
"AO" "AO #" 1   6
"AW" "AW #" 5   6   1   7
"AX" "AX #" 1   6
"AY" "AY #" 5   6   1   8
"B"  "BAX #" 1   3
"CH" "CHAX #" 1   4
"D"  "DAX #" 1   4
"DH" "DHAX #" 1   4
```

```
"UN" "UN #" 5   7   1   4
"UW" "UW #" 1   7
"UX" "UX #" 1   7 /* ditto */
"V"  "VAX #" 1   2
"W"  "WUH #" 1   5
"Y"  "YAX #" 1   4
"Z"  "ZZZ #" 1   4
"ZH" "ZHAX #" 1   4
;

LIPPARAMS   160   128   16   16   ;

ENDVOICE "TWOFACE.IMG"
```

APPENDIX II

```
VOICE 6
"1" " #"
"2" " #"
"3" " #"
"4" " #"
"5" " #"
"6" " #"
"7" " #"
"8" " #"
"9" " #"
"#" " #"
"." " #"
"?" " #"
"-" " #" 3 1
"," " #" 3 1
"(" " #"
")" " #"
" " " #"
"_" " #"
"/C" "/CAX #" 1  12
"/H" "/HAX #" 1  12
"A0" "SS #" 1   1    /* AT REST */
"A1" "SS #" 1  17
"A2" "SS #" 1  18
"A3" "SS #" 1  19
"A4" "SS #" 1  20
"A5" "SS #" 1  21
"A6" "SS #" 1  22
"A7" "SS #" 1  23
"A8" "SS #" 1  24
"A9" "SS #" 1  25
"AA" "AA #" 1   6
"AE" "AE #" 1   6
"AH" "AH #" 1   6
"AO" "AO #" 1   6
"AW" "AW #" 5   6   1   7
"AX" "AX #" 1   6
"AY" "AY #" 1   6   1   8
"B"  "BAX #" 1   3
"B1" "SS #" 1  26
```

```
"B2" "SS #" 1  27
"B3" "SS #" 1  28
"B4" "SS #" 1  29
"B5" "SS #" 1  30
"B6" "SS #" 1  31
"B7" "SS #" 1  32
"B8" "SS #" 1  33
"B9" "SS #" 1  34
"C1" "SS #" 1  35
"C2" "SS #" 1  36
"C3" "SS #" 1  37
"C4" "SS #" 1  38
"C5" "SS #" 1  39
"C6" "SS #" 1  40
"C7" "SS #" 1  41
"C8" "SS #" 1  42
"C9" "SS #" 1  43
"CH" "CHAX #" 1   9
"D"  "DAX #"     1  11
"D1" "SS #" 1  44
"D2" "SS #" 1  45
"D3" "SS #" 1  46
"D4" "SS #" 1  47
"D5" "SS #" 1  48
"D6" "SS #" 1  49
"D7" "SS #" 1  50
"D8" "SS #" 1  51
"D9" "SS #" 1  52
"DH" "DHAX #" 1  13
"DX" "DX #" 1  11
"E1" "SS #" 1  53
"E2" "SS #" 1  54
"E3" "SS #" 1  55
"E4" "SS #" 1  56
"E5" "SS #" 1  57
"E6" "SS #" 1  58
"E7" "SS #" 1  59
"E8" "SS #" 1  60
"E9" "SS #" 1  61
"EH" "EH #" 1   8
"ER" "ER #" 1   7
"EY" "EY #" 1   8
"F"  "FAX #" 1   2
"F1" "SS #" 1  62
"F2" "SS #" 1  63
"F3" "SS #" 1  64
"F4" "SS #" 1  65
"F5" "SS #" 1  66
"F6" "SS #" 1  67
"F7" "SS #" 1  68
```

```
"G4" "SS #" 1  74
"G5" "SS #" 1  75
"G6" "SS #" 1  76
"G7" "SS #" 1  77
"G8" "SS #" 1  78
"G9" "SS #" 1  79
"H1" "SS #" 1  80
"H2" "SS #" 1  81
"H3" "SS #" 1  82
"H4" "SS #" 1  83
"H5" "SS #" 1  84
"H6" "SS #" 1  85
"H7" "SS #" 1  86
"H8" "SS #" 1  87
"H9" "SS #" 1  88
"IH" "IH #" 1  8
"IL" "IL #" 5  8  1  14
"IM" "IM #" 5  8  1  3
"IN" "IN #" 5  8  1  11
"IX" "IX #" 1  8
"IY" "IY #" 1  8
"J"  "JAX #" 1  9
"J1" "SS #" 1  89
"J2" "SS #" 1  90
"J3" "SS #" 1  91
"J4" "SS #" 1  92
"J5" "SS #" 1  93
"J6" "SS #" 1  94
"J7" "SS #" 1  95
"J8" "SS #" 1  96
"J9" "SS #" 1  97
"K"  "KAX #" 1  4
"K1" "SS #" 1  98
"K2" "SS #" 1  99
"K3" "SS #" 1 100
"K4" "SS #" 1 101
"K5" "SS #" 1 102
"K6" "SS #" 1 103
"K7" "SS #" 1 104
"K8" "SS #" 1 105
"K9" "SS #" 1 106
"L"  "LXLX #" 1  14
"L1" "SS #" 1 107
"L2" "SS #" 1 108
"L3" "SS #" 1 109
"L4" "SS #" 1 110
"L5" "SS #" 1 111
"L6" "SS #" 1 112
"L7" "SS #" 1 113
"L8" "SS #" 1 114
"L9" "SS #" 1 115
"M"  "MM #" 1  3
"M1" "SS #" 1 116
"M2" "SS #" 1 117
"M3" "SS #" 1 118
"M4" "SS #" 1 119
"F8" "SS #" 1  69
"F9" "SS #" 1  70
"G"  "GAX #" 1  4
"G1" "SS #" 1  71
"G2" "SS #" 1  72
"G3" "SS #" 1  73
"M5" "SS #" 1 120
"M6" "SS #" 1 121
"M7" "SS #" 1 122
"M8" "SS #" 1 123
"M9" "SS #" 1 124
"N"  "NN #" 1  11
"N1" "SS #" 1 125
"N2" "SS #" 1 126
"N3" "SS #" 1 127
"NX" "NNQXGAX #" 1  4
"OH" "OH #" 1  7
"OW" "OW #" 4  6 1 7
"OY" "OY #" 5  7 1 8
"P"  "PAX #" 1  3
"Q"  "Q #"      1  12
"QX" "QX #"    1  4    /* kluge *
"R"  "RR #" 1  16
"RX" "R #"  1  16
"S"  "SS #" 1  10
"SH" "SH #" 1  9
"T"  "TAX #" 1  11
"TH" "THAX #" 1  13
"UH" "UH #" 1  7
"UL" "UL #" 1  7 1 14
"UM" "UM #" 1  7 1 3
"UN" "UN #" 1  7 1 11
"UW" "UW #" 1  7
"UX" "UX #" 1  7  /* ditto */
"V"  "VAX #" 1  2
"W"  "WUH #" 1  5
"Y"  "YAX #" 1  15
"Z"  "ZZZ #" 1  10
"ZH" "ZHAX #" 1  9
;

LIPPARAMS   160  128  16  16  ;

ENDVOICE "FACE127.img"
           :
```

APPENDIX III

Script of card button id 22 = "convert1"

on mouseUp

```
--------------------------------------------------------
--  Make sure that a word string has been entered before  --
--  entering.  If not, warn user and exit.                --
-------------------------------------------------------- if card field "wordString" is empty then          ⎫
    beep                                            ⎪
    answer "No Text Entered." with "OK"             ⎪
    get location of card field "wordString"         ⎬ 1
    subtract 8 from second item of it               ⎪
    click at it                                     ⎪
    exit mouseUp                                    ⎪
  end if                                            ⎭ hide card field "phoneticString"

--------------------------------------------------------
--  The RAVER XFCN is responsible for converting a word string  --
--  to a phonetic string.                                --
-------------------------------------------------------- put RAVER ("|-CONVERT "&card field "wordString"&"-|") into temp ⎫ 2
  put temp into card field "phoneticString"                       ⎬
  show card field "phoneticString"                                ⎭
end mouseUp
```

Script of card button id 23 = "convert2"

```
on mouseUp
  global soundName
  global soundFlag

--------------------------------------------------------
--  Make sure that a phonetic string has been entered before  --
--  entering.  If not, warn user and exit.               --
-------------------------------------------------------- if card field "phoneticString" is empty then       ⎫
    beep                                             ⎪
    answer "No Phonetic Text Entered." with "OK"     ⎪
    get location of card field "phoneticString"      ⎬ 3
    subtract 8 from second item of it                ⎪
    click at it                                      ⎪
    exit mouseUp                                     ⎪
  end if                                             ⎭

--------------------------------------------------------
--  Speech Sync will allow only one sound file to be processed  --
--  per visit.  If no sound has been processed, then open and   --
--  set flags accordingly.                               --
-------------------------------------------------------- if soundName = "empty" then  ——— 4
    RAVE "|LOCK|"
    put RAVER("|OPENSOUNDFILE|") into soundName
    put "true" into soundFlag          ⎫
    if soundName = "FALSE" then        ⎪
      put "empty" into soundName       ⎬ 5
      put "false" into soundFlag       ⎪
      exit mouseUp                     ⎭
    end if
    put RAVER ("|-SYNCSOUND "&soundName&"-|") into testFlag ⎫
    if testFlag = "FALSE" then                              ⎪
      answer "Unable to load sound." with "OK"              ⎬ 6
      put "empty" into soundName                            ⎪
      exit mouseUp                                          ⎭
    end if
  end if
```

```
-----------------------------------------------------------------
--  Create the RECITE phonetic string and place it into the    --
--  HyperTalk Command field. This string can be cut and pasted --
--  into any HyperCard stack.                                  --
----------------------------------------------------------------- hide card field "reciteString"
    put 100 into number
    put "|-DIGIMAKE "&number&&card field "phoneticString"&"-|" into junk   — 7
    put RAVER (junk) into temp
    put temp into card field "test"              ⎫
    put "RAVE ""e&"|" before temp            ⎬  8
    put "|""e after temp                     ⎪
    put temp into card field "reciteString"      ⎭
    show card field "reciteString"
end mouseUp
                    script of card button id 24    "test"

on mouseUp
  global soundName
  global soundFlag put "0123456789" into numTest1
  put " 0123456789" into numTest2
  put 0 into beforeTime
  put 0 into stringTime if the number of characters in the selection is not 0 then          ⎫
    if (first char of the selection is not in numTest1) and           ⎪
    (last char of the selection is in numTest2) then                  ⎪
      put word 2 of the selectedChunk into theStart                   ⎪
      put word 4 of the selectedChunk into theEnd                     ⎬  9
      put the number of chars in card field "reciteString" into theTotal
      put the selection into theString                                ⎪
      put char 1 to theStart - 1 of card field "reciteString" into tempString
      put tempString into saveTempString                              ⎪
      delete char 6 of tempString                                     ⎪
      put the number of words in tempString into tempStringNum        ⎪
      put the number of words in theString into selectNum             ⎭

-----------------------------------------------------------------
--  Get the amount of time before the selection.               --
----------------------------------------------------------------- repeat with x = 5 to tempStringNum                                ⎫
      if x mod 2 is not 0 then add word x of tempString to beforeTime ⎬  10
    end repeat                                                        ⎭

-----------------------------------------------------------------
--  Get the amount of time in the selection.                   --
----------------------------------------------------------------- repeat with x = 2 to selectNum                                    ⎫
      if x mod 2 is 0 then                                            ⎪
        if char 1 of word x of theString is in numTest1 then          ⎪
          add word x of theString to stringTime                       ⎬  11
        else                                                          ⎪
          answer "The Phonetic Listing is incorrect." with "OK"       ⎪
          exit mouseUp                                                ⎪
        end if                                                        ⎪
      end if                                                          ⎭
    end repeat -----------------------------------------------------------------
--  Build the string of information to be passed.              --
----------------------------------------------------------------- put beforeTime&&stringTime&&theString into theInfo     ⎫
    put RAVER ("|FIRST "&theInfo&"|") into temp            ⎬  12
  else                                                     ⎪
    answer "Must select Phonetic/Timing pair." with "OK"   ⎭
  end if
```

```
else
  set cursor to watch
  put 1 into x
  --------------------------------------------------------------
  -- Make sure that a RECITE string has been entered before   --
  -- entering. If not, warn user and exit.                    --
  -------------------------------------------------------------- if card field "reciteString" is empty then
    beep answer "No Recite String Found." with "OK"
    exit mouseUp
  end if                                                                } 13 put card field "reciteString" into theString
  delete first word of theString
  delete first char of theString
  delete first char of theString
  get number of chars of card field "reciteString"
  put it into lastChar --------------------------------------------------------------
  -- Check for a complete RECITE command. In particular, for a
  -- missing "|" at the end of the RECITE string. If not found,
  -- warn user and exit button's execution.
  -------------------------------------------------------------- repeat until last char of theString = "|"
    delete last char of theString
    if x = lastChar then
      beep
      answer "Missing '|' in RECITE command." with "OK"
      exit repeat
      exit mouseUp
    end if
    add 1 to x
  end repeat
  delete last char of theString
  put theString into card field "test"                                  } 14

--------------------------------------------------------------
  -- Since the HyperTalk command field contains a complete RAVE --
  -- RECITE command that can be immeadiately used, just "do" it --
  -- to execute and test it. We will RECITE what is in the card --
  -- field "test" because we can not use the "do card field     --
  -- "reciteString"" AND have strings over 255 characters long  --
  -- because of constraints on the "do" command.                --
  -------------------------------------------------------------- put card field "test" into reciteString
  RAVE "|~"&reciteString&"~|"                                           } 15
  end if
end mouseUp Script of card field id 5 = "wordString"

on returnInField
  -- Find the position of the selection
  put the selection into saveSelect
  if saveSelect is empty then
    answer "Please select a word." with "OK"
    exit returnInField
  end if                                                                } 15
  repeat with x = 1 to the number of words in me
    if word x of me is saveSelect then exit repeat
  end repeat
  select word x of card field "phoneticString"                          } 16
end returnInField
```

Script of card field id 11 = "phoneticString"

```
on returnInField
  put "0123456789" into numTest
  put empty into introString
  put empty into introString
  put 0 into firstFlag
  put 0 into finalStart
  put 0 into totalFinal
  put 0 into introLength
  put 0 into beforeLength
  put 0 into duringLength
  put 0 into theBegin
  put 0 into theEnd set cursor to watch ---------------------------------------------------------------
  -- Get the selected word and delete the stress numbers from it. --
  --------------------------------------------------------------- put the selection into saveSelect          ⎫
  if saveSelect is empty then                 ⎬ 17
    answer "Please select a word." with "OK"  ⎪
    exit returnInField                        ⎪
  end if                                      ⎭
  repeat with x = 1 to the number of chars in saveSelect ⎫
    if char x of saveSelect is not in numTest then        ⎬ 18
      put char x of saveSelect after finalSelect          ⎪
    end if                                                ⎪
  end repeat                                              ⎭

---------------------------------------------------------------
  -- Create tempString from the Recite command.  TempString will --
  -- contain only the phonetic/timing value string.              --
  --------------------------------------------------------------- put card field "reciteString" into tempString  ⎫
  delete last char of tempString                  ⎬ 19
  delete last char of tempString                  ⎪
  delete char 6 of tempString                     ⎭

---------------------------------------------------------------
  -- Create introString which contains the RAVE, RECITE, and    --
  -- sound name words.                                          --
  --------------------------------------------------------------- repeat 3                                       ⎫
    put word 1 of tempString after introString   ⎬ 20
    delete word 1 of tempString                  ⎪
  end repeat                                     ⎭

---------------------------------------------------------------
  -- Create phoString which contains only phonemes which are    --
  -- separated by spaces.                                       --
  --------------------------------------------------------------- repeat with x = 1 to the number of words in tempString   ⎫
    if char 1 of word x of tempString is not in numtest then ⎬ 21
      put word x of tempString&&space after phoString         ⎪
    end if                                                    ⎪
  end repeat                                                  ⎭

---------------------------------------------------------------
  -- This repeat loop figures out which phonemes in the phoString --
  -- are located in the selection, what # word the first starts  --
  -- at, and the total number phonemes involved in the selection. --
  -- To make sure we're starting at the correct phoneme, we check --
  -- the second phoneme too.                                      --
  ---------------------------------------------------------------
```

```
repeat with x = 1 to the number of words in phoString
   if word x of pnoString is in finalSelect then
      if firstFlag is 0 then
         put the number of chars in word x of phoString into lenA
         if char 1 to lenA of word x of phoString is¬
         char 1 to lenA of finalSelect then
            put the number of chars in word x+1 of phoString into lenB
            if char 1 to LenB of word x+1 of phoString is¬
            char 1+lenA to lenA+LenB of finalSelect then
               put 1 into firstFlag
               put x into finalStart
               add 1 to totalFinal
            end if
         end if
      else
         add 1 to totalFinal
      end if
   else
      if firstFlag is 1 then exit repeat
   end if
end repeat
``` } 22

```
if finalStart is 0 then
   answer "Please select entire word." with "OK"
   exit returnInField
end if
``` } 23

```
-- ================================================
-- Because finalStart and totalFinal reflect phonemes, they
-- must be doubled to reflect phonemes and timing values.
-- ================================================
```

```
multiply finalStart by 2
subtract 1 from finalStart
multiply totalFinal by 2
``` ⟩ (24)

```
-- ================================================
-- Find the total length of introString.  Add 5 to take in
-- account for missing spaces and quotes.
-- ================================================
```

```
put (the number of chars in introString) + 5 into introLength
``` } 25

```
-- ================================================
-- Find the total length of phonetic/timing value before the
-- selection.
-- ================================================
```

```
repeat with x = 1 to finalStart-1
   add (the number of chars in word x of tempString)+1 to beforeLength
end repeat
``` } 26

```
-- ================================================
-- Find the total length of phonetic/timing value that is the
-- selection.
-- ================================================
```

```
repeat with x = finalStart to (finalStart+totalFinal-1)
   add (the number of chars in word x of tempString)+1 to duringLength
end repeat
``` } 27

```
-- ================================================
-- The length of the intro text plus the phonetic/timing value
-- string before the selection tells us where to start the
-- selection.  Add the length of the actual selection to the
-- starting point to find out where to end the selection.
-- ================================================
```

```
subtract 2 from duringlength -- fudge factor
put introLength+beforeLength into theBegin
put theBegin+duringLength into theEnd
select char theBegin to theEnd of card field "reciteString"
end returnInField
``` } 28

Script of card field id 7 = "reciteString"

```
on returnInField
  put 0 into totalTime
  put 0 into afterTime
  put "123456789" into numTest
  put false into theFlag put preProcess(card field "reciteString") into reciteString ------------------------------------------------------------
  -- Get the location of the changed number.                --
  ------------------------------------------------------------ put word 2 of the selectedChunk into theStart                    } 29

------------------------------------------------------------
  -- Get the total number of characters in the Recite String. --
  ------------------------------------------------------------ put the number of chars in reciteString into theEnd

------------------------------------------------------------
  -- Get the character to the left of the cursor to make sure --
  -- it is a number.                                         --
  ------------------------------------------------------------ put char (theStart -1) of reciteString into charCheck

------------------------------------------------------------
  -- If the character is a space, then check the previous    --
  -- character.                                              --
  ------------------------------------------------------------ if charCheck is " " then ¬
  put char (theStart - 2) of reciteString into charCheck ------------------------------------------------------------
  -- Make sure it is a number.                              --
  ------------------------------------------------------------ if charCheck >= 0 and charCheck <= 9 then

------------------------------------------------------------
     -- If a stopper is in the Phonetic string, then we need to --
     -- parse the string differently.                          --
     ------------------------------------------------------------ if "•" is in card field "reciteString" then

------------------------------------------------------------
        -- Get location of the stopper.                           --
        ------------------------------------------------------------ put offset("•",reciteString) into theStop

------------------------------------------------------------
        -- If the location of the change is next to the stopper,  --
        -- a recalculation would be useless. So, stop execution.  --
        ------------------------------------------------------------ if theStop - 1 is theStart then
          answer "Too close to the stop." with "OK"
          exit returninField
        end if
```

30

31

```
-- Get string from the Stopper to the End.     -- put char theStop to theEnd of reciteString into stopperString

-- Get string from the Selection to the Stopper.    -- put theStop - 2 into theStop
put char theStart to theStop of reciteString into begString -- Get string from the beginning to the Selection.  -- put char 1 to theStart - 1 of reciteString into tempString
put tempString into saveTempString -- Remove the first quote so that we can work on words.  -- delete char 6 of tempString
put the number of words in tempString into tempStringNum -- Add up the timing values before the selection. The timing --
-- values should be in the even locations of the string.     --
-- If a number is not encountered, then the Phonetic Pairs   --
-- are not in order.                                         -- repeat with x = 5 to tempStringNum
   if x mod 2 is not 0 then
      if char 1 of word x of tempString is in numTest then
         add word x of tempString to totalTime
      else
         answer "Problem with Phonetic Pairs." with "OK"
         exit returnInField
      end if
   end if
end repeat -- Add up the timing values after the stopper. The timing  --
-- values should be in the odd locations of the string.    --
-- If a number is not encountered, then the Phonetic Pairs --
-- are not in order.                                       -- put stopperString into tempString
delete first char of tempString
delete last char of tempString
delete last char of tempString
put the number of words in tempString into endStringNum
repeat with y = 1 to endStringNum
   if y mod 2 is 0 then
      if char 1 of word y of tempString is in numTest then
         add word y of tempString to afterTime
      else
         answer "Problem with Phonetic Pairs." with "OK"
         exit returnInField
      end if
   end if
end repeat -- Add up the total time after the stopper and the total --
-- time before the selection.                            --
```

32 — (Get string from the Stopper to the End / Get string from the Selection to the Stopper)
33 — (repeat block for before selection)
34 — (repeat block for after stopper)

```
add afterTime to totalTime

-- Send total time and the string to be recalculated to the  --
-- RAVE Driver.                                               -- put totalTime&&begString into theInfo                        ⎫
    put RAVER ("(SECOND "&theInfo&")") into temp                 ⎬ 35
    if temp is "FALSE" then exit returnInField                   ⎭
    delete first char of temp
    if last char of saveTempString is " " then
       delete last char of saveTempString
    end if -- Rebuild the resulting RAVE RECITE command.                 -- put saveTempString&temp&&stopperString ¬                     ⎫ 36
    into card field "reciteString"                               ⎭
else -- Recalculate the entire string left of the Selection.       -- put theEnd - 2 into theEnd                                   ⎫
    put char theStart to theEnd  of reciteString into theString  ⎪
    put char 1 to theStart - 1 of reciteString into tempString   ⎬ 37
    put tempString into saveTempString                           ⎪
    delete char 6 of tempString                                  ⎪
    put the number of words in tempString into tempStringNum     ⎭

-- Add up the timing values before the selection. The timing  --
-- values should be in the even locations of the string.      --
-- If a number is not encountered, then the Phonetic Pairs    --
-- are not in order.                                          -- repeat with x = 5 to tempStringNum                           ⎫
       if x mod 2 is not 0 then add word x of tempString to totalTime ⎬ 38
    end repeat                                                   ⎭
    if theFlag is true then
       put char the
       add afterTime to totalTime
    end if -- Send total time and the string to be recalculated to the   --
-- RAVE Driver.                                               -- put totalTime&&theString into theInfo                        ⎫
    put RAVER ("(SECOND "&theInfo&")") into temp                 ⎬ 39
       if temp is "FALSE" then exit returnInField                ⎭
       delete first char of temp
       if last char of saveTempString is " " then
          delete last char of saveTempString
       end if -- Rebuild the resulting RAVE RECITE command.                 -- put saveTempString&temp&")""e into saveTempString     ⎫ 40
       put saveTempString into card field "reciteString"         ⎭
    end if
else
    answer "You must change a number." with "OK"
end if end returnInField
```

```
function preProcess theString
  repeat until last char of theString is quote
    delete last char of theString
  end repeat
  return theString
end preProcess
```

Script of card button id 32 = "ChangeActor"

```
on mouseUp
  global current actor ask "Enter name of new actor to sync with:"
  put it into actorName
  if it is empty then exit mouseUp
  RAVE "|-RETIRE "&current actor&"-|"
  RAVE "(ACTOR "&actorName&" AT 16 66)"
  if the result is false then
    RAVE "|-ACTOR "&current actor&" AT 16 66-|"
    RAVE "|-SHOW "&current actor&"-|"
    exit mouseUp
  end if
  put actorName into current actor
  RAVE "|-SHOW "&current actor&"-|"
end mouseUp
```

Script of card id 5294 = "Sound Sync"

```
on opencard
  global current actor
  global soundFlag
  global actorFlag
  global userLevel2 put "false" into soundFlag
  put empty into card field "wordString"
  put empty into card field "phoneticString"
  put empty into card field "reciteString"
  put empty into card field "test"
  if actorFlag is "false" then
    RAVE "|-ACTOR "&current actor&"-|"
    put "true" into actorFlag
  end if
  RAVE "|-MOVE 16 66-|"
  RAVE "|-SHOW "&current actor&"-|"
  set userlevel to userLevel2
  show menubar
  click at the topLeft of card field "wordString"
end opencard on closeSync cardName -----------------------------------------------------------------
  -- This handler is called from the two navigation buttons on   --
  -- Speech Sync. It prevents the user from accidently wiping    --
  -- out any work they may have done in Speech Sync.             --
  ----------------------------------------------------------------- global current actor
  global actorFlag if card field "reciteString" is not empty then
    answer "Leaving will erase Speech Sync's fields." with¬
    "Leave" or "Don't Leave"
    if it = "Don't Leave" then exit closeSync
  end if
  set cursor to watch
  RAVE "|-RETIRE "&current actor&"-|"
  put "false" into actorFlag
  go to card cardName
end closeSync
```

```
on closecard
  global soundName
  global soundFlag
  global userLevel3 hide menubar
  set userlevel to userLevel3
  put empty into card field "wordString"
  put empty into card field "phoneticString"
  put empty into card field "reciteString"
  put empty into card field "test"

put "empty" into soundName if soundFlag = "true" then
    RAVE ("|-CloseSoundFile-|")
    RAVE "(UNLOCK)"
  end if end closecard
```
} 41

APPENDIX IV

```
static char phoneme_timings[pho_size][4] = {
           { '\0', '\0', '\0', '\0' } , /* required dummy at start */
           { 'A', 'A', '\0', '\10' } , /* short o: cot           */
           { 'A', 'E', '\0', '\10' } , /* short a: last          */
           { 'A', 'H', '\0', '\6'  } , /* short u: up            */
           { 'A', 'O', '\0', '\11' } , /* intermediate o: caught */
           { 'A', 'W', '\0', '\12' } , /* diphthong: loud        */
           { 'A', 'X', '\0', '\6'  } , /* schwa sound: against   */
           { 'A', 'Y', '\0', '\11' } , /* long i: Ice            */
           { 'E', 'H', '\0', '\7'  } , /* short e: best          */
           { 'E', 'R', '\0', '\11' } , /* ur, er: further        */
           { 'E', 'Y', '\0', '\10' } , /* long a: ace            */
           { 'I', 'H', '\0', '\6'  } , /* short i: fit           */
           { 'I', 'L', '\0', '\10' } , /* contraction of IXL     */
           { 'I', 'M', '\0', '\10' } , /* contraction of IXL     */
           { 'I', 'N', '\0', '\10' } , /* contraction of IXL     */
           { 'I', 'X', '\0', '\5'  } , /* medium i: solid        */
           { 'I', 'Y', '\0', '\10' } , /* long e: beet           */
           { 'O', 'H', '\0', '\10' } , /* long o: dose           */
           { 'O', 'W', '\0', '\10' } , /* diphthong: low         */
           { 'O', 'Y', '\0', '\12' } , /* diphthong: noise       */
           { 'U', 'H', '\0', '\7'  } , /* u sound: book          */
           { 'U', 'L', '\0', '\11' } , /* contraction of AXL     */
           { 'U', 'M', '\0', '\11' } , /* contraction of AXM     */
           { 'U', 'N', '\0', '\11' } , /* contraction of AXN     */
           { 'U', 'W', '\0', '\10' } , /* long u: lute           */
           { 'U', 'X', '\0', '\10' } , /* long u: lute           */
           { 'P', '\0', '\0', '\6' } , /* p: pin                 */
           { 'T', '\0', '\0', '\6' } , /* t: tin                 */
           { 'T', 'H', '\0', '\7'  } , /* th: thin               */
           { 'C', 'H', '\0', '\6'  } , /* ch: chin               */
           { 'K', '\0', '\0', '\6' } , /* k: kin                 */
           { 'B', '\0', '\0', '\7' } , /* b: bin                 */
           { 'D', '\0', '\0', '\7' } , /* d: din                 */
           { 'J', '\0', '\0', '\7' } , /* j: gin                 */
           { 'G', '\0', '\0', '\7' } , /* g: given               */
           { 'F', '\0', '\0', '\7' } , /* f: fin                 */
           { 'S', 'H', '\0', '\10' } , /* s: fish                */
           { 'S', '\0', '\0', '\7' } , /* s: sin                 */
           { 'V', '\0', '\0', '\5' } , /* v: vim                 */
           { 'D', 'H', '\0', '\10' } , /* th: then               */
           { 'D', 'X', '\0', '\5'  } , /* tongue flap: pity      */
           { 'Z', '\0', '\0', '\6' } , /* z: zen                 */
           { 'Z', 'H', '\0', '\5'  } , /* z: azure               */
           { 'L', '\0', '\0', '\7' } , /* l: light               */
```

```
    { 'L',  'X',  '\0', '\7'  } , /* ll: call              */
    { 'M',  '\0', '\0', '\7'  } , /* m: might              */
    { 'N',  '\0', '\0', '\7'  } , /* n: night              */
    { 'N',  'X',  '\0', '\10' } , /* ng: sing              */
    { 'Q',  '\0', '\0', '\2'  } , /* glottal stop: kitten  *//*DLA Min*/
    { 'Q',  'X',  '\0', '\2'  } , /* silent vowel          *//*DLA Min*/
    { '/',  'C',  '\0', '\6'  } , /* ch: loch              */
    { '/',  'H',  '\0', '\7'  } , /* h: hit                */
    { 'R',  '\0', '\0', '\7'  } , /* r: rate               */
    { 'R',  'X',  '\0', '\7'  } , /* postvocalic R and L   */
    { 'W',  '\0', '\0', '\7'  } , /* w: wait               */
    { 'Y',  '\0', '\0', '\6'  } , /* y: yet                */
    { '1',  '\0', '\0', '\0'  } , /* pitch                 */
    { '2',  '\0', '\0', '\0'  } , /* pitch                 */
    { '3',  '\0', '\0', '\0'  } , /* pitch                 */
    { '4',  '\0', '\0', '\0'  } , /* pitch                 */
    { '5',  '\0', '\0', '\0'  } , /* pitch  medium         */
    { '6',  '\0', '\0', '\0'  } , /* pitch                 */
    { '7',  '\0', '\0', '\0'  } , /* pitch                 */
    { '8',  '\0', '\0', '\0'  } , /* pitch                 */
    { '9',  '\0', '\0', '\0'  } , /* pitch  high           */
    { '#',  '\0', '\0', '\0'  } , /* phonetics terminator  */
    { '.',  '\0', '\0', '\0'  } , /* sentence terminator   */
    { '?',  '\0', '\0', '\0'  } , /* sentence terminator   */
    { '-',  '\0', '\0', '\0'  } , /* phrase delimiter      */
    { ',',  '\0', '\0', '\7'  } , /* clause delimiter      */
    { '(',  '\0', '\0', '\0'  } , /* noun phrase delimiter */
    { ')',  '\0', '\0', '\0'  } , /* noun phrase delimiter */
    { '\0', '\0', '\0', '\0'  }   /* required dummy at end */
}; /* end of phoneme_timings */
```

APPENDIX VIII

COART TYPES (SILENCE  VOWELS  CONSONANT)

1 — SILENCE         /* These phonemes have no action, no sound      */

2 {
```
"1" " #"
"2" " #"
"3" " #"
"4" " #"
"5" " #"
"6" " #"
"7" " #"
"8" " #"
"9" " #"
"#" " #"
"." " #"
"?" " #"
"-" " #"    3  1  1
"," " #"    3  1  1
"(" " #"
")" " #"
" " " #"
"_" " #"
```

3 — VOWELS 3    4    6    7

5 {
```
"AA" "AA #"   1   2  1  /* 'o' in bought   */
"AE" "AE #"   1   3  1  /* 'a' in bat      */
"AH" "AH #"   1   4  1  /* 'u' in butt     */
"AO" "AO #"   1   6  1  /* 'a' in balk     */
"AW" "AW #"   6   4  1  /* 'a' in out      */
              1  11  3  /* 'u' in out      */
"AX" "AX #"   1   5  1  /* 'a' in about    */
"AY" "AY #"   6   4  1  /* 'a' in formulae */
              1   9  2  /* 'e' in formulae */
```

8 — CONSONANT

9 {
```
"/C" "/CAX #"   1  47  1
"/C" "/CAX #"   1  48  2
"/C" "/CAX #"   1  49  3
"/H" "/HAX #"   1  47  1
```

```
"/H"  "/HAX #"      1  48  2
"/H"  "/HAX #"      1  49  3

SILENCE
"A0"  "SS #"        1   1  1    /* AT REST */
"A1"  "SS #"        1  56  1
"A2"  "SS #"        1  57  1
"A3"  "SS #"        1  58  1
"A4"  "SS #"        1  59  1
"A5"  "SS #"        1  60  1
"A6"  "SS #"        1  61  1
"A7"  "SS #"        1  62  1
"A8"  "SS #"        1  63  1
"A9"  "SS #"        1  64  1

CONSONANT
"B"   "BAX #"       1  17  1
"B"   "BAX #"       1  18  2
"B"   "BAX #"       1  19  3

SILENCE
"B1"  "SS #"        1  65  1
"B2"  "SS #"        1  66  1
"B3"  "SS #"        1  67  1
"B4"  "SS #"        1  68  1
"B5"  "SS #"        1  69  1
"B6"  "SS #"        1  70  1
"B7"  "SS #"        1  71  1
"B8"  "SS #"        1  72  1
"B9"  "SS #"        1  73  1
"C1"  "SS #"        1  74  1
"C2"  "SS #"        1  75  1
"C3"  "SS #"        1  76  1
"C4"  "SS #"        1  77  1
"C5"  "SS #"        1  78  1
"C6"  "SS #"        1  79  1
"C7"  "SS #"        1  80  1
"C8"  "SS #"        1  81  1
"C9"  "SS #"        1  82  1

CONSONANT
"CH"  "CHAX #"      1  32  1
"CH"  "CHAX #"      1  33  2
"CH"  "CHAX #"      1  34  3
"D"   "DAX #"       1  26  1
"D"   "DAX #"       1  27  2
"D"   "DAX #"       1  28  3

SILENCE
"D1"  "SS #"        1  83  1
"D2"  "SS #"        1  84  1
"D3"  "SS #"        1  85  1
"D4"  "SS #"        1  86  1
"D5"  "SS #"        1  87  1
"D6"  "SS #"        1  88  1
"D7"  "SS #"        1  89  1
"D8"  "SS #"        1  90  1
"D9"  "SS #"        1  91  1

CONSONANT
"DH"  "DHAX #"      1  20  1
"DH"  "DHAX #"      1  21  2
"DH"  "DHAX #"      1  22  3
"DX"  "DX #"        1  26  1
"DX"  "DX #"        1  27  2
"DX"  "DX #"        1  28  3

SILENCE
"E1"  "SS #"        1  92  1
"E2"  "SS #"        1  93  1
"E3"  "SS #"        1  94  1
"E4"  "SS #"        1  95  1
```

```
"E5" "SS #"          1  96 1
"E6" "SS #"          1  97 1
"E7" "SS #"          1  98 1
"E8" "SS #"          1  99 1
"E9" "SS #"          1 100 1

VOWELS 3
"EH" "EH #"          1  10 2  /* 'e'  in bet    */
"ER" "ER #"          1  16 3  /* 'ir' in bird   */
"EY" "EY #"          6  10 2  /* 'e'  in beige  */
                     1   9 2  /* 'i'  in beige  */

CONSONANT
 "F" "FAX #"         1  23 1
 "F" "FAX #"         1  24 2
 "F" "FAX #"         1  25 3

SILENCE
"F1" "SS #"          1 101 1
"F2" "SS #"          1 102 1
"F3" "SS #"          1 103 1
"F4" "SS #"          1 104 1
"F5" "SS #"          1 105 1
"F6" "SS #"          1 106 1
"F7" "SS #"          1 107 1
"F8" "SS #"          1 108 1
"F9" "SS #"          1 109 1

CONSONANT
 "G" "GAX #"         1  44 1
 "G" "GAX #"         1  45 2
 "G" "GAX #"         1  46 3

SILENCE
"G1" "SS #"          1 110 1
"G2" "SS #"          1 111 1
"G3" "SS #"          1 112 1
"G4" "SS #"          1 113 1
"G5" "SS #"          1 114 1
"G6" "SS #"          1 115 1
"G7" "SS #"          1 116 1
"G8" "SS #"          1 117 1
"D9" "SS #"          1  91 1

CONSONANT
"DH" "DHAX #"        1  20 1
"DH" "DHAX #"        1  21 2
"DH" "DHAX #"        1  22 3
"DX" "DX #"          1  26 1
"DX" "DX #"          1  27 2
"DX" "DX #"          1  28 3

SILENCE
"E1" "SS #"          1  92 1
"E2" "SS #"          1  93 1
"E3" "SS #"          1  94 1
"E4" "SS #"          1  95 1
"E5" "SS #"          1  96 1
"E6" "SS #"          1  97 1
"E7" "SS #"          1  98 1
"E8" "SS #"          1  99 1
"E9" "SS #"          1 100 1

VOWELS 3
"EH" "EH #"          1  10 2  /* 'e'  in bet    */
"ER" "ER #"          1  16 3  /* 'ir' in bird   */
"EY" "EY #"          6  10 2  /* 'e'  in beige  */
                     1   9 2  /* 'i'  in beige  */

CONSONANT
 "F" "FAX #"         1  23 1
 "F" "FAX #"         1  24 2
```

```
   "F"  "FAX #"        1  25  3

SILENCE
   "F1" "SS #"         1 101  1
   "F2" "SS #"         1 102  1
   "F3" "SS #"         1 103  1
   "F4" "SS #"         1 104  1
   "F5" "SS #"         1 105  1
   "F6" "SS #"         1 106  1
   "F7" "SS #"         1 107  1
   "F8" "SS #"         1 108  1
   "F9" "SS #"         1 109  1

CONSONANT
   "G"  "GAX #"        1  44  1
   "G"  "GAX #"        1  45  2
   "G"  "GAX #"        1  46  3

SILENCE
   "G1" "SS #"         1 110  1
   "G2" "SS #"         1 111  1
   "G3" "SS #"         1 112  1
   "G4" "SS #"         1 113  1
   "G5" "SS #"         1 114  1
   "G6" "SS #"         1 115  1
   "G7" "SS #"         1 116  1
   "G8" "SS #"         1 117  1
   "G9" "SS #"         1 118  1
   "H1" "SS #"         1 119  1
   "H2" "SS #"         1 120  1
   "H3" "SS #"         1 121  1
   "H4" "SS #"         1 122  1
   "H5" "SS #"         1 123  1
   "H6" "SS #"         1 124  1
   "H7" "SS #"         1 125  1
   "H8" "SS #"         1 126  1
   "H9" "SS #"         1 127  1

VOWELS 3
   "IH" "IH #"         1   8  2  /* 'i'  in bit     */
   "IL" "IL #"         2   9  2  1  35  1
   "IM" "IM #"         2   9  2  1  17  1
   "IN" "IN #"         2   9  2  1  26  1
   "IX" "IX #"         1   9  2  /* 'i'  in solid   */
   "IY" "IY #"         1   7  2  /* 'ee' in beet    */

CONSONANT
   "J"  "JAX #"        1  32  1
   "J"  "JAX #"        1  33  2
   "J"  "JAX #"        1  34  3
   "K"  "KAX #"        1  44  1
   "K"  "KAX #"        1  45  2
   "K"  "KAX #"        1  46  3
   "L"  "LXLX #"       1  35  1
   "L"  "LXLX #"       1  36  2
   "L"  "LXLX #"       1  37  3
   "M"  "MMM #"        1  17  1
   "M"  "MMM #"        1  18  2
   "M"  "MMM #"        1  19  3
   "N"  "NN #"         1  26  1
   "N"  "NN #"         1  27  2
   "N"  "NN #"         1  28  3
   "NX" "NNQXGAX #"    1  44  1
   "NX" "NNQXGAX #"    1  45  2
   "NX" "NNQX6AX #"    1  46  3

VOWELS 3
   "OH" "OH #"         1  14  3  /* 'o'  in border  */
   "OW" "OW #"         1  15  3  /* 'oa' in boat    */
   "OY" "OY #"         6  15  3  /* 'o'  in boil    */
                       1   9  2  /* 'i'  in boil    */
```

```
CONSONANT
   "P"   "PAX #"    1  17  1
   "P"   "PAX #"    1  18  2
   "P"   "PAX #"    1  19  3
   "Q"   "Q #"      1  47  1
   "Q"   "Q #"      1  48  2
   "Q"   "Q #"      1  49  3
   "QX"  "QX #"     1  50  1
   "QX"  "QX #"     1  51  2
   "QX"  "QX #"     1  52  3
   "R"   "PR #"     1  53  1
   "R"   "PR #"     1  54  2
   "R"   "RR #"     1  55  3
   "RX"  "R #"      1  53  1
   "RX"  "R #"      1  54  2
   "RX"  "R #"      1  55  3
   "S"   "SS #"     1  29  1
   "S"   "SS #"     1  30  2
   "S"   "SS #"     1  31  3
   "SH"  "SH #"     1  32  1
   "SH"  "SH #"     1  33  2
   "SH"  "SH #"     1  34  3
   "T"   "TAX #"    1  26  1
   "T"   "TAX #"    1  27  2
   "T"   "TAX #"    1  28  3
   "TH"  "THAX #"   1  20  1
   "TH"  "THAX #"   1  21  2
   "TH"  "THAX #"   1  22  3

VOWELS 3
   "UH"  "UH #"     1  13  3    /* 'oo' in book     */
   "UL"  "UL #"     3  13  1  1  35  1
   "UM"  "UM #"     3  13  1  1  17  1
   "UN"  "UN #"     3  13  1  1  26  1
   "UW"  "UW #"     1  11  3    /* 'oo' in boot     */
   "UX"  "UX #"     1  12  3    /*                  */

CONSONANT
   "V"   "VAX #"    1  23  1
   "V"   "VAX #"    1  24  2
   "V"   "VAX #"    1  25  3
   "W"   "WUH #"    1  38  1
   "W"   "WUH #"    1  39  2
   "W"   "WUH #"    1  40  3
   "Y"   "YAX #"    1  41  1
   "Y"   "YAX #"    1  42  2
   "Y"   "YAX #"    1  43  3
   "Z"   "ZZZ #"    1  29  1
   "Z"   "ZZZ #"    1  30  2
   "Z"   "ZZZ #"    1  31  3
   "ZH"  "ZHAX #"   1  32  1
   "ZH"  "ZHAX #"   1  33  2
   "ZH"  "ZHAX #"   1  34  3
/****************************************************/
;

LIPPARAMS  160  128  16  16  ;

ENDVOICE "FACE127.IMG"
```

We claim:

1. Apparatus for generating and displaying user created animated objects having synchronized visual and audio characteristics, said apparatus comprising:
   a program-controlled microprocessor;
   first means coupled to said microprocessor and responsive to user input signals for generation a first set of signals defining visual characteristics of a desired animated object;
   second means coupled to said microprocessor and to said first means and responsive to user input signals for generating a second set of signals defining audio characteristics of said desired animated object; and
   controller means coupled to said first and second means and to said microprocessor for generating a set of instructions collating and synchronizing said visual characteristics with said audio characteristics thereby defining said animated object having synchronized visual and audio characteristics.

2. The apparatus as in claim 1 further comprising:
   integrator means coupled to said microprocessor and responsive to command signals generated by said microprocessor for producing signals representing encoded elements of sound and encoded elements of constituent object parts, said constituent object parts associated with said visual characteristics, said microprocessor responsive to user input signals and to said set of instructions for generating said command signals;

audio means coupled to said microprocessor and to said integrator means responsive to said signals representing encoded elements of sound for producing sounds associated with said signals representing encoded elements of sound; and display means coupled to said microprocessor, to said integrator means and to said sound emitting means responsive to said signals representing encoded elements of constituent object parts for displaying visual images of said desired animated object, said visual images having said visual characteristics synchronized with said audio characteristics.

3. Apparatus as in claim 2 wherein said first means is further coupled to said display means, said display means responsive to said user input signals for displaying images of said visual characteristics as said first set of signals is being generated.

4. Apparatus as in claim 3 wherein said second means is further coupled to said display means and includes testing and editing means responsive to user input for displaying said desired animated object and testing and editing the synchronization of said audio characteristics with said visual characteristics as said second set of signals is being generated.

5. Apparatus as in claim 4 further comprising storage means coupled to said microprocessor for storing a plurality of data sets, at least one of said data sets defining the visual characteristics of a predetermined prototype animated object.

6. Apparatus as in claim 5 wherein said plurality of data sets include at least one data set defining the audio characteristics of selectable predetermined text.

7. Apparatus as in claim 5 wherein said plurality of data sets include at least one data set defining the audio characteristics of selectable prerecorded sounds.

8. Apparatus as in claim 2 wherein said audio means includes speech synthesizer means for digitally synthesizing signals representing sounds associated with said signals representing encoded elements of sound.

9. A method for generating user created animated objects having synchronized visual and audio characteristics, said method comprising the steps of:

generating a first set of signals defining visual characteristics of a desired animated object in response to user input signals;

generating a second set of signals defining audio characteristics of said desired animated object in response to user input signals; and generating a set of instructions collating and synchronizing said visual characteristics with said audio characteristics thereby defining said desired animated object having synchronized visual and audio characteristics.

10. The method of claim 9 including the step of displaying visual images of said desired animated object during the generation of said first set of signals.

11. A method of synchronizing sound with visual images of animated objects pronouncing the sound, said method comprising the steps of:

defining a text string representing a desired sound to be synchronized with visual images of a speaking animated object;

translating said text string into a phonetic text string representative of said text string; and translating said phonetic text string into a recite command, said recite command including phonetic/timing pairs, each of said phonetic/timing pairs comprising a phonetic code corresponding to an associated phonetic code of said phonetic text string and a number defining a predetermined time value, said phonetic code representative of a sound element to be pronounced and an associated image to be displayed while said sound element is being pronounced and said predetermined time value defines the amount of time said associated image is to be displayed.

12. A method as in claim 11 including the step of displaying said associated images during the pronounciation of said desired sound for testing the accuracy of the synchronization between said animated object and said pronounced desired sound.

13. A method as in claim 12 wherein said time value is adjustable, the further step of adjusting the value of said time value to edit and tune the accuracy of the synchronization between said animated object and said pronounced desired sound.

* * * * *